(12) United States Patent
Nair et al.

(10) Patent No.: US 10,872,038 B1
(45) Date of Patent: Dec. 22, 2020

(54) MEMORY ORGANIZATION FOR MATRIX PROCESSING

(71) Applicant: Facebook, Inc., Menlo Park, CA (US)

(72) Inventors: Krishnakumar Narayanan Nair, Newark, CA (US); Ehsan Khish Ardestani Zadeh, San Jose, CA (US); Olivia Wu, Los Altos, CA (US); Yuchen Hao, Fremont, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 16/588,859

(22) Filed: Sep. 30, 2019

(51) Int. Cl.
*G06F 12/06* (2006.01)
*G06F 9/30* (2018.01)
*G06F 17/15* (2006.01)
*G06N 20/00* (2019.01)
*G06F 17/16* (2006.01)

(52) U.S. Cl.
CPC ........ *G06F 12/0646* (2013.01); *G06F 9/3001* (2013.01); *G06F 17/153* (2013.01); *G06F 17/16* (2013.01); *G06N 20/00* (2019.01); *G06F 2212/1016* (2013.01)

(58) Field of Classification Search
CPC ............. G06F 12/0246; G06F 12/0813; G06F 2212/454
See application file for complete search history.

(56) References Cited

U.S. PATENT DOCUMENTS

| | | | |
|---|---|---|---|
| 2010/0122035 A1* | 5/2010 | Strumpen | G06F 12/123 711/136 |
| 2018/0188972 A1* | 7/2018 | Yang | G06F 11/1048 |
| 2020/0019380 A1* | 1/2020 | Ross | G06F 7/78 |
| 2020/0192968 A1* | 6/2020 | Prathapan | G06F 13/287 |

* cited by examiner

*Primary Examiner* — Ryan Bertram
*Assistant Examiner* — Edmund H Kwong
(74) *Attorney, Agent, or Firm* — Van Pelt, Yi & James LLP

(57) ABSTRACT

A system comprises a memory, a plurality of memory banks, and an organizer. The memory is configured to store elements of a matrix, wherein the elements are distributed into overlapping subgroups and each shares at least one element of the matrix with another overlapping subgroup. The plurality of memory banks is configured to store the overlapping subgroups, wherein the subgroups are distributed among the memory banks using a circular shifted pattern. The organizer is configured to read specific ones of the overlapping subgroups in the plurality of memory banks in a specified pattern associated with transposing the matrix.

20 Claims, 43 Drawing Sheets

| | | | |
|---|---|---|---|
| 701 | $W_{1,1}$ | $W_{1,2}$ | $W_{1,3}$ |
| | $W_{2,1}$ | $W_{2,2}$ | $W_{2,3}$ |
| | $W_{3,1}$ | $W_{3,2}$ | $W_{3,3}$ |

FIG. 7A

| 703 | $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{1,11}$ | ... |
|---|---|---|---|---|---|---|---|---|---|---|---|---|
| | $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{2,11}$ | ... |
| | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{3,11}$ | ... |
| | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{4,11}$ | ... |
| | $X_{32,1}$ | $X_{32,2}$ | $X_{32,3}$ | $X_{32,4}$ | $X_{32,5}$ | $X_{32,6}$ | $X_{32,7}$ | $X_{32,8}$ | $X_{32,9}$ | $X_{32,10}$ | $X_{32,11}$ | ... |
| | $X_{33,1}$ | $X_{33,2}$ | $X_{33,3}$ | $X_{33,4}$ | $X_{33,5}$ | $X_{33,6}$ | $X_{33,7}$ | $X_{33,8}$ | $X_{33,9}$ | $X_{33,10}$ | $X_{33,11}$ | ... |
| | $X_{34,1}$ | $X_{34,2}$ | $X_{34,3}$ | $X_{34,4}$ | $X_{34,5}$ | $X_{34,6}$ | $X_{34,7}$ | $X_{34,8}$ | $X_{34,9}$ | $X_{34,10}$ | $X_{34,11}$ | ... |

FIG. 7B

| 801 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 803 | $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{2,1}$ | $X_{2,2}$ | $X_{2,3}$ | $X_{2,4}$ | $X_{2,5}$ | $X_{2,6}$ |
| 805 | $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ |
| 807 | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{4,1}$ | $X_{4,2}$ | $X_{4,3}$ | $X_{4,4}$ | $X_{4,5}$ | $X_{4,6}$ |
| 809 | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{5,1}$ | $X_{5,2}$ | $X_{5,3}$ | $X_{5,4}$ | $X_{5,5}$ | $X_{5,6}$ |
| 811 | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | $X_{6,1}$ | $X_{6,2}$ | $X_{6,3}$ | $X_{6,4}$ | $X_{6,5}$ | $X_{6,6}$ |
| 813 | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | $X_{7,1}$ | $X_{7,2}$ | $X_{7,3}$ | $X_{7,4}$ | $X_{7,5}$ | $X_{7,6}$ |
| 815 | $X_{32,1}$ | $X_{32,2}$ | $X_{32,3}$ | $X_{32,4}$ | $X_{32,5}$ | $X_{32,6}$ | $X_{32,7}$ | $X_{32,8}$ | $X_{32,9}$ | $X_{32,10}$ | $X_{33,1}$ | $X_{33,2}$ | $X_{33,3}$ | $X_{33,4}$ | $X_{33,5}$ | $X_{33,6}$ |

FIG. 8A

| 802 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 804 | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | 0 | 0 |
| 806 | $X_{3,7}$ | $X_{3,8}$ | $X_{3,9}$ | $X_{3,10}$ | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | 0 | 0 |
| 808 | $X_{4,7}$ | $X_{4,8}$ | $X_{4,9}$ | $X_{4,10}$ | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | 0 | 0 |
| 810 | $X_{5,7}$ | $X_{5,8}$ | $X_{5,9}$ | $X_{5,10}$ | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | 0 | 0 |
| 812 | $X_{6,7}$ | $X_{6,8}$ | $X_{6,9}$ | $X_{6,10}$ | $X_{7,1}$ | $X_{7,2}$ | $X_{7,3}$ | $X_{7,4}$ | $X_{7,5}$ | $X_{7,6}$ | $X_{7,7}$ | $X_{7,8}$ | $X_{7,9}$ | $X_{7,10}$ | 0 | 0 |
| 814 | $X_{7,7}$ | $X_{7,8}$ | $X_{7,9}$ | $X_{7,10}$ | $X_{8,1}$ | $X_{8,2}$ | $X_{8,3}$ | $X_{8,4}$ | $X_{8,5}$ | $X_{8,6}$ | $X_{8,7}$ | $X_{8,8}$ | $X_{8,9}$ | $X_{8,10}$ | 0 | 0 |
| 816 | $X_{33,7}$ | $X_{33,8}$ | $X_{33,9}$ | $X_{33,10}$ | $X_{34,1}$ | $X_{34,2}$ | $X_{34,3}$ | $X_{34,4}$ | $X_{34,5}$ | $X_{34,6}$ | $X_{34,7}$ | $X_{34,8}$ | $X_{34,9}$ | $X_{34,10}$ | 0 | 0 |

FIG. 8B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 901 | 0 | 1 | 2 | 3 | 4 | 5 | 6 | 7 | 8 | 9 | 10 | 11 | 12 | 13 | 14 | 15 |
| 903 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 | 0 | 0 |
| 905 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 | 0 |
| 907 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 |
| 909 | 0 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ |
| 911 | 0 | 0 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ |
| 913 | 0 | 0 | 0 | 0 | 0 | $W_{1,1}$ | $W_{1,2}$ | $W_{1,3}$ | 0 | 0 | 0 | 0 | 0 | 0 | 0 | $W_{2,1}$ |
| 915 | 0 | 0 | 0 | 0 | 0 | 0 | $W_{1,1}$ | $W_{1,2}$ | $W_{1,3}$ | 0 | 0 | 0 | 0 | 0 | 0 | 0 |
| 917 | 0 | 0 | 0 | 0 | 0 | 0 | 0 | $W_{1,1}$ | $W_{1,2}$ | $W_{1,3}$ | 0 | 0 | 0 | 0 | 0 | 0 |

FIG. 9A

| 902 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 904 | 0 | 0 | 0 | 0 | $W_{3,1}$ | $W_{3,2}$ | $W_{3,3}$ | 0 | 0 | 0 | 0 | 0 | 0 | 0 | 0 | 0 |
| 906 | 0 | 0 | 0 | 0 | 0 | $W_{3,1}$ | $W_{3,2}$ | $W_{3,3}$ | 0 | 0 | 0 | 0 | 0 | 0 | 0 | 0 |
| 908 | 0 | 0 | 0 | 0 | 0 | 0 | $W_{3,1}$ | $W_{3,2}$ | $W_{3,3}$ | 0 | 0 | 0 | 0 | 0 | 0 | 0 |
| 910 | 0 | 0 | 0 | 0 | 0 | 0 | 0 | $W_{3,1}$ | $W_{3,2}$ | $W_{3,3}$ | 0 | 0 | 0 | 0 | 0 | 0 |
| 912 | $W_{2,3}$ | 0 | 0 | 0 | 0 | 0 | 0 | 0 | $W_{3,1}$ | $W_{3,2}$ | $W_{3,3}$ | 0 | 0 | 0 | 0 | 0 |
| 914 | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 | 0 | 0 |
| 916 | $W_{2,1}$ | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 | 0 |
| 918 | 0 | $W_{2,1}$ | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 |

| 1002 ⌇ | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1004 ⌇ | 0 | 0 | 0 | 0 | $W_{3,1}$ | $W_{3,2}$ | $W_{3,3}$ | 0 | 0 | 0 | 0 | 0 | 0 | 0 | 0 | 0 |
| 1006 ⌇ | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | 0 | 0 |

FIG. 10B $$
\begin{array}{|c|c|c|c|c|c|c|}
\hline
W_{1,1} & W_{1,2} & W_{1,3} & W_{1,4} & W_{1,5} & W_{1,6} & W_{1,7} \\
\hline
W_{2,1} & W_{2,2} & W_{2,3} & W_{2,4} & W_{2,5} & W_{2,6} & W_{2,7} \\
\hline
W_{3,1} & W_{3,2} & W_{3,3} & W_{3,4} & W_{3,5} & W_{3,6} & W_{3,7} \\
\hline
W_{4,1} & W_{4,2} & W_{4,3} & W_{4,4} & W_{4,5} & W_{4,6} & W_{4,7} \\
\hline
W_{5,1} & W_{5,2} & W_{5,3} & W_{5,4} & W_{5,5} & W_{5,6} & W_{5,7} \\
\hline
W_{6,1} & W_{6,2} & W_{6,3} & W_{6,4} & W_{6,5} & W_{6,6} & W_{6,7} \\
\hline
W_{7,1} & W_{7,2} & W_{7,3} & W_{7,4} & W_{7,5} & W_{7,6} & W_{7,7} \\
\hline
\end{array}
$$

| | | | | | | | | | | | | | | | | |
|---|---|---|---|---|---|---|---|---|---|---|---|---|---|---|---|---|
| $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{1,11}$ | $X_{1,12}$ | $X_{1,13}$ | $X_{1,14}$ | $X_{1,15}$ | $X_{1,16}$ | ... |
| $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{2,11}$ | $X_{2,12}$ | $X_{2,13}$ | $X_{2,14}$ | $X_{2,15}$ | $X_{2,16}$ | ... |
| $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{3,11}$ | $X_{3,12}$ | $X_{3,13}$ | $X_{3,14}$ | $X_{3,15}$ | $X_{3,16}$ | ... |
| $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{4,11}$ | $X_{4,12}$ | $X_{4,13}$ | $X_{4,14}$ | $X_{4,15}$ | $X_{4,16}$ | ... |
| $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | $X_{5,11}$ | $X_{5,12}$ | $X_{5,13}$ | $X_{5,14}$ | $X_{5,15}$ | $X_{5,16}$ | ... |
| $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | $X_{6,11}$ | $X_{6,12}$ | $X_{6,13}$ | $X_{6,14}$ | $X_{6,15}$ | $X_{6,16}$ | ... |
| $X_{7,1}$ | $X_{7,2}$ | $X_{7,3}$ | $X_{7,4}$ | $X_{7,5}$ | $X_{7,6}$ | $X_{7,7}$ | $X_{7,8}$ | $X_{7,9}$ | $X_{7,10}$ | $X_{7,11}$ | $X_{7,12}$ | $X_{7,13}$ | $X_{7,14}$ | $X_{7,15}$ | $X_{7,16}$ | ... |

⋮

| | | | | | | | | | | | | | | | | |
|---|---|---|---|---|---|---|---|---|---|---|---|---|---|---|---|---|
| $X_{32,1}$ | $X_{32,2}$ | $X_{32,3}$ | $X_{32,4}$ | $X_{32,5}$ | $X_{32,6}$ | $X_{32,7}$ | $X_{32,8}$ | $X_{32,9}$ | $X_{32,10}$ | $X_{32,11}$ | $X_{32,12}$ | $X_{32,13}$ | $X_{32,14}$ | $X_{32,15}$ | $X_{32,16}$ | ... |
| $X_{33,1}$ | $X_{33,2}$ | $X_{33,3}$ | $X_{33,4}$ | $X_{33,5}$ | $X_{33,6}$ | $X_{33,7}$ | $X_{33,8}$ | $X_{33,9}$ | $X_{33,10}$ | $X_{33,11}$ | $X_{33,12}$ | $X_{33,13}$ | $X_{33,14}$ | $X_{33,15}$ | $X_{33,16}$ | ... |
| $X_{34,1}$ | $X_{34,2}$ | $X_{34,3}$ | $X_{34,4}$ | $X_{34,5}$ | $X_{34,6}$ | $X_{34,7}$ | $X_{34,8}$ | $X_{34,9}$ | $X_{34,10}$ | $X_{34,11}$ | $X_{34,12}$ | $X_{34,13}$ | $X_{34,14}$ | $X_{34,15}$ | $X_{34,16}$ | ... |
| $X_{35,1}$ | $X_{35,2}$ | $X_{35,3}$ | $X_{35,4}$ | $X_{35,5}$ | $X_{35,6}$ | $X_{35,7}$ | $X_{35,8}$ | $X_{35,9}$ | $X_{35,10}$ | $X_{35,11}$ | $X_{35,12}$ | $X_{35,13}$ | $X_{35,14}$ | $X_{35,15}$ | $X_{35,16}$ | ... |
| $X_{36,1}$ | $X_{36,2}$ | $X_{36,3}$ | $X_{36,4}$ | $X_{36,5}$ | $X_{36,6}$ | $X_{36,7}$ | $X_{36,8}$ | $X_{36,9}$ | $X_{36,10}$ | $X_{36,11}$ | $X_{36,12}$ | $X_{36,13}$ | $X_{36,14}$ | $X_{36,15}$ | $X_{36,16}$ | ... |
| $X_{37,1}$ | $X_{37,2}$ | $X_{37,3}$ | $X_{37,4}$ | $X_{37,5}$ | $X_{37,6}$ | $X_{37,7}$ | $X_{37,8}$ | $X_{37,9}$ | $X_{37,10}$ | $X_{37,11}$ | $X_{37,12}$ | $X_{37,13}$ | $X_{37,14}$ | $X_{37,15}$ | $X_{37,16}$ | ... |
| $X_{38,1}$ | $X_{38,2}$ | $X_{38,3}$ | $X_{38,4}$ | $X_{38,5}$ | $X_{38,6}$ | $X_{38,7}$ | $X_{38,8}$ | $X_{38,9}$ | $X_{38,10}$ | $X_{38,11}$ | $X_{38,12}$ | $X_{38,13}$ | $X_{38,14}$ | $X_{38,15}$ | $X_{38,16}$ | ... |

| 1201 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1203 | $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{1,11}$ | $X_{1,12}$ | $X_{1,13}$ | $X_{1,14}$ | $X_{1,15}$ | $X_{1,16}$ |
| 1205 | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | $X_{3,11}$ | $X_{3,12}$ | $X_{3,13}$ | $X_{3,14}$ | $X_{3,15}$ | $X_{3,16}$ |
| 1207 | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | $X_{5,11}$ | $X_{5,12}$ | $X_{5,13}$ | $X_{5,14}$ | $X_{5,15}$ | $X_{5,16}$ |
| 1209 | $X_{7,1}$ | $X_{7,2}$ | $X_{7,3}$ | $X_{7,4}$ | $X_{7,5}$ | $X_{7,6}$ | $X_{7,7}$ | $X_{7,8}$ | $X_{7,9}$ | $X_{7,10}$ | $X_{7,11}$ | $X_{7,12}$ | $X_{7,13}$ | $X_{7,14}$ | $X_{7,15}$ | $X_{7,16}$ |

FIG. 12A

| 1202 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1204 | $X_{2,1}$ | $X_{2,2}$ | $X_{2,3}$ | $X_{2,4}$ | $X_{2,5}$ | $X_{2,6}$ | $X_{2,7}$ | $X_{2,8}$ | $X_{2,9}$ | $X_{2,10}$ | $X_{2,11}$ | $X_{2,12}$ | $X_{2,13}$ | $X_{2,14}$ | $X_{2,15}$ | $X_{2,16}$ |
| 1206 | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | $X_{4,11}$ | $X_{4,12}$ | $X_{4,13}$ | $X_{4,14}$ | $X_{4,15}$ | $X_{4,16}$ |
| 1208 | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | $X_{6,11}$ | $X_{6,12}$ | $X_{6,13}$ | $X_{6,14}$ | $X_{6,15}$ | $X_{6,16}$ |
| 1210 | 0 | 0 | 0 | 0 | 0 | 0 | 0 | 0 | 0 | 0 | 0 | 0 | 0 | 0 | 0 | 0 |

FIG. 12B

| 1301 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1303 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 | 0 | 0 | 0 |
| 1305 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 | 0 | 0 |
| 1307 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 | 0 |
| 1309 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 | 0 |
| 1311 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 | 0 |
| 1313 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 | 0 |
| 1315 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 | 0 |
| 1317 | 0 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 | 0 |
| 1319 | 0 | 0 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ | 0 |
| 1321 | 0 | 0 | 0 | 0 | 0 | 0 | 0 | 0 | 0 | $W_{1,1}$ | $W_{1,2}$ | $W_{1,3}$ | $W_{1,4}$ | $W_{1,5}$ | $W_{1,6}$ | $W_{1,7}$ |

FIG. 13A

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1302 |||||||||||||||||
| 1304 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 | 0 | 0 | 0 |
| 1306 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 | 0 | 0 |
| 1308 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 | 0 |
| 1310 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 | 0 |
| 1312 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 | 0 |
| 1314 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 | 0 |
| 1316 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 | 0 |
| 1318 | 0 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 | 0 |
| 1320 | 0 | 0 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ | 0 |
| 1322 | 0 | 0 | 0 | 0 | 0 | 0 | 0 | 0 | 0 | $W_{2,1}$ | $W_{2,2}$ | $W_{2,3}$ | $W_{2,4}$ | $W_{2,5}$ | $W_{2,6}$ | $W_{2,7}$ |

FIG. 13B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1401 | 0 | 1 | 2 | 3 | 4 | 5 | 6 | 7 | 8 | 9 | 10 | 11 | 12 | 13 | 14 | 15 |
| 1403 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 | 0 | 0 | 0 |
| 1405 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 | 0 | 0 |
| 1407 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 | 0 |
| 1409 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 | 0 |
| 1411 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 | 0 |
| 1413 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 | 0 |
| 1415 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 | 0 |
| 1417 | 0 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 | 0 |
| 1419 | 0 | 0 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ | 0 |
| 1421 | 0 | 0 | 0 | 0 | 0 | 0 | 0 | 0 | 0 | $W_{3,1}$ | $W_{3,2}$ | $W_{3,3}$ | $W_{3,4}$ | $W_{3,5}$ | $W_{3,6}$ | $W_{3,7}$ |

FIG. 14A

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1402 | | | | | | | | | | | | | | | | |
| 1404 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 | 0 | 0 | 0 |
| 1406 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 | 0 | 0 |
| 1408 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 | 0 |
| 1410 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 | 0 |
| 1412 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 | 0 |
| 1414 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 | 0 |
| 1416 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 | 0 |
| 1418 | 0 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 | 0 |
| 1420 | 0 | 0 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ | 0 |
| 1422 | 0 | 0 | 0 | 0 | 0 | 0 | 0 | 0 | 0 | $W_{4,1}$ | $W_{4,2}$ | $W_{4,3}$ | $W_{4,4}$ | $W_{4,5}$ | $W_{4,6}$ | $W_{4,7}$ |

FIG. 14B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1501 | 0 | 1 | 2 | 3 | 4 | 5 | 6 | 7 | 8 | 9 | 10 | 11 | 12 | 13 | 14 | 15 |
| 1503 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 | 0 | 0 | 0 | 0 | 0 | 0 |
| 1505 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 | 0 | 0 | 0 | 0 | 0 |
| 1507 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 | 0 | 0 | 0 | 0 |
| 1509 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 | 0 | 0 | 0 |
| 1511 | 0 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 | 0 | 0 |
| 1513 | 0 | 0 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 | 0 |
| 1515 | 0 | 0 | 0 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 | 0 |
| 1517 | 0 | 0 | 0 | 0 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 | 0 |
| 1519 | 0 | 0 | 0 | 0 | 0 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ | 0 |
| 1521 | 0 | 0 | 0 | 0 | 0 | 0 | 0 | 0 | 0 | $W_{5,1}$ | $W_{5,2}$ | $W_{5,3}$ | $W_{5,4}$ | $W_{5,5}$ | $W_{5,6}$ | $W_{5,7}$ |

FIG. 15A

| 1502 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1504 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 | 0 | 0 | 0 |
| 1506 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 | 0 | 0 |
| 1508 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 | 0 |
| 1510 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 | 0 |
| 1512 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 | 0 |
| 1514 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 | 0 |
| 1516 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 | 0 |
| 1518 | 0 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 | 0 |
| 1520 | 0 | 0 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ | 0 |
| 1522 | 0 | 0 | 0 | 0 | 0 | 0 | 0 | 0 | 0 | $W_{8,1}$ | $W_{8,2}$ | $W_{8,3}$ | $W_{8,4}$ | $W_{8,5}$ | $W_{8,6}$ | $W_{8,7}$ |

FIG. 15B

| 1601 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1603 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 | 0 | 0 | 0 |
| 1605 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 | 0 | 0 |
| 1607 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 | 0 |
| 1609 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 | 0 |
| 1611 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 | 0 |
| 1613 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 | 0 |
| 1615 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 | 0 |
| 1617 | 0 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 | 0 |
| 1619 | 0 | 0 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ | 0 |
| 1621 | 0 | 0 | 0 | 0 | 0 | 0 | 0 | 0 | 0 | $W_{7,1}$ | $W_{7,2}$ | $W_{7,3}$ | $W_{7,4}$ | $W_{7,5}$ | $W_{7,6}$ | $W_{7,7}$ |

FIG. 16A

| 1602 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 1604 | 0 | 0 | 0 | 0 | 0 | 0 | 0 | 0 | 0 | 0 | 0 | 0 | 0 | 0 | 0 | 0 |
| 1606 | 0 | 0 | 0 | 0 | 0 | 0 | 0 | 0 | 0 | 0 | 0 | 0 | 0 | 0 | 0 | 0 |
| 1608 | 0 | 0 | 0 | 0 | 0 | 0 | 0 | 0 | 0 | 0 | 0 | 0 | 0 | 0 | 0 | 0 |
| 1610 | 0 | 0 | 0 | 0 | 0 | 0 | 0 | 0 | 0 | 0 | 0 | 0 | 0 | 0 | 0 | 0 |
| 1612 | 0 | 0 | 0 | 0 | 0 | 0 | 0 | 0 | 0 | 0 | 0 | 0 | 0 | 0 | 0 | 0 |
| 1614 | 0 | 0 | 0 | 0 | 0 | 0 | 0 | 0 | 0 | 0 | 0 | 0 | 0 | 0 | 0 | 0 |
| 1616 | 0 | 0 | 0 | 0 | 0 | 0 | 0 | 0 | 0 | 0 | 0 | 0 | 0 | 0 | 0 | 0 |
| 1618 | 0 | 0 | 0 | 0 | 0 | 0 | 0 | 0 | 0 | 0 | 0 | 0 | 0 | 0 | 0 | 0 |
| 1620 | 0 | 0 | 0 | 0 | 0 | 0 | 0 | 0 | 0 | 0 | 0 | 0 | 0 | 0 | 0 | 0 |
| 1622 | 0 | 0 | 0 | 0 | 0 | 0 | 0 | 0 | 0 | 0 | 0 | 0 | 0 | 0 | 0 | 0 |

MEMORY ORGANIZATION FOR MATRIX PROCESSING

BACKGROUND OF THE INVENTION

A whole class of complex artificial intelligence problems can be solved using neural networks. Since these problems are often computationally and data intensive, hardware solutions are often beneficial for improving the performance of neural networks. The solutions to artificial intelligence problems can often be more quickly solved using hardware-based solutions that optimize the performance of convolution operations and in particular depthwise convolution operations. It is a technical challenge to create a hardware platform compatible with solving different matrix operations while also significantly improving the performance and efficiency for solving convolution operations. Therefore, there exists a need for a data path and memory organization scheme that is compatible with processing hardware to efficiently compute convolution operations needed for solving complex artificial intelligence problems without introducing significant complexity and restrictions.

BRIEF DESCRIPTION OF THE DRAWINGS

Various embodiments of the invention are disclosed in the following detailed description and the accompanying drawings.

FIGS. 7A and 7B are diagrams illustrating example matrix operands for performing depthwise convolution.

FIGS. 8A and 8B are diagrams illustrating an example of an unrolled data matrix for performing depthwise convolution.

FIGS. 9A and 9B are diagrams illustrating an example of an unrolled weight matrix for performing depthwise convolution.

FIGS. 10A and 10B are diagrams illustrating an example of vector computations for performing depthwise convolution.

FIGS. 11A and 11B are diagrams illustrating example matrix operands for performing depthwise convolution.

FIGS. 12A and 12B are diagrams illustrating an example of a partially unrolled data matrix for performing depthwise convolution.

FIGS. 13A and 13B are diagrams illustrating an example of a partially unrolled weight matrix for performing depthwise convolution.

FIGS. 14A and 14B are diagrams illustrating an example of a partially unrolled weight matrix for performing depthwise convolution.

FIGS. 15A and 15B are diagrams illustrating an example of a partially unrolled weight matrix for performing depthwise convolution.

FIGS. 16A and 16B are diagrams illustrating an example of a partially unrolled weight matrix for performing depthwise convolution.

DETAILED DESCRIPTION

Figure 1:
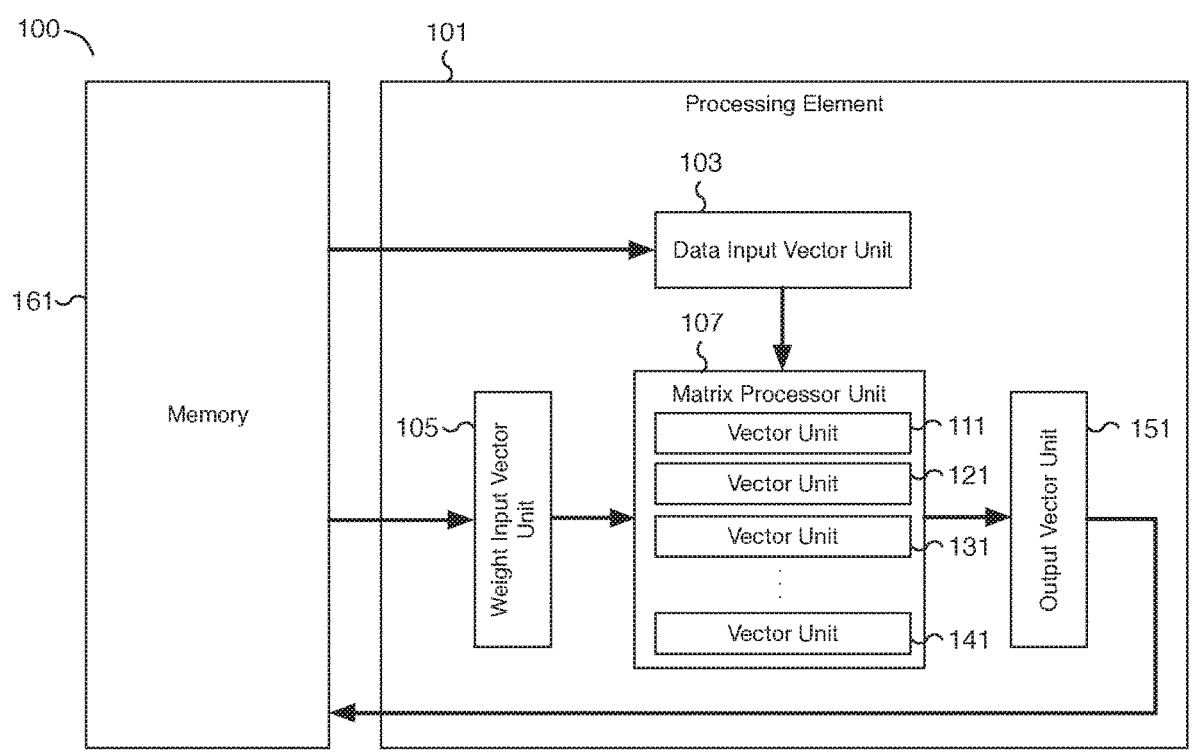
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for improving the efficiency and performance of convolution operations using the described memory organization techniques is disclosed. By applying the disclosed memory organization and related pipeline approaches, matrix operations can be unrolled along two-dimensions with significant performance improvements. For example, in some embodiments, a 6× to 9× improvement for convolution operations can be achieved for two-dimensional depthwise convolution operations. In various embodiments, the matrix elements of a depthwise convolution are efficiently loaded into a matrix processor unit. For example, the elements of a data or activation matrix are loaded into a matrix processor unit using a layout that optimizes the vector unit operations of the matrix processor unit. Each vector unit receives a linearized three-dimensional data and weight matrix slice for performing a vector operation such as a dot product operation. In some embodiments, a large data matrix may be sliced into smaller sub-matrices or matrix slices that are suitable for the matrix processor unit. Partial results from the sub-matrices are later merged to determine a convolution result.

In some embodiments, a linearized three-dimensional data matrix slice is prepared by creating overlapping subgroups from elements identified from the data matrix. For example, overlapping subgroups are created using elements from a portion of a matrix row and include elements that overlap with elements from one or more neighboring subgroups. For a particular matrix row, the end of one subgroup may overlap in elements with the start of the next subgroup. The overlapping subgroups are then distributed into a staging memory unit. For example, subgroups corresponding to each row of a data matrix are stored together in a staging memory location. Once distributed into the staging memory location, the subgroups are read out using a circular shifted pattern and distributed to a set of memory banks. The circular shifted pattern allows the subgroups to be later read from the memory banks using a diagonal access pattern. In various embodiments, subgroups distributed across different memory banks and can be retrieved in parallel since each memory bank can be read independently.

In some embodiments, an output organizer unit reads a set of subgroups out of the memory banks into a storage location such as a circular bank shifter. For example, four subgroups can be read from four different memory banks in a single cycle and written into a circular bank shifter. As another example, two new subgroups can be read from two different memory banks in a single cycle and written into the circular bank shifter to replace two expired subgroups that are no longer needed. The subgroups are then arranged in transpose order. In some embodiments, newly read subgroups are shifted to the end of the circular bank shifter to ensure the subgroups are arranged in transpose order. For example, after two new subgroups are read, two circular shifts are performed to reorder the newly read subgroups with respect to previously read subgroups. In some embodiments, one of more input vectors are created using a series of subgroups selected from the circular bank shifter. For example, the first three subgroups from the circular bank shifter are selected to create a one-dimensional data input vector for a matrix processor unit. As another example, starting with the second subgroup, three subgroups are selected to create a second one-dimensional data input vector for the matrix processor unit. In various embodiments, each linearized input vector is a linearized three-dimensional data matrix slice that can be fed to a vector unit of a matrix processor unit as a vector argument to determine a partial convolution result.

In some embodiments, a system comprises a memory, a plurality of memory banks, and an organizer. The memory is configured to store elements of a matrix. For example, the elements of a matrix (or a slice of a larger matrix) used for performing matrix operations related to neural network convolution operations are stored in the memory prior to performing transpose related operations. The elements of the matrix are distributed into overlapping subgroups and each of the overlapping subgroups shares at least one element of the matrix with another overlapping subgroup in the overlapping subgroups. For example, a subgroup made up of a group of elements from the same row may include overlapping elements from columns at the left and/or the right ends of the subgroup. In some embodiments, the number of overlapping elements at each end of the subgroup is based on the size of a corresponding convolution filter. For example, a 3×3 convolution filter may utilize two overlapping matrix elements on one or both ends of the subgroup. By arranging the elements into overlapping subgroups, the efficiency of matrix operations is significantly improved in part by efficiently populating input vectors into a matrix processor unit of a processing element.

In some embodiments, the plurality of memory banks is configured to store the overlapping subgroups, wherein the overlapping subgroups are distributed among the memory banks using a circular shifted pattern. For example, the overlapping subgroups stored in memory are loaded into the memory banks, such as a group of four memory banks, by writing one subgroup into each memory bank. In various embodiments, the use of multiple memory banks allows multiple subgroups to be written in parallel. The next set of subgroups is loaded into the memory banks by applying a circular shifted pattern. For example, in some embodiments, the first four subgroups are loaded into banks 0, 1, 2, and 3, respectively. After a circular shift, the next four subgroups are loaded into banks 1, 2, 3, and 0, respectively. After another circular shift, the next four subgroups are loaded into banks 2, 3, 0, and 1, respectively, and so forth. In various embodiments, the circular shift pattern may be implemented using a circular bank shifter such as a right (or left) circular bank shifter.

In some embodiments, the organizer is configured to read specific ones of the overlapping subgroups in the plurality of memory banks in a specified pattern associated with transposing the matrix. For example, the subgroups loaded in the memory banks are read out in a pattern associated with the transpose of the matrix version stored in the memory. In some embodiments, the read pattern is implemented by reading out different subgroups from different memory banks using a different read pointer associated with each memory bank. For example, subgroups can be read from different relative locations for each memory bank by referencing the source location of the memory bank using a memory bank specific read pointer. Each read pointer may point to a different depth (or location) for its corresponding memory bank. For example, in the event there are a group of four memory banks, the subgroup at depth 0 is read from bank 0, the subgroup at depth 1 is read from bank 1, the subgroup at depth 2 is read from bank 2, and the subgroup at depth 3 read from bank 3. The read pointers for each bank are updated such that on a subsequent read, the subgroup at depth 4 is read from bank 0, the subgroup at depth 5 is read from bank 1, the subgroup at depth 6 is read from bank 2, and the subgroup at depth 7 read from bank 3. In various embodiments, the depth for each read from each bank is referenced by its own read pointer.

In some embodiments, once a group of subgroups has been read from the memory banks, the read subgroups are used to create a linearized data input vector. Each linearized data input vector can be fed as an argument to a matrix processor unit along with a corresponding weight input vector. For example, one or more data input vectors can be linearized from the subgroups read from the memory banks. Each data input vector may correspond to one or more rows of a matrix slice sized to be compatible with a corresponding convolution filter formatted as a weight input vector. In some embodiments, once processing for one or more subgroups is completed and the corresponding subgroup(s) are no longer needed, a reverse circular shift is performed to make room for new subgroups that are read from the memory banks.

In some embodiments, the processor system such as a processing element includes a matrix processor unit capable of performing matrix operations on two input matrices. The matrix processor unit includes a plurality of calculation units such as vector units used to process input vectors of the input matrices. In various embodiments, a calculation unit includes at least a vector multiply unit and a vector adder unit. The vector multiply unit is capable of performing multiply operations using corresponding elements of two input vectors. In some embodiments, the vector adder unit is used to sum the vector of multiplication results computed using a vector multiply unit. For example, the vector adder unit can be used to compute the dot product result of two vectors using the vector multiplication results of vector elements from corresponding input vectors. In some embodiments, the vector adder unit is an adder tree. For example, an adder tree computes the sum of the multiplication results by summing multiplication results and subsequent partial sums in parallel.

In various embodiments, the matrix processor unit is used to compute the result of a convolution operation such as a depthwise convolution of two input matrices, such as a weight input and a data input matrix, by unrolling the input matrices. For example, a weight matrix is unrolled by starting with a two-dimensional matrix and unrolling multiple rows into a single row formatted as a vector. A 3×3 matrix may be unrolled into a single vector and may include padding, such as zero elements, between rows. In some embodiments, a weight matrix may be partially unrolled and require multiple iterations of unrolling to completely unroll the entire matrix. For example, a 5×5, 7×7, and/or 9×9 matrix may be unrolled using two or more iterations, wherein each iteration involves unrolling two or more rows. As an example, in some embodiments, a 7×7 matrix is unrolled over four iterations. The first iteration unrolls rows 1 and 2 of the 7×7 matrix, the second iteration unrolls rows 3 and 4 of the 7×7 matrix, the third iteration unrolls rows 5 and 6 of the 7×7 matrix, and the fourth iteration unrolls row 7 of the 7×7 matrix. In various embodiments, a different number of iterations may be used depending on the size of the input matrices, the number of rows unrolled for each interaction, and the matrix processor unit vector size capabilities. Concurrently with unrolling the weight input matrix, the data input matrix is also unrolled. In various embodiments, the corresponding rows of the data input matrix are unrolled over the same number of iterations and each unrolling is formatted to align the elements of the vector input data with the corresponding elements from the weight input data. The input vectors are processed using the matrix processor unit to compute a result sum. In some embodiments, the result sum is a partial (or intermediate) sum and is accumulated with partial (or intermediate) sums computed from each iteration.

In various embodiments, the elements of the unrolled weight vector are shifted, for example, during an iteration, to compute at least a partial convolution result of the weight vector with the next column of corresponding data input elements. For example, the elements of the unrolled weight input vector may be shifted by one row element to align the weight vector elements with the corresponding next column of the unrolled data input vector. In some embodiments, the number of shifts performed during an iteration corresponds to the amount of padding between the rows of the weight input vector. For example, in the event seven zero-padded elements separate each unrolled row from the weight input matrix, after an initial set of matrix computation operations are performed, seven shifts and corresponding matrix computation operations may be performed before progressing to the next iteration. In various embodiments, the unrolled weight input vector may be broadcasted to each of the vector calculation units to compute the vector result for multiple rows in parallel. In some embodiments, multiple matrix processor units may be utilized and different matrix processor units may compute the partial sums of different iterations of the same input matrices in parallel. The partial sum results from each matrix processor unit may be combined to compute a result sum. For example, in some embodiments, multiple processing elements, each with a matrix processor unit, may work in parallel.

In some embodiments, a processor system includes a matrix processor unit, a first type of register, a group of a second type of registers, and a plurality of calculation units. The processor system may be utilized to perform highly efficient convolution operations such as depthwise convolution operations without requiring complex memory organization schemes. In some embodiments, the first type of register is configured to concurrently store values of a plurality of different rows of a first matrix. For example, the first matrix may be a weight matrix used for performing one or more depthwise convolutions. In various embodiments, at least a portion of the first type of register is logically divided into groups of elements, and each of the groups corresponds to a different row of the first matrix. For example, a 3×3 weight matrix may be divided into three row groups, each row group corresponding to a different row of the 3×3 weight matrix. The first type of register may be divided into as many as three groups, where each group corresponds to a different row group of the 3×3 weight matrix. As another example, a 7×7 weight matrix may be divided into seven row groups and the first type of register may be divided into as many as seven groups, where each group corresponds to a different row group of the 7×7 weight matrix. In some embodiments, the first type of register may be divided into fewer groups than the number of rows of the first matrix. For example, in some embodiments, the first type of register may be divided into as few as two groups, each group corresponding to at most a pair of rows of the first matrix, such as one or two rows of a 7×7 weight matrix. In some embodiments, each of the second type of registers is configured to concurrently store values from a plurality of different rows of a second matrix. For example, the second matrix may be a data input matrix used as an argument for one or more convolution operations. The data of the data input matrix may correspond to image data, video data, user data, intermediate neural network data results, etc. In various embodiments, a depthwise convolution is performed using the first and second matrices. For example, the first matrix may be a weight input matrix and the second matrix may be a data input matrix. In some embodiments, each of the plurality of calculation units corresponds to one of the second type of registers. For example, each of the calculation units may correspond to a vector of data input elements stored in one of the second type of registers. In various embodiments, each calculation unit is a vector calculation unit. For example, the matrix processor unit includes multiple vector calculation units for computing matrix operations. In some embodiments, each of the calculation units is configured to multiply each value stored in the first type of register with a corresponding value stored in the corresponding one of the second type of registers and sum together the multiplication results of the corresponding calculation unit. For example, for each calculation unit, an element stored in the first type of register is multiplied with a corresponding element of one of the second type of registers to create a vector of multiplication results. The multiplication results are summed together to determine an output result. In some embodiments, the output result is a dot product and the result of the calculation units is a vector of output results. In some embodiments, the vector output results may be used to at least in part determine a result of multiplying the first matrix and at least a portion of the second matrix. For example, successive accumulation of vector output results may be used to determine the result of multiplying a weight input matrix with a data input matrix. In some embodiments, the vector output results may be used to at least in part determine a corresponding element in a result matrix of convoluting the second matrix with the first matrix. For example, successive accumulation of vector output results may be used to determine the result of a depthwise convolution using a weight input matrix with a data input matrix.

FIG. 1 is a block diagram illustrating an embodiment of a system for solving artificial intelligence problems using a neural network. In the example shown, system 100 includes processing element 101 and memory 161. Processing element 101 includes data input vector unit 103, weight input vector unit 105, matrix processor unit 107, and output vector unit 151. Matrix processor unit 107 includes multiple vector units including at least vector units 111, 121, 131, and 141. In various embodiments, matrix processor unit 107 receives one or more data input vectors (not shown) from data input vector unit 103 and at least one weight input vector (not shown) from weight input vector unit 105. For example, a data input vector is generated by data input vector unit 103 and a weight input vector is generated by weight input vector unit 105. The generated data input vector and weight input vector pair may be passed as arguments to a vector unit, such as one of vector units 111, 121, 131, and 141, of matrix processor unit 107. For example, the vector unit of matrix processor unit 107 may determine a matrix result, such as a dot product result, using the data input vector and weight input vector pair. In some embodiments, matrix processor unit 107 includes 32 vector units. Each vector unit may take two 32-element vectors as arguments and can each produce a single element result. Taken across all vector units, the results are an output vector result. In various embodiments, the output of matrix processor unit 107 can be an output vector and is received at output vector unit 151. In some embodiments, the output vector is determined by accumulating partial vector results across multiple vector unit operations. In some embodiments, the output vector received at output vector unit 151 is a 32-element vector. Other vector lengths may be utilized as appropriate. Similarly, the size of the elements processed by system 100 can be configured as appropriate. For example, elements may be 4-bits, 8-bits, 2-byte, 4-bytes, or another appropriate size.

In various embodiments, matrix processor unit 107 is configured to receive two input matrices, each matrix a two-dimensional matrix via data input vector unit 103 and weight input vector unit 105, respectively. Data input vector unit 103, weight input vector unit 105, and output vector unit 151 may be implemented using hardware registers, such as flip-flop circuits, for transferring multiple input and output elements to/from matrix processor unit 107. In some embodiments, elements corresponding to each data input vector are retrieved from memory 161 and loaded into a corresponding vector unit, such as vector units 111, 121, 131, or 141, of matrix processor unit 107 via data input vector unit 103. For example, a matrix processor unit with 32 vector units is loaded with 32 vectors of data elements via data input vector unit 103. Correspondingly, a vector of weight elements may be loaded from memory 161 via weight input vector unit 105 and broadcasted to all the applicable vector units of matrix processor unit 107. By broadcasting the same weight input vector using unit weight input vector unit 105 to all vector units of matrix processor unit 107, the same weight values can be applied to different data vectors by the matrix processor unit and each respective vector unit. In some embodiments, data input vector unit 103, weight input vector unit 105, and/or output vector unit 151 may process more than one input/output vector simultaneously. In various embodiments, the thick arrows of FIG. 1 represent the direction data moves through the components of system 100. For example, the arrows may correspond to multi-element wide communication/data buses and/or data lines. In various embodiments, an output vector result received at output vector unit 151 can be written back to memory 161.

In various embodiments, each vector unit of matrix processor unit 107, such as vector units 111, 121, 131, or 141, receives two vector operands and can perform one or more vector operations. For example, a vector unit can compute the dot product of the two input operands and output the result as one element of an output vector to output vector unit 151. In some embodiments, the vector unit result is accumulated and used as an operand to a subsequent operation performed by the vector unit. In some embodiments, each vector unit of matrix processor unit 107, such as vector units 111, 121, 131, or 141, includes both a multiply unit and an adder unit (not shown). In some embodiments, each vector unit of matrix processor unit 107 may include a vector accumulator (not shown), for example, for storing partial results between vector operations.

Using the disclosed techniques, system 100 and in particular matrix processor unit 107 can be utilized to efficiently perform depthwise convolution operations for solving artificial intelligence problems using a neural network. Two-dimensional matrix operands may be unrolled and formatted into input vectors via data input vector unit 103 and/or weight input vector unit 105. The input vectors can be used to implement depthwise convolution using the vector units, such as vector units 111, 121, 131, or 141, of a matrix processor unit 107. In some embodiments, an input vector unit, such as weight input vector unit 105, includes logic for efficiently shifting elements within the input vector. For example, the elements can be shifted to the right by one position. In various embodiments, the shifting logic/circuit may be configured to shift the elements right (or left) and by different numbers of positions. In some embodiments, the elements loop around when shifted past the start or end of the input vector and/or may be replaced with a default value such as a zero padding element. In some embodiments, an input vector unit, such as data input vector unit 103, includes logic for efficiently retrieving data elements from memory 161 and formatting the elements in a linearized order for matrix processor unit 107. For example, data input vector unit 103 can include logic for efficiently formatting a matrix (or matrix slice) of data elements using a pattern associated with transposing the matrix (or matrix slice). Once the formatting pattern is applied, the elements can be linearized into a data input vector and passed as an operand to a vector unit of matrix processor unit 107.

Figure 2:
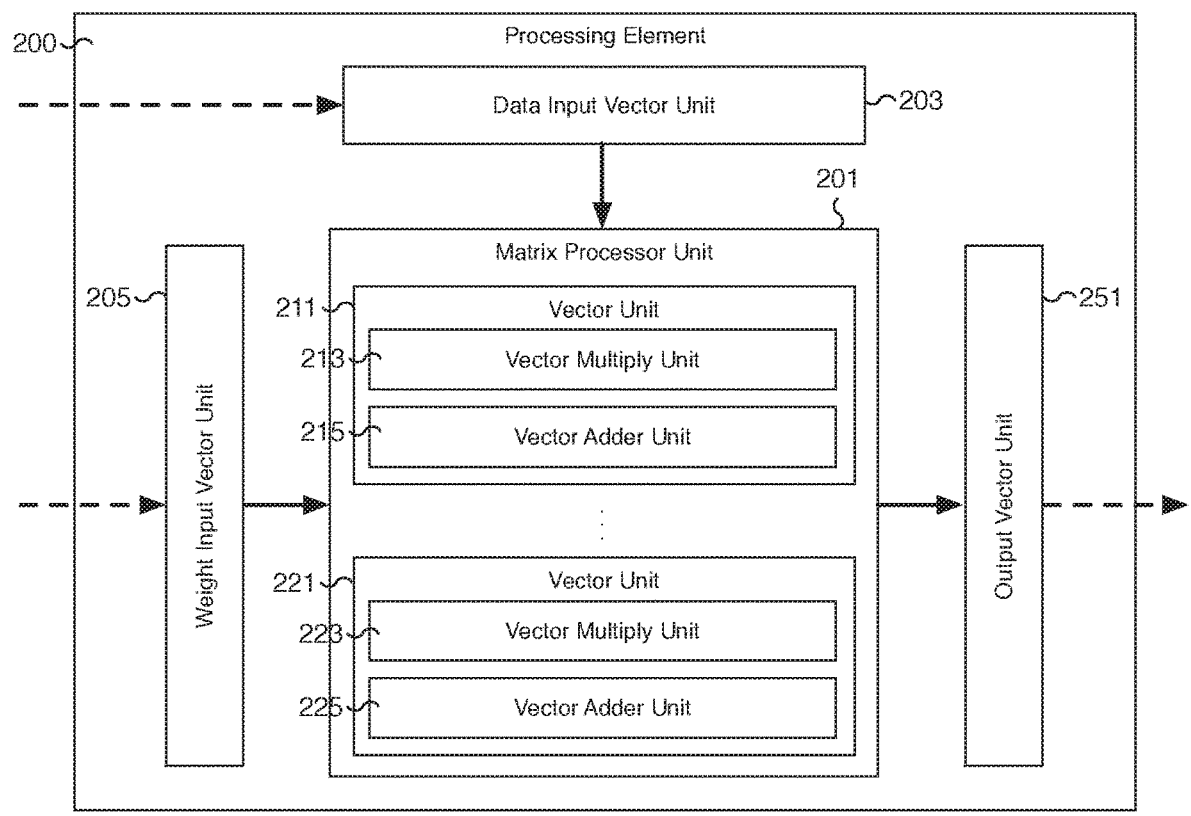
FIG. 2 is a block diagram illustrating an embodiment of a processor system for solving artificial intelligence problems using a neural network.

FIG. 2 is a block diagram illustrating an embodiment of a processor system for solving artificial intelligence problems using a neural network. In the example shown, processing element 200 includes matrix processor unit 201, data input vector unit 203, weight input vector unit 205, and output vector unit 251. Matrix processor unit 201 includes multiple vector units including at least vector units 211 and 221. Each vector unit includes at least a vector multiply unit and a vector adder unit. For example, vector unit 211 includes vector multiply unit 213 and vector adder unit 215. And vector unit 221 includes vector multiply unit 223 and vector adder unit 225. In various embodiments, matrix processor unit 201 includes the number of vector units to match the number of elements in a weight input vector generated by weight input vector unit 205. In various embodiments, matrix processor unit 201 is configured to receive two input matrices, each matrix a two-dimensional matrix via data input vector unit 203 and weight input vector unit 205, respectively, and output a matrix result to output vector unit 251. In some embodiments, processing element 200 is processing element 101 of FIG. 1 and matrix processor unit 201, data input vector unit 203, weight input vector unit 205, and output vector unit 251 are matrix processor unit 107, data input vector unit 103, weight input vector unit 105, and output vector unit 151, respectively, of FIG. 1. In some embodiments, vector units 211 and 221 are each one of vector units 111, 121, 131, or 141 of FIG. 1. In some embodiments, processing elements, such as processing element 200, and multiple matrix processor units, such as matrix processor unit 201, may be utilized in parallel for increased performance. For example, one processing element and its matrix processor unit can be used to process one slice of a large matrix and another processing element and its matrix processor unit can be used to process a separate slice of the same matrix.

In some embodiments, data input vector unit 203 is used to load a vector operand into matrix processor unit 201. For example, data corresponding to at least a portion of a two-dimensional matrix can be read from memory and processed by data input vector unit 203 before being loaded into matrix processor unit 201. In various embodiments, the data input vector operand generated by data input vector unit 203 may be directed to any one of the vector units of matrix processor unit 201, such as vector multiply unit 213 or 223. For example, in some embodiments, matrix processor unit 201 includes 32 vector units. Over 32 cycles, 32 vector operands can be loaded into matrix processor unit 201 via data input vector unit 203. For each cycle, one data input vector operand is generated by data input vector unit 203 and then loaded into one of the 32 vector units. After 32 cycles, all 32 vector units have received a data input vector operand. In some embodiments, multiple data input vectors can be generated and loaded each cycle. For example, four data input vectors can be generated in parallel to load 32 vector units in 8 cycles. Similarly, weight input vector unit 205 is used to load a second vector operand into matrix processor unit 201. For example, weight data corresponding to at least a portion of a two-dimensional weight matrix can be read from memory and processed by weight input vector unit 205 before being loaded into matrix processor unit 201. In various embodiments, the weight input vector operand generated by weight input vector unit 205 may be directed to any one or all of the vector units of matrix processor unit 201, such as vector multiply unit 213 or 223. For example, the same weight input vector operand can be broadcasted to all vector units of matrix processor unit 201. This allows the same weight data to be applied to each data input vector operand. In some embodiments, data input vector unit 203 can be used to similarly broadcast a vector operand to all vector units.

In some embodiments, the number of cycles required to load a vector operand from memory via data input vector unit 203 and/or weight input vector unit 205 into matrix processor unit 201 is based on the utilization of the matrix processor unit. For example, to keep the matrix processor near full utilization, data arguments for the vector units are retrieved from memory and prepared over a time period (e.g., a certain number of cycles) that closely matches the compute utilization of the vector units. By matching the load and compute times, the matrix processor can be kept near full utilization. In some embodiments, data read times are reduced, for example, by increasing the bus speed, to better match the load and compute times. For example, in various embodiments, matrix processor unit 201 may take approximately eight clock cycles to complete a certain set of computations. (An example of a set of computations might include applying eight different weight input vectors to a set of data input vectors.) A read rate of one vector operand per cycle would require at least 32 cycles to load all vector units. Increasing the read rate by a factor of four allows all 32 vector operands to be loaded in approximately 8 cycles, matching the processing compute time of the matrix processor unit. In various embodiments, by matching the data read speed, for example, the data bus speed used to load vector operands, with matrix processor unit compute performance and workload, the overall efficiency and throughput of the matrix processor unit is significantly increased. In some embodiments, the data read speed is at least in part increased using the techniques disclosed herein. For example, multiple data input vectors may be generated in parallel to multiply to overall effective data read speed. In some embodiments, data input vector unit 203 may process multiple data input vectors in parallel to reduce the number of cycles required to load a corresponding data input vector to all of the vector units of matrix processor unit 201.

In some embodiments, data input vector unit 203 and/or weight input vector unit 205 includes shifting hardware (not shown) to shift the elements of the vector operands. For example, weight input vector unit 205 can be loaded with a vector operand that is used for a first iteration. During a second iteration, the vector operand is shifted by one or more positions (to the right or left) as appropriate. The newly shifted vector operand can be used for matrix computation. Once matrix computation is completed, the vector operand can be shifted again and the newly shifted vector operand can be used for the next iteration. In this manner, a new vector operand (determined by shifting the contents of the input vector) is applied during each iteration. For example, in some embodiments, the shifting logic is utilized on an unrolled matrix operand, such as an unrolled weight matrix, to align the unrolled matrix operand with appropriate elements from a second matrix operand, such as an unrolled data matrix.

In some embodiments, matrix processor unit 201 includes multiple vector units that each include a vector multiply and vector adder unit. Each vector multiply unit, such as vector multiply unit 213 or 223, is configured to multiply corresponding elements received via data input vector unit 203 and weight input vector unit 205. In some embodiments, the result is a vector of multiplication results. For example, for two 32-byte input vectors, the result of a vector multiply unit is a vector of 32 multiplication results. The first element of a data input vector from data input vector unit 203 is multiplied with the first element of a weight input vector from weight input vector unit 205. Similarly, the second element of a data input vector is multiplied with the second element of a weight input vector. In various embodiments, corresponding elements from a data input vector generated by data input vector unit 203 and a weight input vector generated by weight input vector unit 205 are multiplied in parallel. In various embodiments, the vector of multiplication results is passed to a vector adder unit of the vector unit. For example, vector multiply unit 213 passes its multiplication results to vector adder unit 215 and vector multiply unit 223 passes its multiplication results to vector adder unit 225.

In some embodiments, each vector adder unit, such as vector adder unit 215 or 225, is configured to compute the sum of the elements from an input vector. For example, the sum of each of the elements from a vector of multiplication results computed by vector multiply unit 213 is computed by vector adder unit 215. Similarly, the sum of each of the elements from a vector of multiplication results computed by vector multiply unit 223 is computed by vector adder unit 225. In some embodiments, the result of a vector adder unit is a dot product of the vectors used as input to the corresponding vector multiply unit. In various embodiments, each vector adder unit, such as vector adder unit 215 or 225, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple dot products in parallel, significantly improving the throughput of matrix and convolution operations.

In some embodiments, matrix processor unit 201 includes one or more accumulators, for example, to accumulate the results of each vector unit. In some embodiments, an accumulator is included as part of a vector unit or as part of matrix processor unit 201 as appropriate. The accumulator(s) can be used to sum the results computed across multiple iterations of the vector units. For example, the final result sum of one iteration of a vector unit can be stored in an accumulator and added to the final result sum of the next iteration of the vector unit. In some embodiments, the accumulator is a vector accumulator. For example, the accumulator may be sized based on the size of the output vector received by output vector unit 251. In various embodiments, once matrix processing is complete, the accumulator results may be pushed to output vector unit 251.

Figure 3:
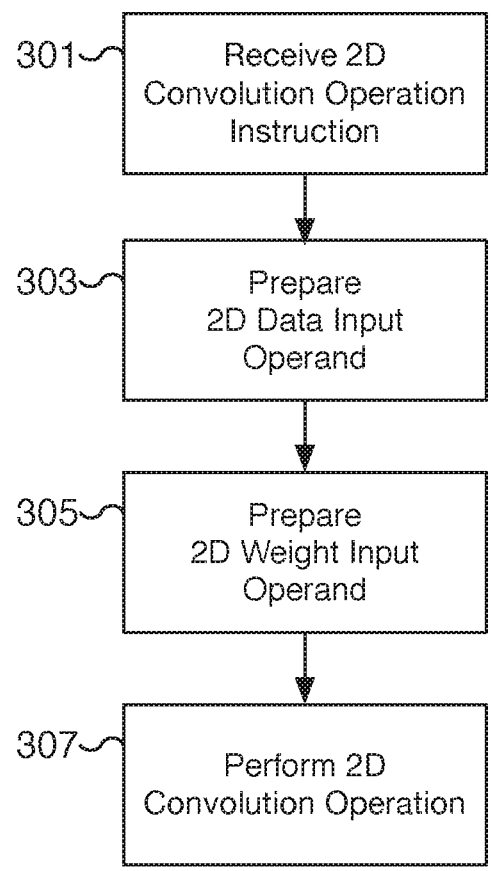
FIG. 3 is a flow chart illustrating an embodiment of a process for performing a two-dimensional convolution operation using a matrix processor unit.

FIG. 3 is a flow chart illustrating an embodiment of a process for performing a two-dimensional convolution operation using a matrix processor unit. For example, an artificial intelligence problem is solved using a neural network in part by analyzing one or more layers of a neural network by solving one or more two-dimensional convolution operations. The appropriate two-dimensional convolution operations may be initiated by issuing one or more two-dimensional convolution operation instructions to one or more matrix processor units. Each instruction may indicate two operand matrices, for example, by specifying the location of each matrix operand in memory, in a register, or in another appropriate location. In some embodiments, the instruction corresponds to a depthwise convolution using a data (or activation) matrix and a weight matrix. In some embodiments, the convolution operation is performed using matrix processor unit 107 of FIG. 1 and/or matrix processor unit 201 of FIG. 2.

At 301, a two-dimensional convolution operation instruction is received. For example, an instruction is received by a processor element such as a processor element that includes a matrix processor unit, input vector registers, an output vector register, local memory, a control logic unit, a transpose logic unit, and/or a data joiner unit, among others components. In various embodiments, the processor element may include additional or fewer components in addition to the matrix processor unit. The received two-dimensional convolution operation instruction directs the processor element to perform a two-dimensional convolution operation and specifies two matrix operands. For example, a first operand may be a two-dimensional data matrix and a second operand may be a weight matrix. In some embodiments, the matrix operands may be too large for loading into the matrix processor unit without first splitting one or more of the matrix operands into smaller matrix slices.

At 303, a two-dimensional data input operand is prepared. For example, a two-dimensional data matrix is prepared as an operand for a convolution operation. In some embodiments, data corresponding to the two-dimensional data input operand is retrieved from memory or another location. The retrieved data may be certain rows and/or columns of the data input operand. For example, different slices of the data input operand may be prepared separately and/or may be prepared in parallel by different processing elements. In various embodiments, the preparation may include unrolling portions of the two-dimensional data input operand. For example, the specified portions of the data input matrix may be linearized into a vector. In some embodiments, only a portion of the matrix or matrix slice is linearized, for example, only a subset of the rows. In unrolling and linearizing the selected portions of the matrix, the rows may be separated by padding elements, such as zero elements, to at least in part align the selected matrix elements with corresponding elements from the weight input operand. In various embodiments, the prepared data input operand is loaded into a vector unit of a matrix processor unit. Depending on the input operand, additional portions of the matrix are unrolled, linearized, and loaded into the matrix processor unit. For example, a vector corresponding to a different (and possibly overlapping) portion of the two-dimensional data input operand is unrolled, linearized, and loaded into each vector unit of the matrix processor unit. In some embodiments, the prepared data input operands are loaded using a data input vector unit such as data input vector unit 103 of FIG. 1 and/or data input vector unit 203 of FIG. 2.

At 305, a two-dimensional weight input operand is prepared. For example, a two-dimensional weight matrix is prepared as a second operand for a convolution operation. In some embodiments, data corresponding to the two-dimensional weight input operand is retrieved from memory or another location. The retrieved weight data may be certain rows and/or columns of the weight input operand. For example, different slices of the weight input operand may be prepared separately and/or may be prepared in parallel by different processing elements. In various embodiments, the preparation may include unrolling portions of the two-dimensional weight input operand. For example, the specified portions of the weight input matrix may be linearized into a vector. In some embodiments, only a portion of the matrix or matrix slice is linearized, for example, only a subset of the rows. In unrolling and linearizing the selected portions of the matrix, the rows may be separated by padding elements, such as zero elements, to at least in part align the selected matrix elements with corresponding elements from the data input operand. The number of padding elements may vary at least in part based on data sizes supported by the matrix processor unit and the dimensions of the weight input matrix. In various embodiments, the prepared weight input operand is loaded into a vector unit of a matrix processor unit. In some embodiments, the prepared weight input operand is broadcasted and loaded into more than one vector unit of the matrix processor unit. For example, the same weight input operand can be broadcasted to every vector unit of the matrix processor unit. In some embodiments, the prepared weight input operand is loaded using a weight input vector unit such as weight input vector unit 105 of FIG. 1 and/or weight input vector unit 205 of FIG. 2.

At 307, a two-dimensional convolution operation is performed. Using the data input operand and the weight input operand prepared at 303 and 305, respectively, a two-dimensional convolution operation is performed by a matrix processor unit. The convolution operation may include computing partial and/or intermediate results that are accumulated across different iterations. In various embodiments, the matrix processor unit provides a vector of output results as an output vector. In some embodiments, the output vector is received by an output vector unit such as output vector unit 151 of FIG. 1 and/or output vector unit 251 of FIG. 2. In some embodiments, the complete two-dimensional convolution operation may involve shifting the elements of the weight input operand to at least in part compute the depthwise convolution of the weight input matrix with different portions of the data input matrix.

Figure 4:
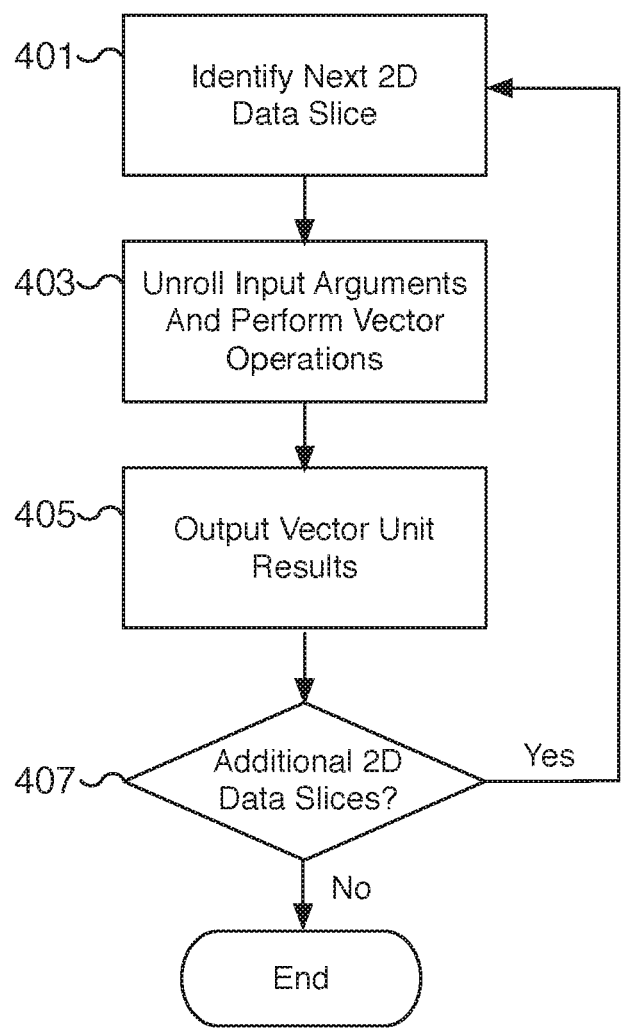
FIG. 4 is a flow chart illustrating an embodiment of a process for performing a two-dimensional convolution operation using a matrix processor unit.

FIG. 4 is a flow chart illustrating an embodiment of a process for performing a two-dimensional convolution operation using a matrix processor unit. For example, the result of a two-dimensional convolution operation is computed by performing multiple vector operations on two-dimensional slices of matrix arguments. One or more input arguments, such as a data input matrix, may exceed the maximum operand size of a matrix processor unit. As a result, an input operand may be sliced into smaller matrices compatible with the operand size of a matrix processor unit. The compatible-sized slices can be passed as operands to one or more different matrix processor units and the results combined. In some embodiments, the slices are operated on different matrix processor units, for example, matrix processor units corresponding to different processor elements. In various embodiments, the process of FIG. 4 may be performed in response to a convolution operation instruction such as the convolution operation instruction received at 301 of FIG. 3. In some embodiments, the process of FIG. 4 is performed at 303, 305, and/or 307 of FIG. 3. In some embodiments, the process of FIG. 4 is performed using matrix processor unit 107 of FIG. 1 and/or matrix processor unit 201 of FIG. 2.

At 401, the next two-dimensional slice of a matrix operand is identified. For example, one or more matrix operands with sizes compatible with the operand size of a matrix processor unit are identified. The slices may be identified in memory and a read request may be issued to load the identified data. In some embodiments, it may be common for the size of the data input matrix to be extremely large compared to the size of the weight input matrix. The data input matrix is sliced into smaller sizes for processing. At 401, the next slice is identified for processing.

At 403, the input arguments are unrolled and vector operations are performed. For example, a slice of a data input matrix and a weight input matrix are unrolled. In various embodiments, the unrolling linearizes a two-dimensional matrix (or matrix slice) into a vector operand that is loaded into at least one vector unit of a matrix processor unit. The unrolling may require more than one iteration. For example, in some embodiments, the unrolled matrix operand is unrolled over several iterations such that only a subset of rows is unrolled for each iteration. For example, for larger weight matrices, the weight matrix cannot be unrolled to fit in its entirety in a vector unit. Multiple iterations are utilized until the entire matrix is unrolled. In various embodiments, the weight matrix may be unrolled into a vector operand and broadcasted to more than one vector unit of the matrix processor unit. In some embodiments, each iteration may further include shifting the unrolled weight matrix to apply the elements of the weight matrix to different columns of the unrolled data matrix. In various embodiments, intermediate results may be accumulated and used as arguments for subsequent iterations. The vector operations performed can include a vector multiply and a vector add. For example, a dot product operation can be performed on vector data and weight arguments by each vector unit of a matrix processor unit to compute at least a portion of a depthwise convolution result.

At 405, the vector unit results are outputted. For example, each vector unit outputs a vector unit result to an element of an output vector. In various embodiments, the output vector may be stored in a vector output unit such as output vector unit 151 of FIG. 1. In various embodiments, the vector unit results may be determined by accumulating multiple vector unit results over multiple iterations. In various embodiments, the vector unit results are outputted to an output vector unit for writing the results back to memory. In some embodiments, the vector unit results are portions of a depthwise convolution result.

At 407, a determination is made whether additional two-dimensional slices require processing. In the event additional two-dimensional slices remain to be processed, processing loops back to 401 to process the next slice. In the event no additional two-dimensional slices remain to be processed, processing ends.

Figure 5:
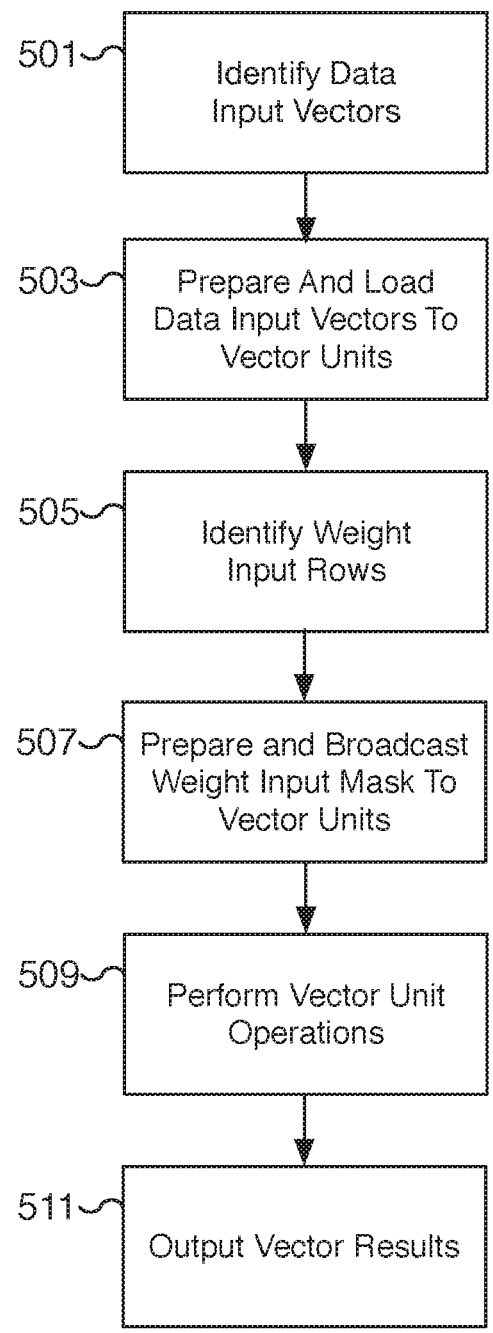
FIG. 5 is a flow chart illustrating an embodiment of a process for performing a two-dimensional convolution operation using a matrix processor unit and vector unit operations.

FIG. 5 is a flow chart illustrating an embodiment of a process for performing a two-dimensional convolution operation using a matrix processor unit and vector unit operations. For example, using the process of FIG. 5, input matrices are unrolled, linearized, and fed as input vectors to vector units of a matrix processor unit. Vector unit operations are performed to compute at least a partial result for the two-dimensional convolution operation. In various embodiments, a data input matrix and a weight input matrix are converted to input vectors. For example, a data slice may be identified from a data input matrix and converted to one or more data input vectors. In some embodiments, the process of FIG. 5 is performed at 403 and/or 405 of FIG. 4. In some embodiments, the process of FIG. 5 is performed using matrix processor unit 107 of FIG. 1 and/or matrix processor unit 201 of FIG. 2.

At 501, data input vectors are identified. For example, one or more data input vectors are identified from a slice of a data input matrix. In some embodiments, a data input vector is identified and prepared for each vector unit of a matrix processor unit. The data input vectors may include overlapping elements and correspond to selected elements used for performing a matrix operation, such as a two-dimensional convolution operation.

At 503, data input vectors are prepared and loaded to vector units. For example, elements corresponding to a subset of a data matrix are identified. In some embodiments, the data matrix may be a two-dimensional matrix slice of a larger data matrix. In various embodiments, the identified elements are a subset of the data matrix and selected based on a corresponding weight matrix and in particular the dimensions of the weight matrix and the number of rows that will be unrolled. For example, in some embodiments, an entire weight matrix can be unrolled and linearized to fit into a vector unit operand. However, as the dimensions of the weight matrix increase relative to the size of operands supported by the vector unit, the weight matrix may be too large to be unrolled into a single input vector and instead the weight matrix and corresponding data matrix are unrolled across multiple iterations.

In various embodiments, a weight matrix is either fully unrolled in one iteration or can be partially unrolled across multiple iterations. Whether a matrix is fully or partially unrolled can depend on the dimensions of the matrix arguments, in particular the weight matrix, relative to the size of the supported input vectors for the matrix processor unit. For example, in a scenario with a 3×3 weight matrix and support for a 32-element input vector, all nine elements (corresponding to three rows) of the weight matrix can be unrolled into a single 32-element weight input vector. As part of preparing a corresponding data input vector, elements from columns corresponding to three rows of the data matrix are selected. The selected elements from three rows are unrolled into a one-dimensional vector. The number of columns utilized may be based on the size of the data input vector. In the example scenario with a 32-element data input vector, three rows are identified and 10 elements (corresponding to 10 columns) for each row are selected. A total of 30 elements are selected from three rows and ten columns. The remaining two locations in the data input vector for two elements are insufficient to fit an entire column from the identified three rows and instead are padded, for example, with two zero-value elements. In this manner, a 3×10 portion of a data matrix can be unrolled and linearized into a data input vector and padded with two zero-value elements. Once prepared, the data input vector is loaded to an appropriate vector unit of the matrix processor unit. In various embodiments, each vector unit of the matrix processor unit is loaded with a prepared data input vector. For example, each vector unit of the matrix processor unit can be loaded by selecting elements starting with a different row.

In some embodiments, the initial number of columns to select from for preparing a data input vector is determined by dividing the size of the data input vector by the number of rows being unrolled. For example, in the event two, three, or four rows are being unrolled, a 32-element data input vector can be loaded with elements from sixteen, ten, or eight columns, respectively. Any unused elements of the data input vector can be filled with zero-value elements as padding. Once the number of columns is determined, each iteration can utilize the same number of columns. For example, a 7×7 matrix can be loaded into a 32-element data input vector over four iterations. For the first three iterations, two rows (i.e., rows 1-2, 3-4, and 5-6) are unrolled each iteration and the last row (i.e., row 7) is unrolled for the fourth iteration. Each iteration can select 16 elements from different columns for the corresponding selected rows. The last iteration has additional padding since only one row is being unrolled. In various embodiments, zero-value elements are used as padding elements. A padding element with a value of zero allows the vector unit to perform multiply and addition vector operations with no impact on a resulting vector sum or dot product result.

In various embodiments, once properly prepared using the appropriate format, a data input vector is loaded into a corresponding vector unit of the matrix processor unit. In some embodiments, a data input vector is prepared and loaded into each of the vector units of the matrix processor unit. For example, the data input vector prepared for each vector unit can correspond to a sub-matrix of the data input matrix with each sub-matrix starting at a different row of the data input matrix. For example, in the event the weight matrix is a fully unrolled 3×3 matrix, the first vector unit may correspond to a sub-matrix with elements from rows 1-3, the second vector unit may correspond to a sub-matrix with elements from rows 2-4, the third vector unit may correspond to a sub-matrix with elements from rows 3-5, and so forth. In an embodiment, with 32 vector units, the 32nd vector unit may correspond to a sub-matrix with elements from rows 32-34.

At 505, weight input rows are identified. For example, one or more rows from a weight input matrix are identified for performing vector unit operations. In some embodiments, a weight input matrix is fully unrolled and each row of the weight input matrix is identified for unrolling. In various embodiments, a weight input matrix may be too large for full unrolling and is only partially unrolled. Only the rows selected for unrolling are identified for further processing at 507. For example, a 3×3 weight matrix (with 9 elements) can be fully unrolled into a 32-element weight input vector so each row of the weight matrix is utilized. As another example, a 7×7 weight matrix (with 49 elements) cannot be fully unrolled into a 32-element weight input vector. Only the unrolled rows are identified for the current iteration. In various embodiments, successive iterations are used to identify the remaining rows.

At 507, a weight input mask is prepared and broadcasted to the vector units. For example, elements corresponding to the weight input rows identified at 505 are prepared into a weight input mask. The weight input mask is linearized as a one-dimensional input vector for the vector units of the matrix processor unit. In various embodiments, the linearized weight elements are formatted with padding to align the start of each weight input row with an associated data input row prepared at 503. For example, using a 32-element vector and a 3×3 weight matrix with all rows identified at 505, all nine elements of the weight matrix are selected. The nine elements of the weight matrix are formatted into a weight input mask using an additional 23 padding elements. In some embodiments, 30 elements are used for the three rows of the selected 3×3 matrix. Each row includes three elements from a row followed by seven padding elements. The remaining elements of a data input vector not used for the rows of the selected 3×3 matrix, in this example, two elements, are filled with additional padding elements. In various embodiments, zero-value elements are used as padding elements. A padding element with a value of zero allows the vector unit to perform multiply and addition vector operations with no impact on a resulting vector sum.

In various embodiments, the formatted weight input mask is an input vector that is broadcasted to each vector unit of a matrix processor unit. For example, a weight input vector is used to store the prepared weight input mask in a linearized one-dimensional vector format. The weight input mask is then broadcasted to each appropriate vector unit as an input vector operand. For example, a single weight input mask can be prepared and utilized by all the vector units of a matrix processor unit. In some embodiments, the row padding elements are utilized to allow the weight input mask to be shifted to realign the elements of the weight matrix with different columns of a data matrix as referenced in a data input vector.

At 509, vector unit operations are performed. Utilizing the input vectors loaded from data input vectors and the broadcasted weight input mask, the corresponding vector units of a matrix processor unit perform vector unit operations. In some embodiments, the vector unit operations include vector multiply and addition operations. For example, each element from a data input vector is multiplied by its corresponding element from the weight input mask. The result is a vector of multiplication results. In some embodiments, the vector multiplication operation is performed by a vector multiply unit of a vector unit. Using the vector multiply result, a vector sum result is calculated by adding each of the elements from the vector of multiplication results. In some embodiments, the sum is determined using a vector adder unit of the vector unit. For example, a vector adder unit using an adder tree can compute the sum of the vector elements. In some embodiments, the matrix processor unit includes an accumulator for adding the vector adder result with previous vector adder results. For example, intermediate or partial results from each iteration can be accumulated to determine a running accumulated sum using an accumulator. The accumulated sum allows the vector sum result from one iteration (or pass) to be added into the result of a subsequent iteration (or pass). In various embodiments, the zero-padded elements prepared for the weight input mask (and/or data input vector) result in a zero multiplication result and have no impact on the vector addition result. In some embodiments, each vector unit of a matrix processor unit performs a dot product operation using its corresponding loaded data input vector and the broadcasted weight input mask. The dot product result may be accumulated with the results from previous iterations (or passes) and/or stored to be added to the results of future iterations.

At 511, vector results are outputted. For example, the vector result determined by performing vector unit operations at 509 is outputted from the matrix processor unit. In some embodiments, the vector results are outputted as an output vector result, for example, to an output vector unit such as output vector unit 151 of FIG. 1. The output vector unit may be used to write the output vector result to memory. In some embodiments, the results are outputted and used as an argument to a subsequent matrix operation.

Figure 6:
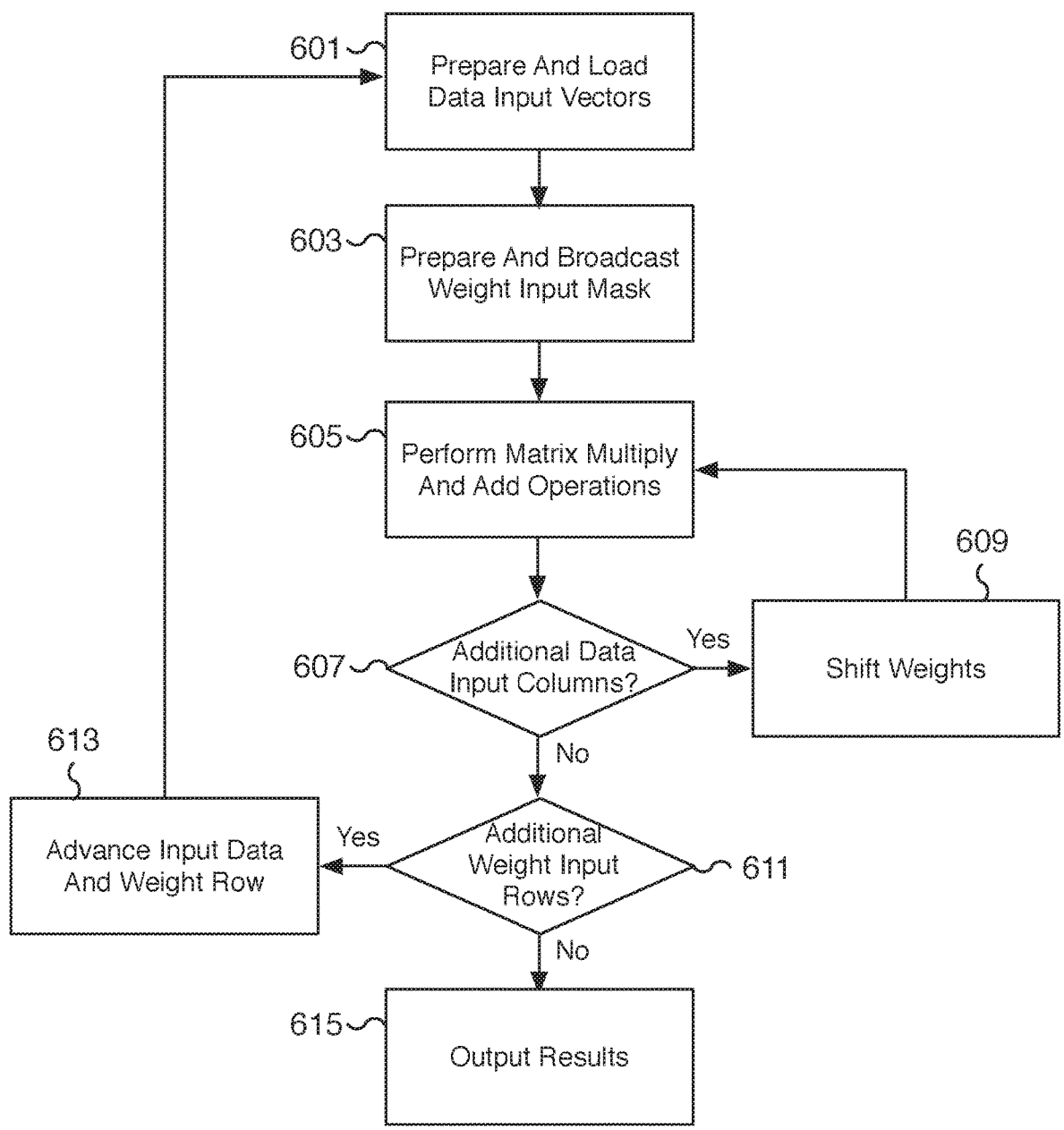
FIG. 6 is a flow chart illustrating an embodiment of a process for performing a two-dimensional convolution operation using a matrix processor unit and vector unit operations.

FIG. 6 is a flow chart illustrating an embodiment of a process for performing a two-dimensional convolution operation using a matrix processor unit and vector unit operations. For example, using a data input matrix and a data weight matrix, matrix multiply and add operations are performed to compute at least a partial result for the two-dimensional convolution operation. The input matrices are unrolled, linearized, and fed as input vectors to vector units of a matrix processor unit. Weight input matrices that do not fit the size of an input vector are partially unrolled across different iterations. To further increase the throughput and efficiency of the matrix computations, additional passes are performed by shifting the unrolled input weight mask to realign the elements of the weight mask with different elements (and corresponding columns) of loaded data input vectors. By reusing prepared data input vectors with realigned weight masks, the impact on performance related to data transfers, especially from loading elements from a data input matrix to the matrix processor unit, is significantly reduced. For example, multiple passes are performed on each data input vector for each iteration of an input weight mask by only modifying the input weight mask while keeping the loaded data input vectors unchanged. In some embodiments, the process of FIG. 6 is performed using the process of FIG. 5. For example, in some embodiments, the steps 605, 607, and/or 609 may be performed at 509 of FIG. 5. In some embodiments, the process of FIG. 6 is performed using matrix processor unit 107 of FIG. 1 and/or matrix processor unit 201 of FIG. 2.

At 601, data input vectors are prepared and loaded into a matrix processor unit. In some embodiments, the data input vectors are prepared and loaded as described with respect to steps 501 and 503 of FIG. 5. For example, the data input vectors are loaded to be compatible with the corresponding rows of a weight input vector. In some embodiments, the data input vectors include padding elements such as zero-value elements to prevent loading partial columns of elements. As an example, using a 3×3 weight input matrix and a 32-element data input vector, a fully unrolled weight input matrix references three rows. Correspondingly, three rows of data elements are loaded into a data input vector. The number of three-row columns depends on the available number of elements from the data input vector. In the example, ten three-row columns are loaded for a total of 30 elements. The two remaining elements of the data input vector are unused and may be zeroed out with zero-value elements. The next data input vector can be loaded starting with the next corresponding row from the data matrix. In this manner, data input vectors from different (but possibly overlapping) slices of a data matrix are loaded into each vector unit of the matrix processor unit. As another example, using a 7×7 weight input matrix and a 32-element data input vector, a partially unrolled weight input matrix references two rows for each of the first three iterations and a single final row for the fourth iteration. Correspondingly, two rows of data elements are loaded into a data input vector for the iterations with two weight rows and one row of data elements is loaded into a data input vector for the final iteration using the last (and seventh) weight row. The number of two-row columns depends on the available number of elements from the data input vector. In the example, sixteen two-row columns are loaded for a total of 32 elements for the first three iterations with no padding elements needed. For the fourth iteration, sixteen elements from a single row are loaded and the sixteen remaining elements of the data input vector are unused and may be zeroed out with zero-value elements. Similar to the 3×3 weight matrix example, within each iteration, the next data input vector can be loaded starting with the next corresponding row from the data matrix. In the 7×7 weight input matrix example, data input vectors from different (but possibly overlapping) slices of a data matrix are loaded into each vector unit of the matrix processor unit either two rows (for the first three iterations) or one row (for the final and fourth iteration) at a time.

At 603, a weight input mask is prepared and broadcasted to one or more vector units of the matrix processor unit. In some embodiments, the weight input mask is prepared and broadcasted as described with respect to steps 505 and 507 of FIG. 5. For example, for a fully unrolled weight matrix, each row of the weight matrix is unrolled and linearized into an input vector. To improve the efficiency of the matrix operations, zero padded elements are used to evenly space out the rows of the weight matrix within the input vector. As described above, the zero-padded elements allow the weight input vector to act as a weight input mask. Shifting the weight elements realigns the weight input mask to associate the weight elements with different corresponding columns from the data matrix. In some scenarios, the weight mask is padded to account for incomplete corresponding data columns. Once loaded into a weight input vector, the weight input mask is broadcasted to one or more applicable vector units of the matrix processor unit.

In some embodiments, a weight matrix is only partially unrolled. Over multiple iterations, all the rows of the weight matrix are unrolled. For a particular iteration, the selected rows are unrolled and padded with zero-value elements to create a partial weight mask associated with the selected rows. Subsequent iterations (or iterations performed in parallel) are used to unroll the remaining weight rows. For example, a 7×7 weight matrix (with 49 elements) cannot be fully unrolled into a 32-element weight input vector. Only the unrolled rows are identified for the current iteration. If at most two rows are unrolled, then four iterations are needed to fully unroll a 7×7 weight matrix. In some embodiments, different numbers of rows are selected for partial unrolling. For example, two, three, or more rows may be selected for unrolling as appropriate based on the weight matrix dimensions and the vector argument size of a vector unit.

At 605, matrix multiply and add operations are performed. In some embodiments, the matrix operations are described with respect to step 509 of FIG. 5. Utilizing the input vectors loaded from data input vectors and the broadcasted weight input mask, the corresponding vector units of a matrix processor unit perform vector unit operations including vector multiply and add operations. Each vector unit may perform a vector matrix multiply using the data input vector and the weight input mask. Unmasked elements result in multiplying the weight matrix elements against data matrix elements while masked out elements result in a zero value result. In various embodiments, the multiplication results are added using a vector adder to compute a resulting sum. For example, a 32-element vector unit receives two 32-element input vectors (a data input vector and a weight input mask) and performs a vector multiply to compute 32 multiplication results. A vector add operation is performed to add all 32 multiplication results to compute a single result sum. In some embodiments, the resulting sum is an intermediate result and is added to a previously computed result sum. For example, an accumulator may be used to store the resulting sum and on successive iterations the intermediate result is added to the currently computed result sum to keep a running sum across multiple iterations.

In some embodiments, each vector unit performs its vector operations in parallel. For example, a matrix processor unit with 32 vector units can compute 32 results corresponding to 32 result sums. In various embodiments, each vector unit of a matrix processor unit performs a dot product operation using its corresponding loaded data input vector and the broadcasted weight input mask. The dot product result may be accumulated with the results from previous iterations (or passes) and/or stored to be added to the results of future iterations.

At 607, a determination is made whether additional columns of the data input matrix remain to be processed. In the event additional columns of the data input matrix remain to be processed, processing proceeds to 609. In the event no additional columns of the data input matrix remain to be processed, processing proceeds to 611.

At 609, the weights corresponding to the weight input vector are shifted. For example, the elements of a vector input mask are shifted to realign the weight elements with different data elements from data input vectors. For example, existing data input vectors loaded at 601 are used in an additional pass with a new weight input vector. The new weight input vector is prepared by shifting the weight elements, for example, by shifting each weight element to the right by one element. The shift realigns the weight elements with data elements corresponding to the next column. For example, a weight input mask corresponding to a 3×3 weight matrix may be loaded into a vector unit along with a data input vector corresponding to a 3×10 slice of the data matrix. Shifting the weight elements effectively slides the weight input mask to associate the weight matrix with a different three columns from the 3×10 slice. With a 3×3 weight matrix, eight passes (corresponding to seven shifts) can be performed before reaching the end of the data slice. As another example, using a 7×7 weight matrix with two unrolled weight rows, each data input vector references 16 columns. Ten passes (corresponding to nine shifts) can be performed before reaching the end of the data slice. By spacing out the weight elements with padding elements in the weight input vector, the number of padding elements determines the maximum number of shifts (and passes) that can be performed with the loaded data input vectors.

In various embodiments, once the weight input vector is shifted, the newly prepared weight input vector is broadcasted to each applicable vector unit. Processing proceeds to 605 where matrix operations are performed using a realigned weight input mask and a previously loaded data input vector.

At 611, a determination is made whether additional rows of the weight input matrix remain to be processed. In the event additional rows of the weight input matrix remain to be processed, processing proceeds to 613. For example, partially unrolled matrices may have additional rows that need to be unrolled and processed. In contrast, a fully unrolled weight matrix will not have additional weight rows for processing. In the event no additional rows of the weight input matrix remain to be processed, processing proceeds to 615.

At 613, data input and weight rows are advanced. For example, for a partially unrolled weight (and corresponding data) matrix, the identified rows are advanced to select the next set of rows for unrolling. Both the weight and data matrices are advanced together in order to associate the correct weight and data elements together. Using a 7×7 weight matrix as an example and unrolling at most two rows each iteration, the first iteration selects rows 1 and 2. At 611, additional weight input rows remain to be processed so at step 613, the selected rows are advanced to select rows 3 and 4. A subsequent iteration selects rows 5 and 6. A final iteration selects row 7. Processing then proceeds to 601.

At 615, results are outputted. In some embodiments, the results are outputted as described with respect to step 511 of FIG. 5. For example, the vector result determined by performing the matrix multiply and add operations at 605 is outputted from the matrix processor unit. In various embodiments, the vector results are outputted as an output vector result, for example, to an output vector unit such as output vector unit 151 of FIG. 1. The output vector unit may be used to write the output vector result to memory. In some embodiments, the results are outputted and used as an argument to a subsequent matrix operation.

Figure 7A:
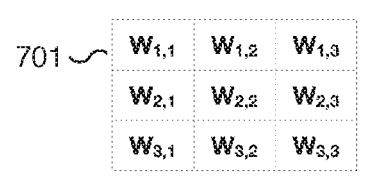

FIGS. 7A and 7B are diagrams illustrating example matrix operands for performing depthwise convolution. In FIG. 7A, weight matrix 701 represents an exemplar 3×3 matrix of weight elements. Other dimensions for a weight matrix may be appropriate as well, such as 1×1, 5×5, 7×7, 9×9, etc. In the example shown, the subscripts associated with each weight element use a row and column notation. For the first row of weight matrix 701, $W_{1,1}$ is the weight element located at column 1, $W_{1,2}$ is the weight element located at column 2, and $W_{1,3}$ is the weight element located at column 3. In FIG. 7B, data matrix 703 represents an exemplar data matrix of data elements. The dimensions of data matrix 703 are larger than weight matrix 701. In the example of FIG. 7B, only rows 1-4 and 32-34 of data matrix 703 are shown. The width of data matrix 703 can extend past 11 columns. Similarly, the height of data matrix 703 can extend past 34 rows (not shown). In FIG. 7B, data matrix 703 is shown with 34 rows to make it compatible with 3×3 weight matrix 701 and a matrix processor unit with 32 vector units. In some embodiments, weight matrix 701 and data matrix 703 are input matrices for performing convolution operations using the techniques described herein. In some embodiments, the convolution operations, such as a depthwise convolution, are performed on weight matrix 701 and data matrix 703 using matrix processor unit 107 of FIG. 1 and/or matrix processor unit 201 of FIG. 2 and/or the processes of FIGS. 3-6, 17A and 17B. For example, the convolution operation instruction received at 301 of FIG. 3 may specify a weight matrix such as weight matrix 701 and a data matrix such as data matrix 703.

FIGS. 8A and 8B are diagrams illustrating an example of an unrolled data matrix for performing depthwise convolution. FIGS. 8A and 8B include index labels 801 and 802 that indicate the location of a data element in a 32-element data input vector. FIGS. 8A and 8B include seven example data input vectors 803/804, 805/806, 807/808, 809/810, 811/812, 813/814, and 815/816. The first half of each data input vector is shown in FIG. 8A and the corresponding second half of each input vector is shown in FIG. 8B. Due to the large size of the vectors, for ease of illustration, the data input vectors are illustrated as vector pairs and split across FIGS. 8A and 8B. For example, the seven 32-element data input vectors include 16-element vector pairs 803/804, 805/806, 807/808, 809/810, 811/812, 813/814, and 815/816.

In some embodiments, the data input vectors shown in FIGS. 8A and 8B are data input vectors unrolled from data matrix 703 of FIG. 7B. For example, data input vector 803/804 corresponds to elements from the first three rows of data matrix 703 of FIG. 7B unrolled into a 1-dimensional vector and includes data elements from rows 1-3 and columns 1-10 of data matrix 703. Similarly, referencing elements from columns 1-10 of data matrix 703 of FIG. 7B, data input vector 805/806 corresponds to elements from rows 2-4, data input vector 807/808 corresponds to elements from rows 3-5, data input vector 809/810 corresponds to elements from rows 4-6, data input vector 811/812 corresponds to elements from rows 5-7, data input vector 813/814 corresponds to elements from rows 6-8, and data input vector 815/816 corresponds to elements from rows 32-34. Data elements associated with different 3×10 slices of data matrix 703 of FIG. 7B are loaded into each of data input vectors 803/804, 805/806, 807/808, 809/810, 811/812, 813/814, and 815/816. Elements at locations 30 and 31 (the 31st and 32nd elements) of each of data input vectors 803/804, 805/806, 807/808, 809/810, 811/812, 813/814, and 815/816 are zero-value elements. In various embodiments, elements at locations 30 and 31 are padding elements.

In some embodiments, each of the data input vectors of FIGS. 8A and 8B are loaded into separate vector units of a matrix processor unit. For a matrix processor unit with 32 vector units, 32 data input vectors are loaded and each may be prepared by starting with a different row. In the example shown, data input vectors 803/804, 805/806, 807/808, 809/810, 811/812, and 813/814 are loaded into the first six vector units and data input vector 815/816 is loaded into the 32nd vector unit. Although not shown, vector units 7-31 are loaded with corresponding data input vectors. In some embodiments, data input vectors 803/804, 805/806, 807/808, 809/810, 811/812, 813/814, and 815/816 are generated by and loaded into a matrix processor unit, such as matrix processor unit 107 of FIG. 1, by a data input vector unit such as data input vector unit 103 of FIG. 1. In some embodiments, the unrolling process to create data input vectors 803/804, 805/806, 807/808, 809/810, 811/812, 813/814, and 815/816 is performed at 303 of FIG. 3, at 401 and/or 403 of FIG. 4, at 501 and/or 503 of FIG. 5, at 601 of FIG. 6, and/or using the processes of FIGS. 17A and/or 17B. In some embodiments, the data input vectors of FIGS. 8A and 8B represent a partial set of data input vectors prepared for one iteration of an unrolling process and are formatted to be aligned with a fully unrolled 3×3 weight matrix such as weight matrix 701 of FIG. 7A.

FIGS. 9A and 9B are diagrams illustrating an example of an unrolled weight matrix for performing depthwise convolution. FIGS. 9A and 9B include index labels 901 and 902 that indicate the location of a weight element in a 32-element weight input vector. FIGS. 9A and 9B include eight example weight input vectors 903/904, 905/906, 907/908, 909/910, 911/912, 913/914, 915/916, and 917/918. The first half of each weight input vector is shown in FIG. 9A and the corresponding second half of each input vector is shown in FIG. 9B. Due to the large size of the vectors, for ease of illustration, the weight input vectors are illustrated as vector pairs and split across FIGS. 9A and 9B. For example, the eight 32-element weight input vectors include 16-element vector pairs 903/904, 905/906, 907/908, 909/910, 911/912, 913/914, 915/916, and 917/918. The weight input vectors represent eight different weight input vectors that are broadcasted to the vector units of a matrix processor unit over eight passes. Examples of corresponding data input vectors are shown in FIGS. 8A and 8B and may remain unchanged for the entire eight passes as the weight input vectors change.

In some embodiments, the weight input vectors shown in FIGS. 9A and 9B are weight input vectors unrolled from weight matrix 701 of FIG. 7A. For example, each of weight input vectors 903/904, 905/906, 907/908, 909/910, 911/912, 913/914, 915/916, and 917/918 corresponds to elements from weight matrix 701 of FIG. 7A unrolled into and spaced out over a 1-dimensional vector. The weight elements and rows are prepared at different locations to align the weight input vector with different columns of a corresponding data input vector. Zero-value padded elements are included between the rows and at the end of the vectors at locations 30 and 31. For example, weight input vector 903/904 includes row 1 of weight matrix 701 of FIG. 7A at element locations 0-2, row 2 at element locations 10-12, and row 3 at element locations 20-22. Weight input vector 905/906 may be prepared by shifting the elements of weight input vector 903/904 to the right by one location. Similarly, weight input vectors 907/908, 909/910, 911/912, 913/914, 915/916, and 917/918 are created by shifting the elements of weight input vectors 905/906, 907/908, 909/910, 911/912, 913/914, and 915/916, respectively. In some embodiments, as the weight input vectors are shifted to the right, zero-value padding elements are introduced to the front of the weight input vectors.

In some embodiments, each of the weight input vectors of FIGS. 9A and 9B is broadcasted into the vector units of a matrix processor unit at a different pass of the corresponding data input vectors. For a matrix processor unit with 32 vector units, 32 weight input vectors are loaded with the same weight input vector for each pass. For example, weight input vector 903/904 is broadcasted to each vector unit for pass one, weight input vector 905/906 is broadcasted to each vector unit for pass two, weight input vector 907/908 is broadcasted to each vector unit for pass three, and so forth, until weight input vector 917/918 is broadcasted to each vector unit for the eighth pass.

In some embodiments, weight input vectors 903/904, 905/906, 907/908, 909/910, 911/912, 913/914, 915/916, and 917/918 are generated and/or loaded into a matrix processor unit, such as matrix processor unit 107 of FIG. 1, by a weight input vector unit such as weight input vector unit 105 of FIG. 1. In some embodiments, the unrolling process to create weight input vectors 903/904, 905/906, 907/908, 909/910, 911/912, 913/914, 915/916, and 917/918 is performed at 305 of FIG. 3, at 401 and/or 403 of FIG. 4, at 505 and/or 507 of FIG. 5, and/or at 603, 607, and/or 609 of FIG. 6. In some embodiments, the different weight input vectors of FIGS. 9A and 9B represent different weight input masks prepared for one iteration of an unrolling process that includes eight passes. Each of the weight input masks is a fully unrolled 3×3 weight matrix such as weight matrix 701 of FIG. 7A and is formatted to be aligned with different 3×3 slices of a data matrix, such as data matrix 703 of FIG. 7B.

FIGS. 10A and 10B are diagrams illustrating an example of vector computations for performing depthwise convolution. FIGS. 10A and 10B include index labels 1001 and 1002 that indicate the location of weight and data elements in 32-element weight input vector 1003/1004 and data input vector 1005/1006, respectively. In some embodiments, weight input vector 1003/1004 is weight input vector 903/904 of FIGS. 9A and 9B and data input vector 1005/1006 is data input vector 803/804 of FIGS. 8A and 8B. In some embodiments, weight input vector 1003/1004 and data input vector 1005/1006 are examples of two input vectors loaded into a vector unit for performing vector operations. In various embodiments, each of the vector units of a matrix processor unit is loaded with a corresponding pair of input vectors.

In some embodiments, cell 1011 illustrates the equivalent vector computations performed by a vector unit of a matrix processor unit on input vectors of weight input vector 1003/1004 and data input vector 1005/1006. The vector computation result shown in cell 1011 is the result determined by multiplying each element of weight input vector 1003/1004 against a corresponding element of data input vector 1005/1006. The 32-elements from weight input vector 1003/1004 are multiplied against 32 elements of data input vector 1005/1006 to determine 32 multiplication results. In the example shown, cell 1011 includes only nine multiplication terms instead of 32. The nine multiplication terms correspond to the nine weight elements from weight input vector 1003/1004 and their corresponding data elements from data input vector 1005/1006. The zero-value elements of weight input vector 1003/1004 function as a weight mask that results in reducing the number of multiplication terms to nine from a possible 32. In some embodiments, the multiplication is performed using a vector multiply unit such as vector multiply unit 213 or 223 of FIG. 2. In some embodiments, the multiplication results are fed as a vector into a vector adder unit to compute the sum of the multiplication results. The vector sum may be performed using a vector adder unit such as vector adder unit 215 or 225 of FIG. 2. In the example shown, the result of the vector operations performed is a single result sum. In some embodiments, the result sum is a partial or intermediate result sum and may be stored in an accumulator. In some embodiments, the result sum is a dot product computed using weight input vector 1003/1004 and data input vector 1005/1006. The result sum may be outputted as one element of a vector result and written to an output vector unit such as output vector unit 151 of FIG. 1. In some embodiments, the equivalent of the vector computation result shown in cell 1011 is performed using matrix processor unit 107 of FIG. 1 and/or the processes of FIGS. 3-6 and FIGS. 17A and 17B. In some embodiments, the vector computations are performed at 307 of FIG. 3, at 403 of FIG. 4, at 509 of FIG. 5, and/or at 605 of FIG. 6.

FIGS. 11A and 11B are diagrams illustrating example matrix operands for performing depthwise convolution. In FIG. 11A, weight matrix 1101 represents an exemplar 7×7 matrix of weight elements. As described with respect to FIGS. 7A and 7B, in the example shown, the subscripts associated with each weight element use a row and column notation. In FIG. 11B, data matrix 1103 represents an exemplar data matrix of data elements. The dimensions of data matrix 1103 are larger than weight matrix 1101. In the example of FIG. 11B, only rows 1-7 and 32-38 of data matrix 1103 are shown. The width of data matrix 1103 can extend past 16 columns. Similarly, the height of data matrix 1103 can extend past 38 rows (not shown). In FIG. 11B, data matrix 1103 is shown with 38 rows to make it compatible with 7×7 weight matrix 1101 and a matrix processor unit with 32 vector units. In some embodiments, weight matrix 1101 and data matrix 1103 are input matrices for performing convolution operations using the techniques described herein. In some embodiments, the convolution operations, such as a depthwise convolution is performed on weight matrix 1101 and data matrix 1103 using matrix processor unit 107 of FIG. 1 and/or matrix processor unit 201 of FIG. 2 and/or the processes of FIGS. 3-6 and FIGS. 17A and 17B. For example, the convolution operation instruction received at 301 of FIG. 3 may specify a weight matrix such as weight matrix 1101 and a data matrix such as data matrix 1103.

FIGS. 12A and 12B are diagrams illustrating an example of a partially unrolled data matrix for performing depthwise convolution. FIGS. 12A and 12B include index labels 1201 and 1202 that indicate the location of a data element in a 32-element data input vector. FIGS. 12A and 12B include four example data input vectors 1203/1204, 1205/1206, 1207/1208, and 1209/1210. The first half of each data input vector is shown in FIG. 12A and the corresponding second half of each input vector is shown in FIG. 12B. Due to the large size of the vectors, for ease of illustration, the data input vectors are illustrated as vector pairs and split across FIGS. 12A and 12B. For example, the four 32-element data input vectors include 16-element vector pairs 1203/1204, 1205/1206, 1207/1208, and 1209/1210.

In some embodiments, the data input vectors shown in FIGS. 12A and 12B are data input vectors partially unrolled from data matrix 1103 of FIG. 11B. The data input vectors of FIGS. 12A and 12B are partially unrolled since none of the data input vectors contains an entire 7×7 matrix slice of data matrix 1103 of FIG. 11B to correspond with a 7×7 weight matrix. For example, data input vector 1203/1204 corresponds to elements from only the first two rows of data matrix 1103 of FIG. 11B unrolled into a 1-dimensional vector. Data input vector 1203/1204 includes data elements from rows 1-2 and columns 1-16 of data matrix 1103. Similarly, referencing elements from columns 1-16 of data matrix 1103 of FIG. 11B, data input vector 1205/1206 corresponds to elements from rows 3 and 4, data input vector 1207/1208 corresponds to elements from rows 5 and 6, and data input vector 1209/1210 corresponds to elements from row 7. Data elements associated with different 2×16 slices of data matrix 1103 of FIG. 11B are loaded into each of data input vectors 1203/1204, 1205/1206, 1207/1208, and 1209/1210. For data input vector 1209/1210, elements at locations 16-31 (the last 16 elements) are zero-value elements. In various embodiments, the zero-value elements are padding elements.

In some embodiments, each of the data input vectors of FIGS. 12A and 12B are loaded into a vector unit of a matrix processor unit during a different iteration. Since at most two rows of a 7×7 data slice are represented in each data input vector, all four data input vectors 1203/1204, 1205/1206, 1207/1208, and 1209/1210 are needed to compute a 7×7 matrix operation using a 7×7 weight matrix. In total, four iterations may be performed, one for each data input vector. For example, data input vector 1203/1204 is loaded to a vector unit for iteration one, data input vector 1205/1206 is loaded to a vector unit for iteration two, data input vector 1207/1208 is loaded to a vector unit for iteration three, and data input vector 1209/1210 is loaded to a vector unit for the fourth iteration. In the example shown, only a single data input vector for each iteration is shown. For a matrix processor unit with 32 vector units, during each iteration, 32 different data input vectors (of which only one is shown) are loaded and each may be prepared by starting with a different row. In some embodiments, data input vectors 1203/1204, 1205/1206, 1207/1208, and 1209/1210 are generated by and loaded into a matrix processor unit, such as matrix processor unit 107 of FIG. 1, by a data input vector unit such as data input vector unit 103 of FIG. 1. In some embodiments, the unrolling process to create data input vectors 1203/1204, 1205/1206, 1207/1208, and 1209/1210 is performed at 303 of FIG. 3, at 401 and/or 403 of FIG. 4, at 501 and/or 503 of FIG. 5, at 601, 611, and/or 613 of FIG. 6 and/or using the processes of FIGS. 17A and/or 17B. In some embodiments, the data input vectors of FIGS. 12A and 12B represent a partial set of data input vectors prepared for a partial unrolling process taking four iterations and are formatted to be aligned with a partially unrolled 7×7 weight matrix such as weight matrix 1101 of FIG. 11A.

FIGS. 13A and 13B are diagrams illustrating an example of a partially unrolled weight matrix for performing depthwise convolution. FIGS. 13A and 13B include index labels 1301 and 1302 that indicate the location of a weight element in a 32-element weight input vector. FIGS. 13A and 13B include ten example weight input vectors 1303/1304, 1305/1306, 1307/1308, 1309/1310, 1311/1312, 1313/1314, 1315/1316, 1317/1318, 1319/1320, and 1321/1322. The first half of each weight input vector is shown in FIG. 13A and the corresponding second half of each input vector is shown in FIG. 13B. Due to the large size of the vectors, for ease of illustration, the weight input vectors are illustrated as vector pairs and split across FIGS. 13A and 13B. For example, the ten 32-element weight input vectors include 16-element vector pairs 1303/1304, 1305/1306, 1307/1308, 1309/1310, 1311/1312, 1313/1314, 1315/1316, 1317/1318, 1319/1320, and 1321/1322. The weight input vectors represent ten different weight input vectors that are broadcasted to the vector units of a matrix processor unit over ten passes. The weight input vectors of FIGS. 13A and 13B are associated with the first two rows of a weight matrix. In some embodiments, data input vector 1203/1204 of FIGS. 12A and 12B is an example of a corresponding data input vector associated with the corresponding first two rows of a corresponding data matrix. The vector units are loaded with data input vectors, such as data input vector 1203/1204 of FIGS. 12A and 12B, and may remain unchanged for the entire ten passes as the weight input vectors change.

In some embodiments, the weight input vectors shown in FIGS. 13A and 13B are weight input vectors partially unrolled from weight matrix 1101 of FIG. 11A. For example, each of weight input vectors 1303/1304, 1305/1306, 1307/1308, 1309/1310, 1311/1312, 1313/1314, 1315/1316, 1317/1318, 1319/1320, and 1321/1322 corresponds to elements from the first two rows of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1303/1304 includes row 1 of weight matrix 1101 of FIG. 11A at element locations 0-6 and row 2 at element locations 16-22. Weight input vector 1305/1306 may be prepared by shifting the elements of weight input vector 1303/1304 to the right by one location. Similarly, weight input vectors 1307/1308, 1309/1310, 1311/1312, 1313/1314, 1315/1316, 1317/1318, 1319/1320, and 1321/1322 are created by shifting the elements of weight input vectors 1305/1306, 1307/1308, 1309/1310, 1311/1312, 1313/1314, 1315/1316, 1317/1318, and 1319/1320, respectively. In some embodiments, as the weight input vectors are shifted to the right, zero-value padding elements are introduced to the front of the weight input vectors.

In some embodiments, each of the weight input vectors of FIGS. 13A and 13B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1303/1304 is broadcasted to each vector unit for pass one, weight input vector 1305/1306 is broadcasted to each vector unit for pass two, weight input vector 1307/1308 is broadcasted to each vector unit for pass three, and so forth, until weight input vector 1321/1322 is broadcasted to each vector unit for the tenth pass.

In some embodiments, weight input vectors 1303/1304, 1305/1306, 1307/1308, 1309/1310, 1311/1312, 1313/1314, 1315/1316, 1317/1318, 1319/1320, and 1321/1322 are generated and/or loaded into a matrix processor unit, such as matrix processor unit 107 of FIG. 1, and by a weight input vector unit such as weight input vector unit 105 of FIG. 1. In some embodiments, the partial unrolling process to create weight input vectors 1303/1304, 1305/1306, 1307/1308, 1309/1310, 1311/1312, 1313/1314, 1315/1316, 1317/1318, 1319/1320, and 1321/1322 is performed at 305 of FIG. 3, at 401 and/or 403 of FIG. 4, at 505 and/or 507 of FIG. 5, and/or at 603, 607, 609, 611, and/or 613 of FIG. 6. In some embodiments, the different weight input vectors of FIGS. 13A and 13B represent different weight input masks prepared for one iteration of a multiple iteration partial unrolling process that includes ten passes per iteration. Each of the weight input masks is a partially unrolled 2×7 mask of a 7×7 weight matrix such as weight matrix 1101 of FIG. 11A. The weight input masks are formatted to align with different 2×7 slices of a data matrix, such as data matrix 1103 of FIG. 11B. The weight masks associated with successive iterations are described with respect to FIGS. 14A, 14B, 15A, 15B, 16A, and 16B.

FIGS. 14A and 14B are diagrams illustrating an example of a partially unrolled weight matrix for performing depthwise convolution. FIGS. 14A and 14B include index labels 1401 and 1402 that indicate the location of a weight element in a 32-element weight input vector. FIGS. 14A and 14B include ten example weight input vectors 1403/1404, 1405/1406, 1407/1408, 1409/1410, 1411/1412, 1413/1414, 1415/1416, 1417/1418, 1419/1420, and 1421/1422. The weight input vectors represent ten different weight input vectors that are broadcasted to the vector units of a matrix processor unit over ten passes. The weight input vectors of FIGS. 14A and 14B are associated with the second pair of rows of a weight matrix (rows 3 and 4). In some embodiments, data input vector 1205/1206 of FIGS. 12A and 12B is an example of a corresponding data input vector associated with the corresponding second pair of rows of a corresponding data matrix. The vector units are loaded with data input vectors, such as data input vector 1205/1206 of FIGS. 12A and 12B, and may remain unchanged for the entire ten passes as the weight input vectors change.

In some embodiments, the weight input vectors shown in FIGS. 14A and 14B are weight input vectors partially unrolled from weight matrix 1101 of FIG. 11A. For example, each of weight input vectors 1403/1404, 1405/1406, 1407/1408, 1409/1410, 1411/1412, 1413/1414, 1415/1416, 1417/1418, 1419/1420, and 1421/1422 corresponds to elements from the second pair of rows of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1403/1404 includes row 3 of weight matrix 1101 of FIG. 11A at element locations 0-6 and row 4 at element locations 16-22. Weight input vector 1405/1406 may be prepared by shifting the elements of weight input vector 1403/1404 to the right by one location. Similarly, weight input vectors 1407/1408, 1409/1410, 1411/1412, 1413/1414, 1415/1416, 1417/1418, 1419/1420, and 1421/1422 are created by shifting the elements of weight input vectors 1405/ 1406, 1407/1408, 1409/1410, 1411/1412, 1413/1414, 1415/ 1416, 1417/1418, and 1419/1420, respectively. In some embodiments, as the weight input vectors are shifted to the right, zero-value padding elements are introduced to the front of the weight input vectors.

In some embodiments, each of the weight input vectors of FIGS. 14A and 14B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1403/1404 is broadcasted to each vector unit for pass one, weight input vector 1405/1406 is broadcasted to each vector unit for pass two, weight input vector 1407/1408 is broadcasted to each vector unit for pass three, and so forth, until weight input vector 1421/1422 is broadcasted to each vector unit for the tenth pass.

FIGS. 15A and 15B are diagrams illustrating an example of a partially unrolled weight matrix for performing depthwise convolution. FIGS. 15A and 15B include index labels 1501 and 1502 that indicate the location of a weight element in a 32-element weight input vector. FIGS. 15A and 15B include ten example weight input vectors 1503/1504, 1505/ 1506, 1507/1508, 1509/1510, 1511/1512, 1513/1514, 1515/ 1516, 1517/1518, 1519/1520, and 1521/1522. The weight input vectors represent ten different weight input vectors that are broadcasted to the vector units of a matrix processor unit over ten passes. The weight input vectors of FIGS. 15A and 15B are associated with the third pair of rows of a weight matrix (rows 5 and 6). In some embodiments, data input vector 1207/1208 of FIGS. 12A and 12B is an example of a corresponding data input vector associated with the corresponding third pair of rows of a corresponding data matrix. The vector units are loaded with data input vectors, such as data input vector 1207/1208 of FIGS. 12A and 12B, and may remain unchanged for the entire ten passes as the weight input vectors change.

In some embodiments, the weight input vectors shown in FIGS. 15A and 15B are weight input vectors partially unrolled from weight matrix 1101 of FIG. 11A. For example, each of weight input vectors 1503/1504, 1505/1506, 1507/ 1508, 1509/1510, 1511/1512, 1513/1514, 1515/1516, 1517/ 1518, 1519/1520, and 1521/1522 corresponds to elements from the third pair of rows of weight matrix 1101 of FIG. 11A unrolled into and spaced out over a 1-dimensional vector. The weight elements and rows are prepared at different locations to align the weight input vector with different columns of a corresponding data input vector.

Zero-value padded elements are included between the rows and at the end of the vectors. For example, weight input vector 1503/1504 includes row 5 of weight matrix 1101 of FIG. 11A at element locations 0-6 and row 6 at element locations 16-22. Weight input vector 1505/1506 may be prepared by shifting the elements of weight input vector 1503/1504 to the right by one location. Similarly, weight input vectors 1507/1508, 1509/1510, 1511/1512, 1513/1514, 1515/1516, 1517/1518, 1519/1520, and 1521/1522 are created by shifting the elements of weight input vectors 1505/1506, 1507/1508, 1509/1510, 1511/1512, 1513/1514, 1515/1516, 1517/1518, and 1519/1520, respectively. In some embodiments, as the weight input vectors are shifted to the right, zero-value padding elements are introduced to the front of the weight input vectors.

In some embodiments, each of the weight input vectors of FIGS. 15A and 15B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1503/1504 is broadcasted to each vector unit for pass one, weight input vector 1505/1506 is broadcasted to each vector unit for pass two, weight input vector 1507/1508 is broadcasted to each vector unit for pass three, and so forth, until weight input vector 1521/1522 is broadcasted to each vector unit for the tenth pass.

FIGS. 16A and 16B are diagrams illustrating an example of a partially unrolled weight matrix for performing depthwise convolution. FIGS. 16A and 16B include index labels 1601 and 1602 that indicate the location of a weight element in a 32-element weight input vector. FIGS. 16A and 16B include ten example weight input vectors 1603/1604, 1605/1606, 1607/1608, 1609/1610, 1611/1612, 1613/1614, 1615/1616, 1617/1618, 1619/1620, and 1621/1622. The weight input vectors represent ten different weight input vectors that are broadcasted to the vector units of a matrix processor unit over ten passes. The weight input vectors of FIGS. 16A and 16B are associated with the last row of a weight matrix (row 7). In some embodiments, data input vector 1209/1210 of FIGS. 12A and 12B is an example of a corresponding data input vector associated with the corresponding last row of a corresponding data matrix. The vector units are loaded with data input vectors, such as data input vector 1209/1210 of FIGS. 12A and 12B, and may remain unchanged for the entire ten passes as the weight input vectors change.

In some embodiments, the weight input vectors shown in FIGS. 16A and 16B are weight input vectors partially unrolled from weight matrix 1101 of FIG. 11A. For example, each of weight input vectors 1603/1604, 1605/1606, 1607/1608, 1609/1610, 1611/1612, 1613/1614, 1615/1616, 1617/1618, 1619/1620, and 1621/1622 corresponds to elements from the last row of weight matrix 1101 of FIG. 11A unrolled into and spaced out over a 1-dimensional vector. The weight elements and rows are prepared at different locations to align the weight input vector with different columns of a corresponding data input vector. Zero-value padded elements are included between the rows and at the end of the vectors. For example, weight input vector 1603/1604 includes row 7 of weight matrix 1101 of FIG. 11A at element locations 0-6. Weight input vector 1605/1606 may be prepared by shifting the elements of weight input vector 1603/1604 to the right by one location. Similarly, weight input vectors 1607/1608, 1609/1610, 1611/1612, 1613/1614, 1615/1616, 1617/1618, 1619/1620, and 1621/1622 are created by shifting the elements of weight input vectors 1605/1606, 1607/1608, 1609/1610, 1611/1612, 1613/1614, 1615/ 1616, 1617/1618, and 1619/1620, respectively. In some embodiments, as the weight input vectors are shifted to the right, zero-value padding elements are introduced to the front of the weight input vectors.

In some embodiments, each of the weight input vectors of FIGS. 16A and 16B are broadcasted into the vector units of a matrix processor unit at a different pass of the corresponding data input vectors. For a matrix processor unit with 32 vector units, 32 weight input vectors are loaded with the same weight input vector for each pass. For example, weight input vector 1603/1604 is broadcasted to each vector unit for pass one, weight input vector 1605/1606 is broadcasted to each vector unit for pass two, weight input vector 1607/1608 is broadcasted to each vector unit for pass three, and so forth, until weight input vector 1621/1622 is broadcasted to each vector unit for the tenth pass.

In some embodiments, the different weight input vectors of 14A, 14B, 15A, 15B, 16A, and 16B represent different weight input masks prepared for different iterations of a multiple iteration partial unrolling process that includes ten passes per iteration. In some embodiments, weight input vectors of FIGS. 14A and 14B are loaded into a matrix processor unit during a second iteration of a partial unrolling process; weight input vectors of FIGS. 15A and 15B are loaded into a matrix processor unit during a third iteration of a partial unrolling process; and weight input vectors of FIGS. 16A and 16B are loaded into a matrix processor unit during a fourth iteration of a partial unrolling process. Each of the weight input masks of FIGS. 14A, 14B, 15A, 15B, 16A, and 16B is a partially unrolled 2×7 mask of a 7×7 weight matrix such as weight matrix 1101 of FIG. 11A. The weight input masks are formatted to align with different 2×7 slices of a data matrix, such as data matrix 1103 of FIG. 11B. As described with respect to FIGS. 13A and 13B, the weight input vectors of FIGS. 14A, 14B, 15A, 15B, 16A, and 16B are generated and/or loaded into a matrix processor unit, such as matrix processor unit 107 of FIG. 1, by a weight input vector unit such as weight input vector unit 105 of FIG. 1. In some embodiments, the partial unrolling process to create the weight input vectors of FIGS. 14A, 14B, 15A, 15B, 16A, and 16B is performed at 305 of FIG. 3, at 401 and/or 403 of FIG. 4, at 505 and/or 507 of FIG. 5, and/or at 603, 607, 609, 611, and/or 613 of FIG. 6.

Figure 17A:
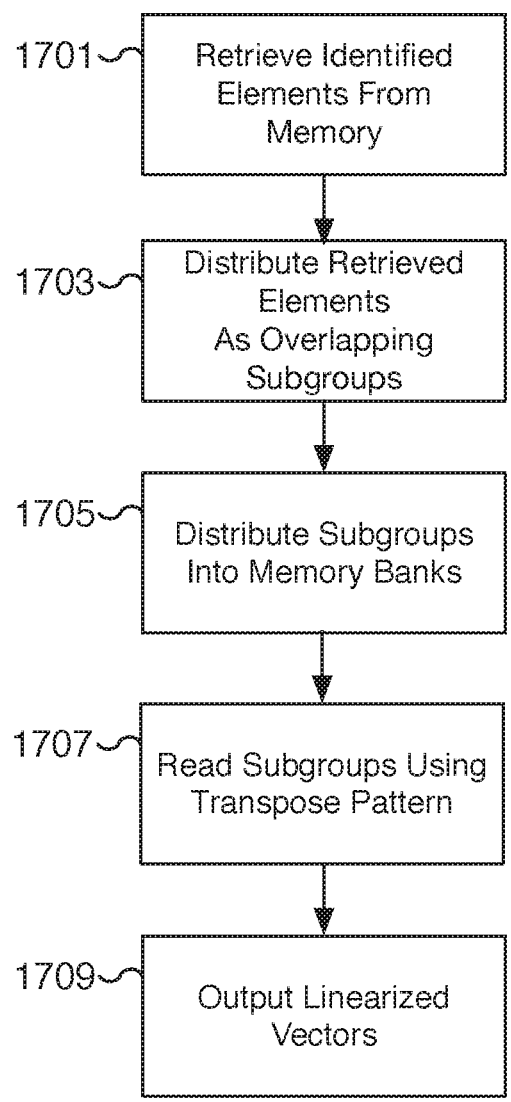
FIG. 17A is a flow chart illustrating an embodiment of a process for preparing data input vectors for performing a two-dimensional convolution operation using a matrix processor unit and vector unit operations.

FIG. 17A is a flow chart illustrating an embodiment of a process for preparing data input vectors for performing a two-dimensional convolution operation using a matrix processor unit and vector unit operations. In various embodiments, the process of FIG. 17A is performed using a data input vector unit to retrieve matrix elements and prepare a linearized vector input for a matrix processor unit. The matrix elements are identified and retrieved from a memory and formatted using a specified pattern for efficiently generating one or more data input vectors that the vector units of the matrix processor unit can operate on. In various embodiments, the specified pattern is associated with a transpose operation. In some embodiments, the process of FIG. 17A is performed at 303 of FIG. 3, at 401 and/or 403 of FIG. 4, at 501 and/or 503 of FIG. 5, and/or at 601, 611, and/or 613 of FIG. 6 using data input vector unit 103 of FIG. 1 and/or data input vector unit 203 of FIG. 2. In some embodiments, the process of FIG. 17A is implemented by a data input vector unit, such as data input vector unit 1803 of FIG. 18, and its associated components. In some embodiments, the process of FIG. 17A is described in further detail by FIGS. 18-29.

At 1701, identified matrix elements are retrieved from memory. For example, matrix elements corresponding to a data matrix are retrieved from a memory such as memory 161 of FIG. 1 by a data input vector unit such as data input vector unit 103 of FIG. 1. The elements may correspond to elements of a matrix identified by a convolution operation instruction. In some embodiments, the elements are part of an identified matrix slice of a larger matrix.

At 1703, the retrieved matrix elements are distributed as overlapping subgroups. For example, the elements are distributed into one or more overlapping subgroups and each subgroup is stored in a staging memory unit. In some embodiments, the staging memory unit is a local memory on a processor element such as processing element 101 of FIG. 1. For example, the staging memory unit may be a scratchpad memory location of a processing element. In various embodiments, each overlapping subgroup corresponds to a sub-section of a row of a matrix or matrix slice. For example, a subgroup may include 10 elements from a row of a matrix such as data matrix 703 of FIG. 7B. In various embodiments, a set of subgroups from different rows may be eventually merged to format a linear vector of elements to generate a data input vector. As one example, three subgroups from three consecutive rows may be merged to create a data input vector for a corresponding 3×3 convolution filter.

In various embodiments, the number of overlapping subgroups is determined by the size of the convolution filter. For example, an N×N convolution filter can require N−1 overlapping elements on each end of the subgroup. Subgroups corresponding to the start (or end) of a row do not have overlapping elements at the start (or end) of the subgroup. For example, a 3×3 weight matrix can result in a subgroup for the corresponding data elements having two overlapping elements at each end of the subgroup. In this example, a 10-element subgroup shares two elements with each neighboring subgroup. Subgroups at the start or end of a matrix row may share two elements and subgroups from the interior of the matrix may share four elements with each neighboring subgroup from the same row.

At 1705, the subgroups are distributed into memory banks using a circular shifted pattern. For example, the subgroups are written to a set of memory banks following a circular pattern that allows for improved access time when the subgroups are later accessed. In some embodiments, the subgroups are distributed across two, four, eight, or more memory banks, as appropriate. For example, using four memory banks numbered 0 through 3, the first four subgroups are written to banks 0, 1, 2 and 3. The next four subgroups are first written to banks 1, 2, 3, and 0. The next four subgroups are first written to banks 2, 3, 0, and 1, and so fourth.

In various embodiments, a group of subgroups is written together by first storing the group of subgroups in a circular bank shifter. The number of shifts performed is incremented for each new group in a circular pattern before looping back to no shifts. For example, using groups of four subgroups, the number of shifts increases from 0 to 1 to 2 to 3 and back to 0 shifts. At each cycle, four subgroups (corresponding to a set of four memory banks) are loaded into a right circular bank shifter. Once the appropriate number of right shift operations is performed, the contents of the shifter are written to the memory banks. In various embodiments, the same write pointer can be used to write all four subgroups. Once all four groups are written, the write pointer is updated. In each case, the first subgroup in the shifter is written to bank 0, the second to bank 1, the third to bank 2, and the fourth to bank 3. For example, a first group of four subgroups numbered 0 through 3 is not shifted and subgroups 0, 1, 2, 3 are written to memory banks 0, 1, 2, and 3, respectively. The second group of four subgroups numbered 0 through 3 is shifted once and as a result of the shift, subgroups 3, 0, 1, and 2 are written to memory banks 0, 1, 2, and 3, respectively. The third group of four subgroups numbered 0 through 3 is shifted twice and as a result of the shifts, subgroups 2, 3, 0, and 1 are written to memory banks 0, 1, 2, and 3, respectively. The fourth group of four subgroups numbered 0 through 3 is shifted three times and as a result of the shifts, subgroups 1, 2, 3, and 0 are written to memory banks 0, 1, 2, and 3, respectively. At the fifth group, the circular shift pattern resets and the fifth subgroup of four operates like the first and initial group. In various embodiments, a right circular bank shifter is utilized and a right shift is performed to align the subgroups according to the correct circular shift pattern. In some embodiments, a left shifter is utilized with the appropriate number of left shifts. In some embodiments, an alternative number of subgroups is utilized, for example, two, eight, or another appropriate number of subgroups may be used.

At 1707, the subgroups are read from the memory banks following a specified pattern associated with transposing a matrix. For example, a subgroup is read from each of the memory banks using a specified order associated with transposing the matrix of overlapping subgroups stored in the staging memory unit at 1703. In some embodiments, the read pattern is based on reading subgroup elements from one column at a time, where the columns are the columns of the matrix stored in the staging memory unit. By using the columns of the staging memory unit matrix to determine the read order, the subgroups are read in an order that effectively transposes the staging memory unit matrix. Since the subgroups are read from the memory banks instead of the staging memory unit, the subgroups in the same column as stored in the staging memory unit are instead distributed across memory banks where multiple reads can be performed in parallel. For example, one subgroup from each memory bank can be read simultaneously. For a group of four memory banks, four subgroups can be read in parallel. Similarly, for a group of eight memory banks, eight subgroups can be read in parallel. In various embodiments, reading the corresponding subgroups from the memory banks instead of from the staging memory unit significantly increases the performance and efficiency of reading a column of subgroups. In some embodiments, the subgroups are read into a circular bank shifter, such as a left circular bank shifter (or a circular bank shifter having a direction opposite of the shifter used at 1705). In various embodiments, the circular bank shifter may be used to select the subgroups for outputting a linear vector. In some embodiments, the specific read pattern used to read subgroups from the memory banks is determined by an output organizer unit of a data input vector unit.

At 1709, one or more linearized vectors are outputted. For example, using the subgroups read out of the memory banks at 1707, a linearized vector is outputted as a data input vector. In various embodiments, the linearized vector is used as an operand to a vector unit of a matrix processor unit. The linearized vector may include padding values to adjust the vector size to the matrix processor unit. For example, in some embodiments, a matrix processor unit may operate on 32×32 matrices. Using 10-element subgroups, three subgroups are merged with 2 zero-value elements to generate a 32-element data input vector compatible with the 32×32 matrix processor unit.

Figure 17B:
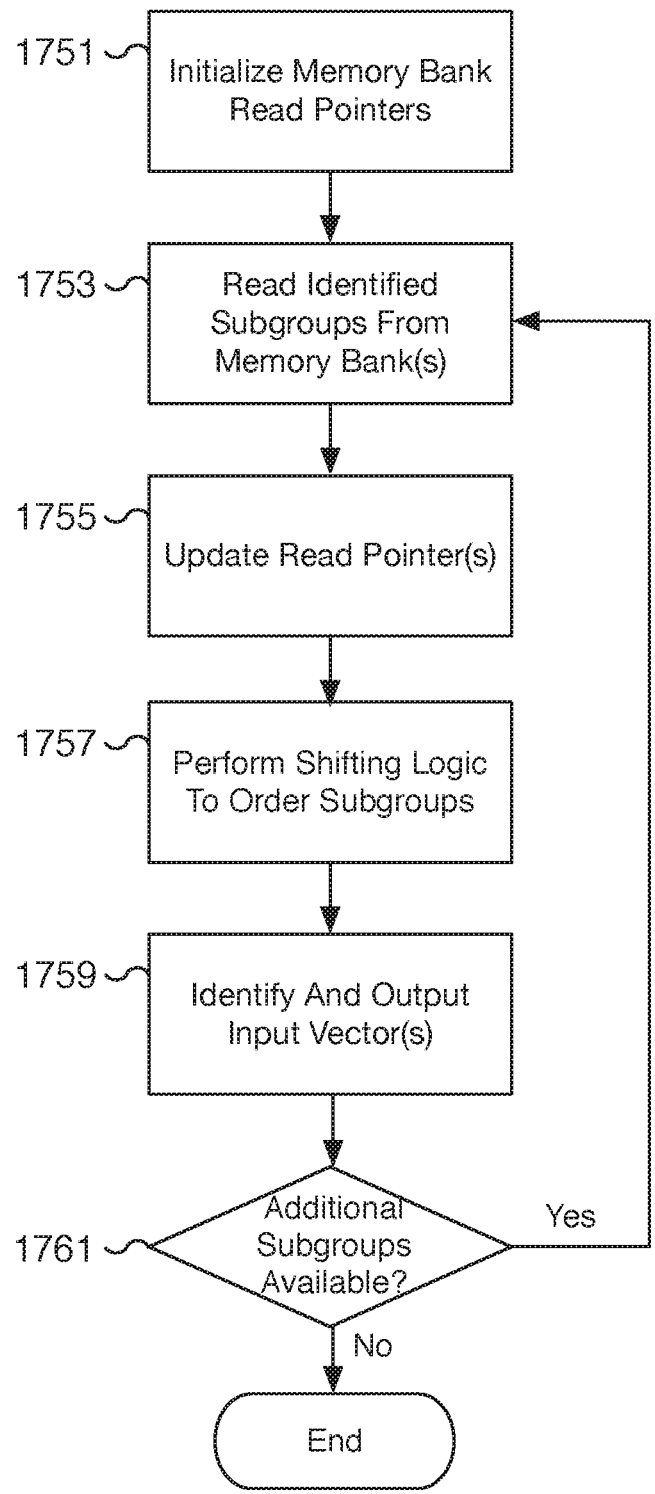
FIG. 17B is a flow chart illustrating an embodiment of a process for preparing data input vectors for performing a two-dimensional convolution operation using a matrix processor unit and vector unit operations.

FIG. 17B is a flow chart illustrating an embodiment of a process for preparing data input vectors for performing a two-dimensional convolution operation using a matrix processor unit and vector unit operations. In various embodiments, the process of FIG. 17B is performed using a data input vector unit to prepare a linearized vector input for a matrix processor unit. The data used to create the data input vector is retrieved from a plurality of memory banks storing overlapping subgroups of matrix elements. In various embodiments, the subgroups and corresponding matrix elements are read from the memory banks by an output organizer unit using a specified pattern associated with transposing a matrix. In some embodiments, the process of FIG. 17B is performed at 1707 and/or 1709 of FIG. 17A. In some embodiments, the process of FIG. 17B is performed using data input vector unit 103 of FIG. 1 and/or data input vector unit 203 of FIG. 2. In some embodiments, the process of FIG. 17B is implemented by a data input vector unit, such as data input vector unit 1803 of FIG. 18, and its associated components. In some embodiments, the process of FIG. 17B is described in further detail by FIGS. 18-29.

At 1751, memory bank read pointers are initialized. In some embodiments, the memory bank read pointers are initialized prior to the start of writing subgroups associated with a new matrix (or matrix slice) to the memory banks. For example, prior to reading a matrix slice from memory, such as memory 161 of FIG. 1, the read pointers for each memory bank are initialized. In various embodiments, since each memory bank has its own read pointer, each memory bank can be accessed independently and in parallel with the other banks. For example, a subgroup can be read from each memory bank using each memory bank's read pointer location allowing for multiple independent reads to be performed in a single clock cycle. In some embodiments, a group of four memory banks and four corresponding read pointers are utilized to allow four subgroups to be read in parallel. Other group sizes such as two, eight, or another appropriate number of groups may be used as well.

In various embodiments, the initial values of the read pointers use a diagonal access pattern across memory banks. For example, using a group of four memory banks, the read pointers for banks 0, 1, 2, and 3 are initialized to point to locations with depths 0, 1, 2, and 3, respectively. In various embodiments, the depth associated with a memory bank corresponds to an offset from the start address location of the memory bank. A depth of 0 corresponds to a zero offset and is the first subgroup in the memory bank. Using the diagonal access pattern, the read pointer for bank 0 points to the first subgroup of bank 0, the read pointer for bank 1 points to the second subgroup of bank 1, the read pointer for bank 2 points to the third subgroup of bank 2, and the read pointer for bank 3 points to the fourth subgroup of bank 3.

In some embodiments, the memory banks are arranged into two or more groups and each group may be initialized as described above. For example, eight memory banks may be utilized and are grouped into two groups, each group having four memory banks. Each group of memory banks is updated using a diagonal access pattern. For example, the read pointer of the first bank of each group is initialized to point to a location with depth 0. Using the example of eight memory banks grouped into two groups, banks 0, 1, 2, and 3 are assigned to a first group and banks 4, 5, 6, and 7 are assigned to a second group. The read pointers for banks 0, 1, 2, and 3 are initialized to point to locations with depths 0, 1, 2, and 3, respectively. Similarly, the read pointers for banks 4, 5, 6, and 7 are initialized to point to locations with depths 0, 1, 2, and 3, respectively.

At 1753, identified subgroups are read from memory bank(s). For example, a storage location, such as a circular bank shifter, is used to store the read subgroups from the memory banks. One subgroup is identified for each empty slot in the storage location. In some embodiments, an invalid or expired subgroup corresponds to an empty slot. Similarly, a slot is considered empty when the previously read subgroup is no longer needed and can be replaced with a new subgroup. For example, an empty 4-element circular bank shifter results in identifying and reading four subgroups from four corresponding memory banks. In various embodiments, the initial state of the storage location is empty and is filled by reading a subgroup from each of the memory banks. Subsequent readings may read from a subset of memory banks since the storage location may be partially filled. The subsequent readings may only require reading one, two, four, or another appropriate number of reads from a corresponding number of memory banks. For example, a group of four memory banks may require initially reading from all four memory banks. Subsequent readings may require only one or two memory banks to be read. As another example, in some embodiments, subsequent readings for a group of eight memory banks may require only four memory banks to be read. In various embodiments, the location a subgroup is read from is based on the read pointer of the memory bank. In some embodiments, a next active read pointer is used to keep track of which subgroup(s) should be read next.

At 1755, read pointer(s) are updated. For example, read pointers for each of the memory banks read from at 1753 are updated. In some embodiments, a read pointer is updated by pointing to the next subgroup in transpose order for the memory bank. Across the group of memory banks, the read pointers access subgroups in diagonal order. The read pointer of a read memory bank is updated using the diagonal access pattern. For example, using a group of four memory banks, a read pointer having a depth of 0 is updated to a depth of 4. Similarly, a read pointer having a depth of 1 is updated to a depth of 5. In some embodiments, the amount to advance the read pointer is based on the number of memory banks. In various embodiments, when a read pointer reaches the end of its memory bank and additional subgroups in the bank have not been read, the read pointer is updated to the next subgroup in the bank in transpose order. For example, using a group of four memory banks, once the read pointer has skipped through a memory bank starting at depth 0 by increments of four, the read pointer loops back starting at a depth of 1 and continues to advance using increments of four. On a subsequent pass through the memory bank, the read pointer loops back starting at a depth of 2 and later, for a final pass, the read pointer starts at a depth of 3. For each pass, the read pointer advances using increments of four. In some embodiments, fewer or more memory banks are used and are advanced accordingly. In some embodiments, the memory banks are arranged into two or more groups and the memory bank read pointers of each group are updated following the group's diagonal access pattern.

At 1757, shifting logic is performed to arrange the read subgroups in transpose order. For example, the subgroups read at 1753 from both current or previous passes are stored in a storage location such as a circular bank shifter. In some embodiments, the circular bank shifter is a left circular bank shifter (or circular bank shifter using the reserve direction of the shifting logic used to distribute the subgroups into the memory banks). Once subgroups are read into the storage location, the subgroups may not be in transpose order and the appropriate number of shifts is performed to arrange the subgroups in order. In some embodiments, the number of shifts is based on the number of reads performed at 1753 for the current pass. For example, in the event one additional subgroup is read, a single shift is performed. As another example, in the event two additional subgroups are read, two shifts are performed. Similarly, in the event four additional subgroups are read, four shifts are performed. In some embodiments, the initial read to populate the storage location does not require any shifts.

At 1759, subgroups are identified and one or more input vectors are outputted. For example, a set of ordered subgroups is identified from the storage location storing read subgroups in transpose order. The set of subgroups is used to create a linearized vector that is outputted as an input data vector for a matrix processor unit. The linearized vector may include padding values to adjust the vector size to the matrix processor unit. For example, in some embodiments, a matrix processor unit may operate on 32×32 matrices. Using 10-element subgroups, three subgroups are merged with 2 zero-value elements to generate a 32-element data input vector compatible with the 32×32 matrix processor unit. In some embodiments, the number of subgroups stored in the storage location is greater than the number used to create an input vector. For example, four subgroups may be stored in the storage location in transpose order but only three are needed for an input vector. The set of subgroups identified may be any three ordered subgroups such as the first three or the last three subgroups.

In some embodiments, one, two, four, or more sets of ordered subgroups are identified and a corresponding number of input vectors are created and outputted. For example, a storage location storing four subgroups can be used to generate two input vectors with each input vector having three subgroups. Each generated input vector can be outputted to a different vector unit of a matrix processor unit. As another example, a storage location storing eight subgroups can output up to six input vectors with each input vector having three subgroups. Depending on the configuration, between two to six input vectors can be generated and outputted to a matrix processor unit. In various embodiments, the input vectors are generated starting with the first subgroup of the storage location and incrementing the start by one subgroup for each next input vector. For example, in the event four input vectors are generated from the storage location, four input vectors are created starting with the first, second, third, and fourth subgroups. In various embodiments, subgroups that start the input vector are no longer needed and are marked as expired or invalid. Their slots in the storage location are considered empty and new subgroups can be read in their place at step 1753. For example, in the event four input vectors are created from a group of eight subgroups, the first four subgroups are marked expired and their locations are considered empty and available for new subgroups at step 1753.

At 1761, a determination is made whether additional subgroups are available for reading. For example, a determination is made whether one or more subgroups are available for reading from the memory banks or whether all subgroups have been read from the memory banks. In the event additional subgroups are available for reading, processing loops back to 1753. In the event no additional subgroups are available for reading, processing completes.

Figure 18:
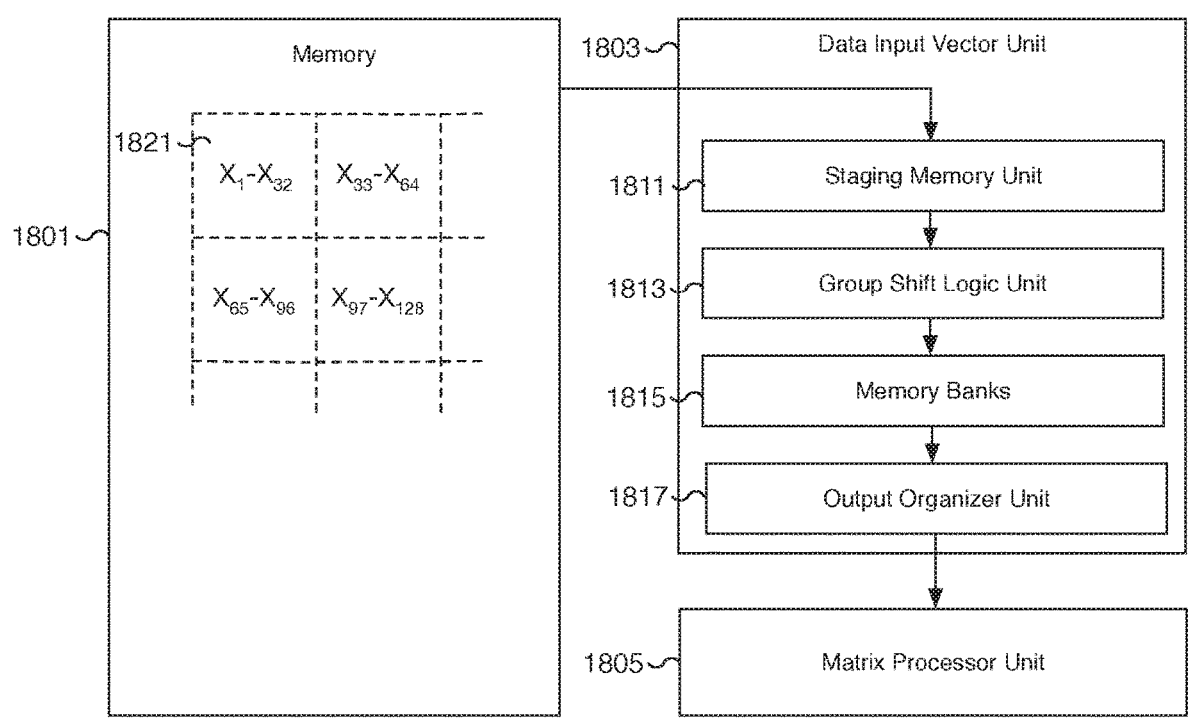
FIG. 18 is a block diagram illustrating an embodiment of a data input vector unit for preparing data input vectors for performing a two-dimensional convolution operation using a matrix processor unit and vector unit operations.

FIG. 18 is a block diagram illustrating an embodiment of a data input vector unit for preparing data input vectors for performing a two-dimensional convolution operation using a matrix processor unit and vector unit operations. In the example shown, data input vector unit 1803 is used to retrieve elements of data matrix 1821 from memory 1801 to prepare data input vectors for matrix processor unit 1805. In various embodiments, the data input vectors are used in part to compute a two-dimensional convolution operation result. Data input vector unit 1803 includes staging memory unit 1811, group shift logic unit 1813, memory banks 1815, and output organizer unit 1817. In some embodiments, data input vector unit 1803 and matrix processor unit 1805 are components of a processing element such as processing element 101 of FIG. 1 and/or processing element 200 of FIG. 2. Additional components of the processing element exist but are not shown. In some embodiments, data input vector unit 1803 is data input vector unit 103 of FIG. 1 and/or data input vector unit 203 of FIG. 2, matrix processor unit 1805 is matrix processor unit 107 of FIG. 1 and/or matrix processor unit 201 of FIG. 2, memory 1801 is memory 161 of FIG. 1, and data matrix 1821 is data matrix 703 of FIG. 7B.

In some embodiments, data matrix 1821 is depicted with four labeled matrix slices. Each matrix slice is a 32×32 sub-matrix or matrix slice of data matrix 1821. Each matrix slice includes 32 rows with each row having 32 elements. The first matrix slice is labeled $X_1$-$X_{32}$ and includes the rows from top row $X_1$ to bottom row $X_{32}$. The second matrix slice is labeled $X_{33}$-$X_{64}$ and includes the rows from top row $X_{33}$ to bottom row $X_{64}$. The third matrix slice is labeled $X_{65}$-$X_{96}$ and includes the rows from top row $X_{65}$ to bottom row $X_{96}$. The fourth matrix slice is labeled $X_{97}$-$X_{128}$ and includes the rows from top row $X_{97}$ to bottom row $X_{128}$. Rows $X_1$ and $X_{33}$ are in the same row of data matrix 1821. Similarly, rows $X_{65}$ and $X_{97}$ are in the same row of data matrix 1821. In the example shown, the matrix slices are sized as 32×32 matrices to fit matrix processor unit 1805, which operates on 32×32 matrices. In various embodiments, data matrix 1821 is much larger than the four labeled matrix slices as indicated by the dotted lines extending past the boundaries of the matrix slices. The matrix slices are depicted to demonstrate that a matrix much larger than the maximum matrix operand size for a matrix processor unit can be sliced into smaller matrices. The smaller matrix slices are compatible with matrix processor unit 1805 and are used for computing convolution results. In various embodiments, when processing a matrix slice, elements from neighboring slices may be needed to ensure that the matrix slice when used as a matrix operand is compatible with the size of the convolution filter. For example, a 3×3 weight matrix may require elements from two columns and/or two rows of neighboring matrix slices.

In some embodiments, the processes of FIGS. 3-6 and FIGS. 17A and 17B are performed at least in part by using data input vector unit 1803 and its components. For example, in various embodiments, the data elements of a matrix slice of data matrix 1821 are identified and retrieved from memory 1801 at 1701 of FIG. 17A and distributed as overlapping groups into staging memory unit 1811 at 1703 of FIG. 17A. Group shift logic unit 1813 distributes the overlapping subgroups into memory banks 1815 at 1705 of FIG. 17A. Output organizer unit 1817 reads the subgroups from memory banks 1815 using a transpose pattern at 1707 of FIG. 17A and outputs linearized vectors to matrix processor unit 1805 at 1709 of FIG. 17A. In some embodiments, output organizer unit 1817 performs the process of FIG. 17B including initializing and updating read pointers for memory banks 1815, reading subgroups from memory banks 1815, performing the shifting logic to order the read subgroups, and identifying and outputting input vectors from the ordered subgroups to matrix processor unit 1805.

In various embodiments, group shift logic unit 1813 and output organizer unit 1817 include circular bank shifters that operate in reverse directions.

Figure 19:
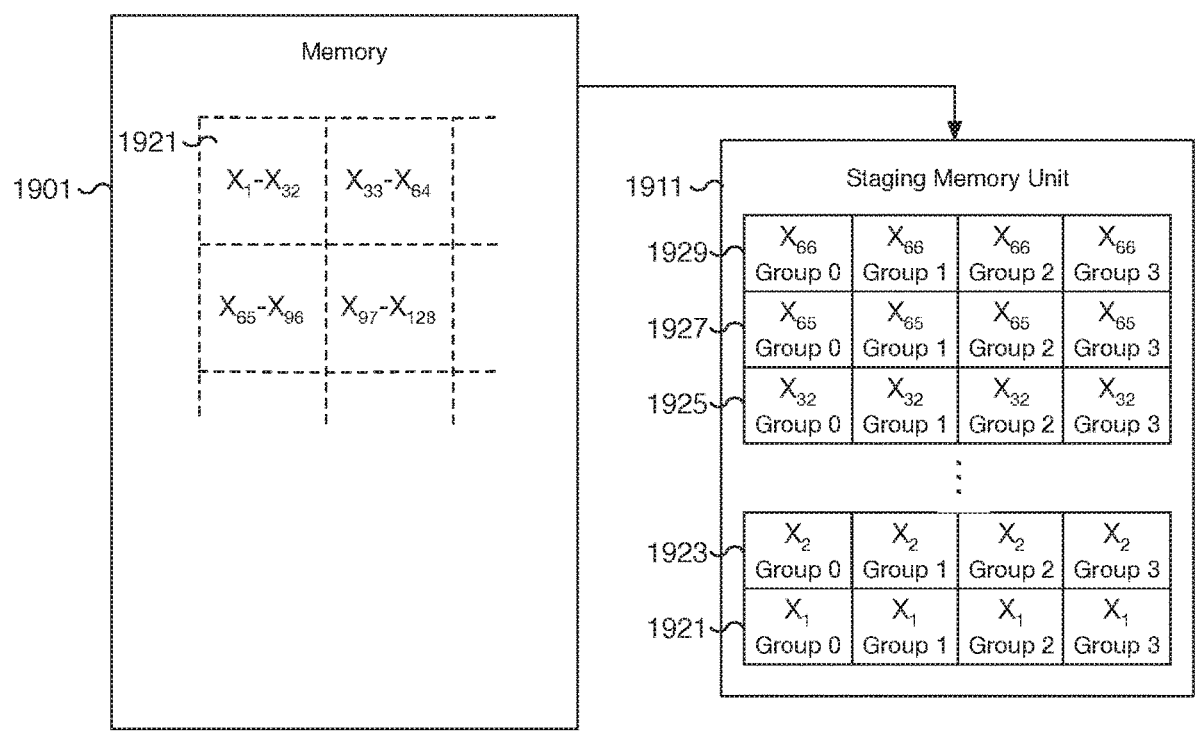
FIG. 19 is a block diagram illustrating an embodiment of a staging memory unit for preparing data input vectors for performing a two-dimensional convolution operation using a matrix processor unit and vector unit operations.

FIG. 19 is a block diagram illustrating an embodiment of a staging memory unit for preparing data input vectors for performing a two-dimensional convolution operation using a matrix processor unit and vector unit operations. In the example shown, data matrix 1921 is stored in memory 1901 and staging memory unit 1911 is used to store overlapping subgroups created from elements identified in a matrix slice of data matrix 1921. Staging memory unit 1911 includes rows of overlapping subgroups including subgroup rows 1921, 1923, 1925, 1927, and 1929. Additional rows of overlapping subgroups are not shown but indicated by the vertical ellipses between subgroup rows 1923 and 1925. In various embodiments, each subgroup row contains multiple subgroups. For example, subgroup row 1921 includes four subgroups for row $X_1$ of the matrix slice $X_1$-$X_{32}$. The four subgroups are labeled as groups 0 through 3. In some embodiments, staging memory unit 1911 is staging memory unit 1811 of FIG. 18 and/or is a component of a data input vector unit such as data input vector unit 1803 of FIG. 18. In some embodiments, memory 1901 is memory 1801 of FIG. 18 and data matrix 1921 is data matrix 1821 of FIG. 18.

In some embodiments, the overlapping subgroups are distributed to staging memory unit 1911 by a data input vector unit such as data input vector unit 1803 of FIG. 18. For a particular matrix slice, the subgroups are distributed starting with the first row of the matrix slice (e.g., row $X_1$ for matrix slice $X_1$-$X_{32}$) and may continue past the last row of the slice (e.g., row $X_{32}$ for matrix slice $X_1$-$X_{32}$) to include one or more rows of the matrix slice below (e.g., rows $X_{65}$ and $X_{66}$ of matrix slice $X_{65}$-$X_{96}$). In various embodiments, the number of additional rows from a neighboring matrix slice to include depends on the convolution filter size. For an N×N convolution filter, N−1 rows are included from a neighboring matrix slice.

As shown in FIG. 19, each subgroup row includes multiple subgroups. For example, subgroup rows 1921, 1923, 1925, 1927, and 1929 each include four subgroups labeled groups 0 through 3. Subgroups labeled group 0 (e.g., $X_1$ Group 0, $X_2$ Group 0, $X_{32}$ Group 0, $X_{65}$ Group 0, and $X_{66}$ Group 0) include elements that overlap with the group 1 subgroup of the same row. Subgroups labeled group 1 include elements that overlap with groups 0 and 2 subgroups of the same row. Subgroups labeled group 2 include elements that overlap with groups 1 and 3 subgroups of the same row. And subgroups labeled group 3 include elements that overlap with the group 2 subgroup of the same row and the group 0 subgroup of the corresponding row from matrix slice $X_{33}$-$X_{64}$. In various embodiments, the number of overlapping elements on each end of a subgroup depends on the convolution filter size. For an N×N convolution filter, N−1 elements can overlap at each end of a subgroup. For example, for a 3×3 weight filter, two elements may overlap at each end of the subgroup.

Figure 20A:
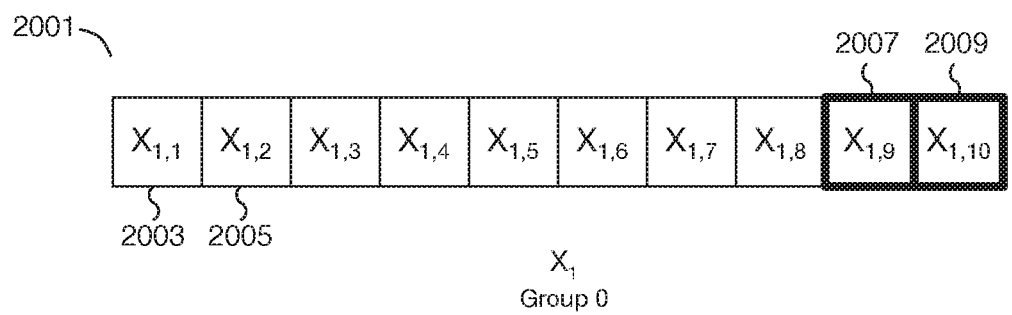
FIGS. 20A-20D are diagrams illustrating examples of overlapping subgroups.
Figure 20B:
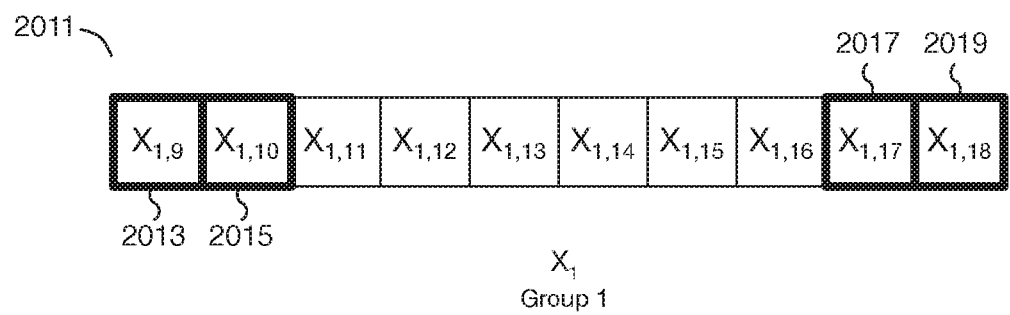
Figure 20C:
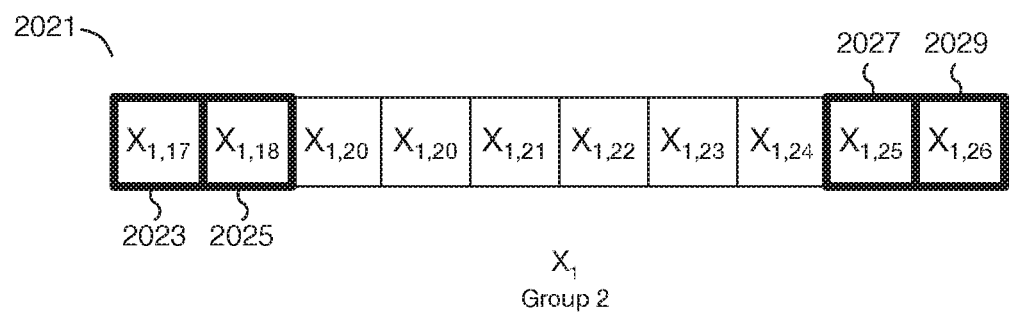
Figure 20D:
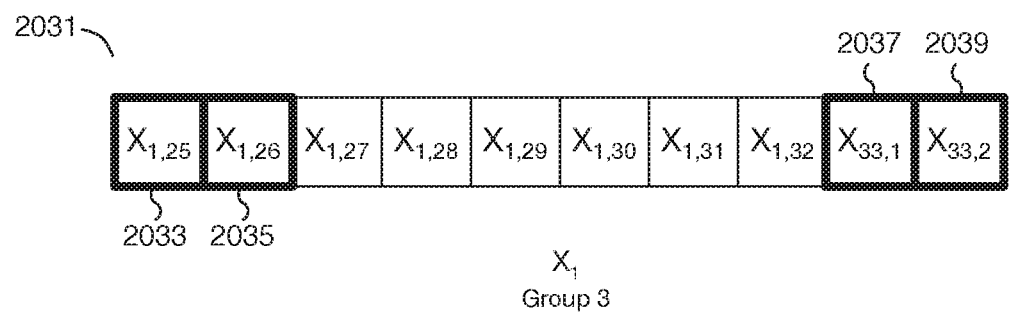

FIGS. 20A-20D are diagrams illustrating examples of overlapping subgroups. The diagram of FIG. 20A depicts subgroup 2001 corresponding to overlapping subgroup $X_1$ Group 0. The diagram of FIG. 20B depicts subgroup 2011 corresponding to overlapping subgroup $X_1$ Group 1. The diagram of FIG. 20C depicts subgroup 2021 corresponding to overlapping subgroup $X_1$ Group 2. And the diagram of FIG. 20D depicts subgroup 2031 corresponding to overlapping subgroup $X_1$ Group 3. In some embodiments, the four overlapping subgroups of FIGS. 20A-20D are part of subgroup row 1921 of FIG. 19 and correspond to elements from a matrix slice of data matrix 1921 of FIG. 19.

In some embodiments, subgroup 2001 of FIG. 20A includes elements $X_{1,1}$ through $X_{1,10}$ from data matrix 1921 of FIG. 19. Elements $X_{1,1}$ through $X_{1,10}$ are elements from row 1 of a matrix slice and correspond to elements from columns 1 through 10. Elements 2003 and 2005 are the first two elements of subgroup 2001. Elements 2007 and 2009 are the last two elements of subgroup 2001.

In some embodiments, subgroup 2011 of FIG. 20B includes elements $X_{1,9}$ through $X_{1,18}$ from data matrix 1921 of FIG. 19. Elements $X_{1,9}$ through $X_{1,18}$ are elements from row 1 of a matrix slice and correspond to elements from columns 9 through 18. Elements 2013 and 2015 are the first two elements of subgroup 2011. Elements 2017 and 2019 are the last two elements of subgroup 2011.

In some embodiments, subgroup 2021 of FIG. 20C includes elements $X_{1,17}$ through $X_{1,26}$ from data matrix 1921 of FIG. 19. Elements $X_{1,17}$ through $X_{1,26}$ are elements from row 1 of a matrix slice and correspond to elements from columns 17 through 26. Elements 2023 and 2025 are the first two elements of subgroup 2021. Elements 2027 and 2029 are the last two elements of subgroup 2021.

In some embodiments, subgroup 2031 of FIG. 20D includes elements $X_{1,25}$ through $X_{1,32}$ and elements $X_{33,1}$ and $X_{33,2}$ from data matrix 1921 of FIG. 19. Elements $X_{1,25}$ through $X_{1,32}$ are elements from row 1 of a matrix slice and correspond to elements from columns 25 through 32. Elements $X_{33,1}$ and $X_{33,2}$ are elements from row 1 of the neighboring matrix slice and correspond to elements from columns 1 and 2 of the neighboring matrix slice. Elements 2033 and 2035 are the first two elements of subgroup 2031. Elements 2037 and 2039 are the last two elements of subgroup 2031.

In the examples of FIGS. 20A-20D, the overlapping elements of subgroups 2001, 2011, 2021, and 2031 are depicted using thicker borders. For example, element 2007 ($X_{1,9}$) of subgroup 2001 overlaps with element 2013 of subgroup 2011 and element 2009 ($X_{1,10}$) of subgroup 2001 overlaps with element 2015 of subgroup 2011. Similarly, elements 2017 and 2019 of subgroup 2011 overlap with elements 2023 and 2025, respectively, of subgroup 2021. And elements 2027 and 2029 of subgroup 2021 overlap with elements 2033 and 2035, respectively, of subgroup 2031.

Figure 21:
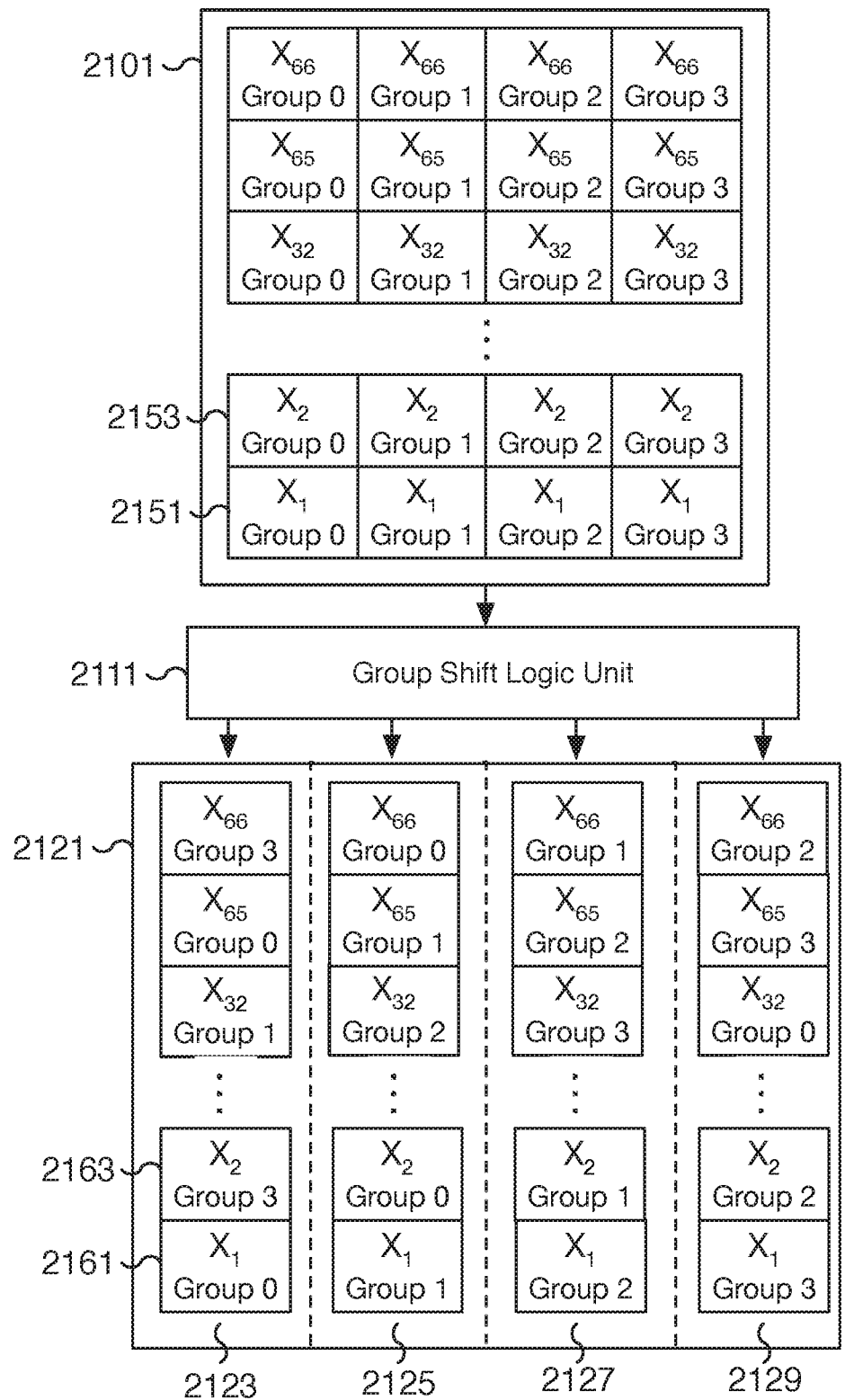
FIG. 21 is a block diagram illustrating components of an embodiment of a data input vector unit for preparing data input vectors for performing a two-dimensional convolution operation using a matrix processor unit and vector unit operations.

FIG. 21 is a block diagram illustrating components of an embodiment of a data input vector unit for preparing data input vectors for performing a two-dimensional convolution operation using a matrix processor unit and vector unit operations. In the example shown, staging memory unit 2101, group shift logic unit 2111, and memory banks 2121 are components of a data input vector unit. In some embodiments, the components depicted are components of data input vector unit 1803 of FIG. 18 and/or the data input vector unit associated with staging memory unit 1911 of FIG. 19. Staging memory unit 2101 includes overlapping subgroups from rows $X_1$ through $X_{32}$ and rows $X_{66}$ and $X_{65}$ of corresponding matrix slices of a data matrix such as data matrix 1821 of FIG. 18 and/or data matrix 1921 of FIG. 19. Group shift logic unit 2111 distributes the subgroups stored in staging memory unit 2101 to memory banks 2121 using a circular shifted pattern. Memory banks 2121 include four memory banks 2123, 2125, 2127, and 2129 corresponding to banks 0, 1, 2, and 3, respectively. In some embodiments, subgroup rows 2151 and 2153 stored in staging memory unit 2101 correspond to subgroup rows 2161 and 2163, respectively, in memory banks 2121 after a circular shifted pattern is applied. In some embodiments, staging memory unit 2101 is staging memory unit 1811 of FIG. 18 and/or staging memory unit 1911 of FIG. 19, group shift logic unit 2111 is group shift logic unit 1813 of FIG. 18, and memory banks 2121 is memory banks 1815 of FIG. 18.

In some embodiments, a circular shifted pattern is applied by group shift logic unit 2111 to distribute subgroups from staging memory unit 2101 to memory banks 2121. For example, each row of subgroups read from staging memory unit 2101 is shifted by an incremental amount before being written to memory banks 2121. The circular shifted pattern allows for a diagonal access pattern when reading elements from the different memory banks of memory banks 2121. In some embodiments, the circular shifted pattern is implemented using a right (or left) circular bank shifter. In some embodiments, the different memory banks of memory banks 2121 can be accessed independently and in parallel allowing multiple subgroups to be read from memory banks 2121 in parallel. In various embodiments, each memory bank of memory banks 2121 has its own read pointer (not shown) to indicate the next subgroup to read. In some embodiments, a next active read pointer is used to keep track of which subgroup(s) should be read next.

Figure 22:
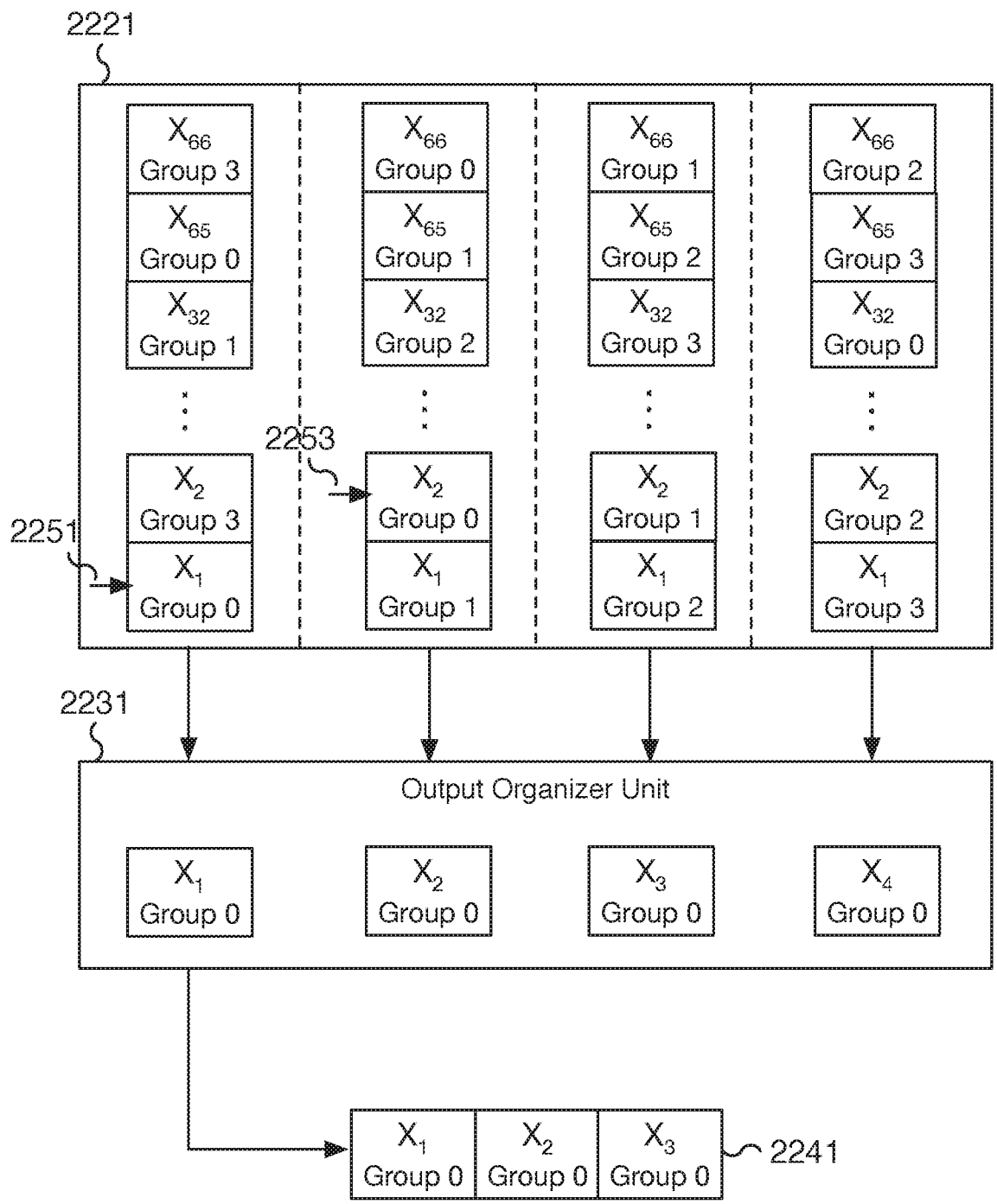
FIG. 22 is a block diagram illustrating components of an embodiment of a data input vector unit for preparing data input vectors for performing a two-dimensional convolution operation using a matrix processor unit and vector unit operations.

FIG. 22 is a block diagram illustrating components of an embodiment of a data input vector unit for preparing data input vectors for performing a two-dimensional convolution operation using a matrix processor unit and vector unit operations. In the example shown, memory banks 2221 and output organizer unit 2231 are components of a data input vector unit. In some embodiments, the components depicted are components of data input vector unit 1803 of FIG. 18 and/or the data input vector unit associated with staging memory unit 1911 of FIG. 19. Memory banks 2221 store overlapping subgroups from rows $X_1$ through $X_{32}$ and rows $X_{66}$ and $X_{65}$ of corresponding matrix slices of a data matrix such as data matrix 1821 of FIG. 18 and/or data matrix 1921 of FIG. 19. The subgroups are distributed in the memory banks using a circular shifted pattern. Output organizer unit 2231 reads subgroups from memory banks 2221. Each memory bank of memory banks 2221 includes a read pointer. Two read pointers 2251 and 2253 are shown corresponding to memory banks 0 and 1, respectively, of memory banks 2221. Additional read pointers for memory banks 2 and 3 of memory banks 2221 are not shown. In the example shown, output organizer unit 2231 includes four subgroups corresponding to subgroups $X_1$ Group 0, $X_2$ Group 0, $X_3$ Group 0, and $X_4$ Group 0. In some embodiments, the subgroups are stored in a storage location such as a circular bank shifter. In some embodiments, the circular bank shifter is a left circular bank shifter (or a circular bank shifter using the reserve direction of the shifting logic used to distribute the subgroups into memory banks 2221). Output organizer unit 2231 outputs input vector 2241 using the subgroups read from memory banks 2221. In various embodiments, input vector 2241 is a data input vector used as an argument to a matrix processor unit such as matrix processor unit 107 of FIG. 1. In some embodiments, input vector 2241 includes additional padding, such as zero-value elements, to flush out the size of the input vector to be compatible with the associated matrix processor unit. In some embodiments, memory banks 2221 is memory banks 1815 of FIG. 18 and/or is memory banks 2121 of FIG. 21 and output organizer unit 2231 is output organizer unit 1817 of FIG. 18.

In some embodiments, output organizer unit 2231 reads subgroups from memory banks 2221. For example, output organizer unit 2231 may rely on read pointers of each memory bank, such as read pointers 2251 and 2253, to point to the next subgroup to read. In the example shown, read pointer 2251 points to subgroup $X_1$ Group 0 and, as shown, subgroup $X_1$ Group 0 is read into output organizer unit 2231. Once a sufficient number of subgroups have been read, for example, filling the associated storage location (not shown) of output organizer unit 2231, an input vector is generated. In the example of FIG. 22, output organizer unit 2231 can read at most four subgroups. For example, four subgroups, one from each memory bank of memory bank 2221, are read by output organizer unit 2231. In some embodiments, the four memory bank reads to read four subgroups are performed in parallel. In various embodiments, output organizer unit 2231 generates input vector 2241 using the first three subgroups ($X_1$ Group 0, $X_2$ Group 0, and $X_3$ Group 0) by first ensuring the subgroups are arranged in transpose order. The transpose order may be applied by using a diagonal access pattern to read subgroups from memory banks 2221 and applying an appropriate number of shifts to the read subgroups. For an initial read from a new matrix slice as shown in FIG. 22, no shifts are needed. On subsequent reads, one or more shifts may be applied after new subgroups are read to replace expired subgroups. In various embodiments, once a subgroup is read, a next active read pointer is updated to keep track of which subgroup(s) from which banks should be read next. In some embodiments, the next active pointer indicates which memory bank of memory banks 2221 should be read next to continue with a diagonal access pattern. In some embodiments, the process used to generate input vector 2241 is described with respect to the processes of FIGS. 17A and 17B.

Figure 23:
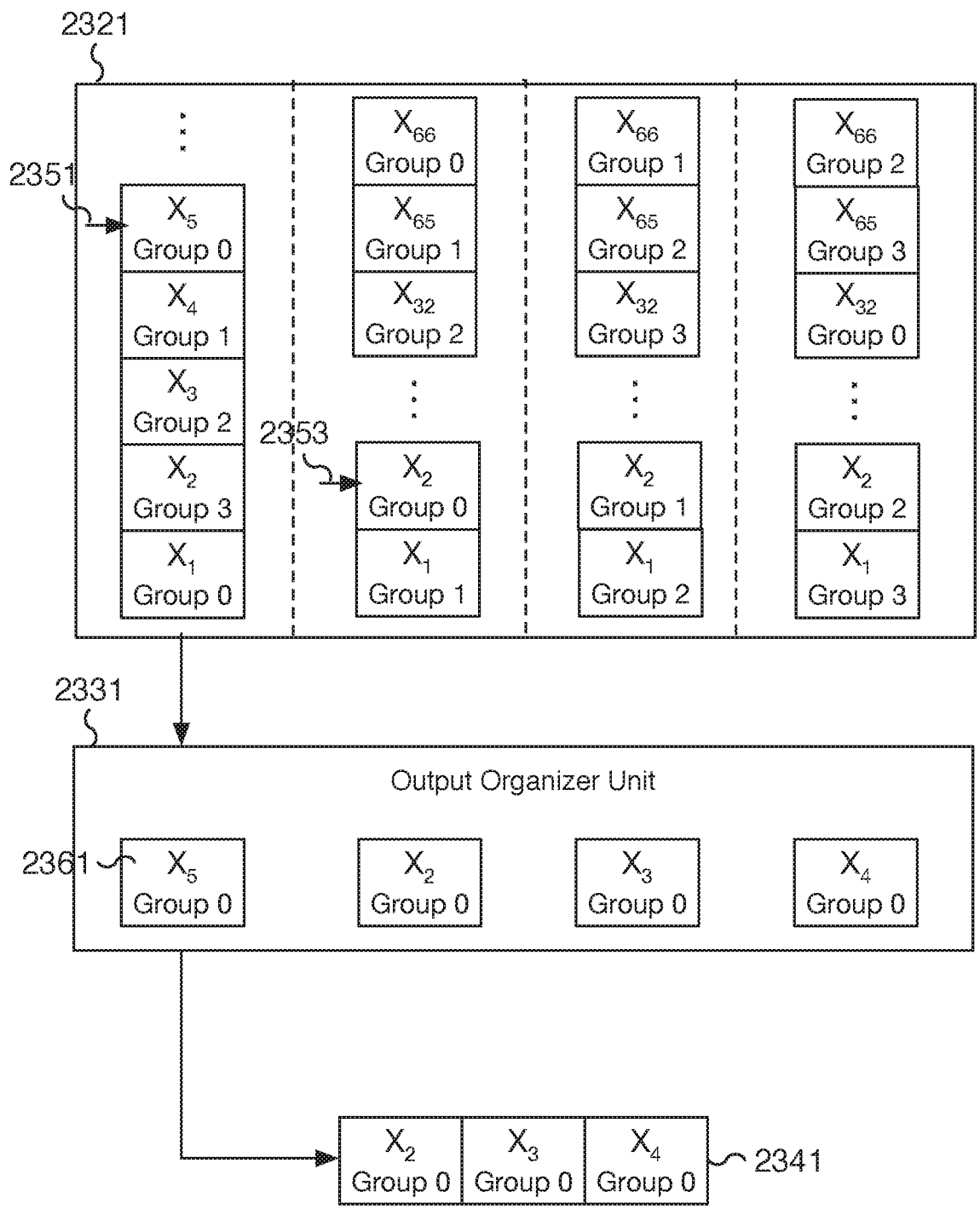
FIG. 23 is a block diagram illustrating components of an embodiment of a data input vector unit for preparing data input vectors for performing a two-dimensional convolution operation using a matrix processor unit and vector unit operations.

FIG. 23 is a block diagram illustrating components of an embodiment of a data input vector unit for preparing data input vectors for performing a two-dimensional convolution operation using a matrix processor unit and vector unit operations. In the example shown, memory banks 2321 and output organizer unit 2331 are components of a data input vector unit with a single output port. In some embodiments, the components depicted in FIG. 23 are the components of FIG. 22 after input vector 2241 of FIG. 22 has been outputted. For example, memory banks 2321 is memory banks 2221 of FIG. 22 and output organizer unit 2331 is output organizer unit 2231 of FIG. 22. Read pointers 2351 and 2353 of memory banks 2321 are read pointers 2251 and 2253, respectively, of memory banks 2221 of FIG. 22 updated to point to different subgroups. Output organizer unit 2331 performs a single subgroup read of subgroup 2361 ($X_5$ Group 0) from memory bank 0 of memory banks 2321 using read pointer 2351 and generates input vector 2341 after aligning the read subgroups in transpose order. Although input vector 2341 is generated after reordering, in the diagram of FIG. 23, the order of the subgroups for output organizer unit 2331 is shown prior to performing the reordering. Input vector 2341 includes subgroups $X_2$ Group 0, $X_3$ Group 0, and $X_4$ Group 0.

In some embodiments, output organizer unit 2331 reads a single subgroup 2361 from memory banks 2321 to replace expired subgroup $X_1$ Group 0 used in input vector 2241 of FIG. 22. For example, the next subgroup ($X_5$ Group 0) may be indicated by a next active pointer for the next memory bank to read from and a memory bank read pointer, such as read pointer 2351, for the next subgroup of the memory bank to read. In the example shown, read pointer 2351 points to the next subgroup ($X_5$ Group 0). Subgroup 2361 ($X_5$ Group 0) is read by output organizer unit 2331 into a storage location. In some embodiments, the subgroup is read into the first slot of the storage location, such as a left circular bank shifter. A single shift is performed to reorder the read subgroups into transpose order. For example, prior to a shift, the subgroups are in the order: $X_5$ Group 0, $X_2$ Group 0, $X_3$ Group 0, and $X_4$ Group 0. Newly read subgroup $X_5$ Group 0 replaced expired subgroup $X_1$ Group 0. Once a left shift is performed, the subgroups are now arranged in the order: $X_2$ Group 0, $X_3$ Group 0, $X_4$ Group 0, and $X_5$ Group 0. Using the first three subgroups, input vector 2341 is generated to include only subgroups $X_2$ Group 0, $X_3$ Group 0, and $X_4$ Group 0. Once input vector 2341 is generated, subgroup $X_2$ Group 0 is no longer needed, is marked as expired, and will be replaced on a subsequent read with a new subgroup from memory banks 2321. In the example of FIG. 23, only a single input vector is generated each cycle since the data input vector unit is limited to a single output port.

Figure 24:
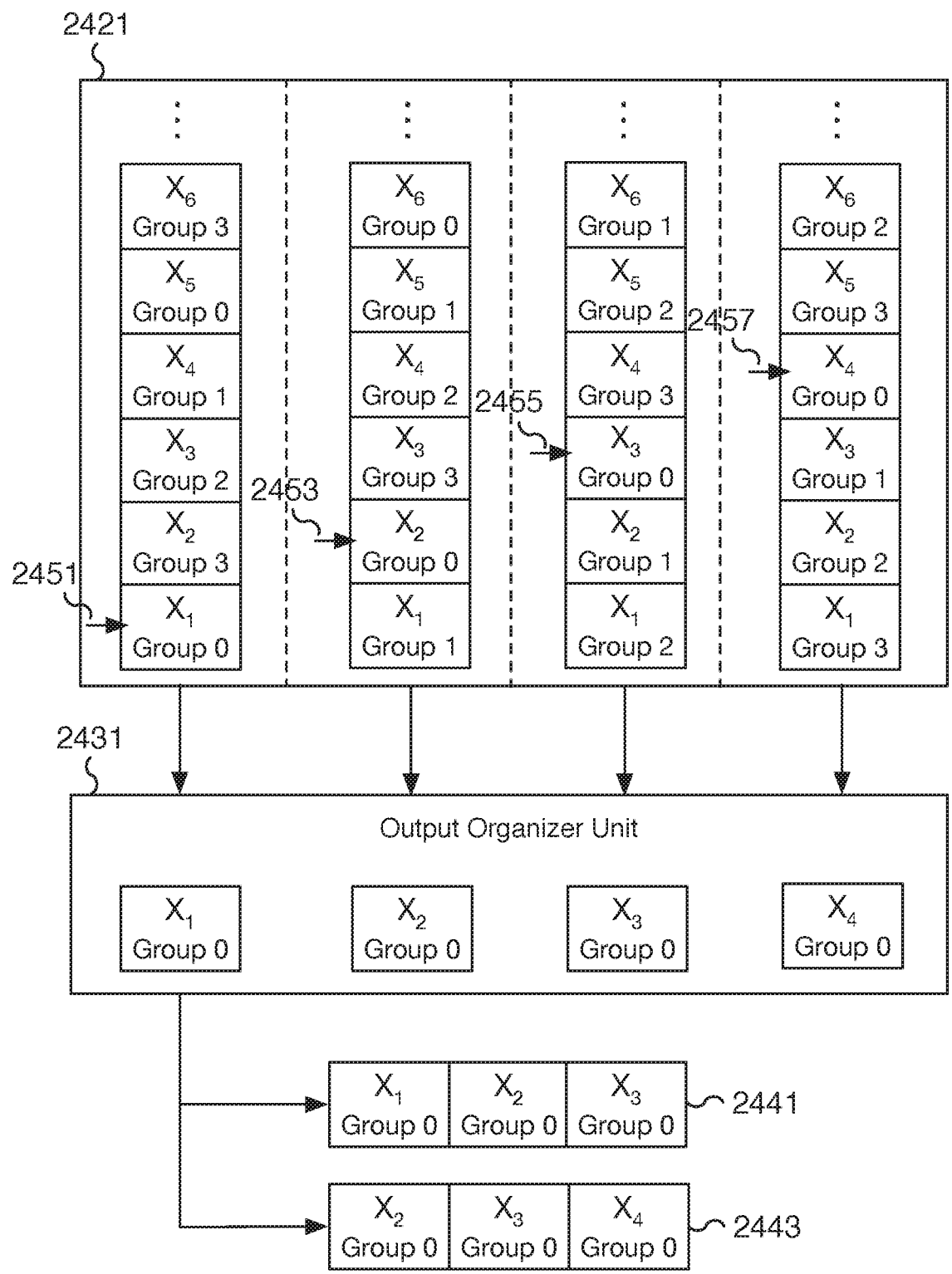
FIG. 24 is a block diagram illustrating components of an embodiment of a data input vector unit with multiple output ports for preparing data input vectors for performing a two-dimensional convolution operation using a matrix processor unit and vector unit operations.

FIG. 24 is a block diagram illustrating components of an embodiment of a data input vector unit with multiple output ports for preparing data input vectors for performing a two-dimensional convolution operation using a matrix processor unit and vector unit operations. In the example shown, memory banks 2421 and output organizer unit 2431 are components of a data input vector unit with two output ports. In some embodiments, the components depicted are components of data input vector unit 1803 of FIG. 18 and/or the data input vector unit associated with staging memory unit 1911 of FIG. 19. Memory banks 2421 store overlapping subgroups from rows $X_1$ through $X_{32}$ and rows $X_{66}$ and $X_{65}$ (not all shown) of corresponding matrix slices of a data matrix such as data matrix 1821 of FIG. 18 and/or data matrix 1921 of FIG. 19. The subgroups are distributed in the memory banks using a circular shifted pattern. Output organizer unit 2431 reads subgroups from memory banks 2421. Each memory bank of memory banks 2421 includes a read pointer. Read pointers 2451, 2453, 2455, and 2457 are read pointers for memory banks 0, 1, 2, and 3, respectively, of memory banks 2421. In the example shown, output organizer unit 2431 includes four subgroups corresponding to subgroups $X_1$ Group 0, $X_2$ Group 0, $X_3$ Group 0, and $X_4$ Group 0. In some embodiments, the subgroups are stored in a storage location such as a circular bank shifter. In some embodiments, the circular bank shifter is a left circular bank shifter (or a circular bank shifter using the reserve direction of the shifting logic used to distribute the subgroups into memory banks 2421). Output organizer unit 2431 outputs input vectors 2441 and 2443 using the subgroups read from memory banks 2421. In various embodiments, two input vectors are generated, one for each output port of the data input vector unit. In some embodiments, input vectors 2441 and 2443 are data input vectors used as arguments to a matrix processor unit such as matrix processor unit 107 of FIG. 1. Each input vector may be passed to a different vector unit of a matrix processor unit. In some embodiments, input vectors 2441 and 2443 include additional padding, such as zero-value elements, to flush out the size of the input vectors to be compatible with the associated matrix processor unit. In some embodiments, memory banks 2421 is memory banks 1815 of FIG. 18 and/or is memory banks 2121 of FIG. 21 and output organizer unit 2431 is output organizer unit 1817 of FIG. 18.

In some embodiments, output organizer unit 2431 reads subgroups from memory banks 2421 as described with respect to FIG. 22. For example, using read pointers 2451, 2453, 2455, and 2457, subgroups $X_1$ Group 0, $X_2$ Group 0, $X_3$ Group 0, and $X_4$ Group 0 are read into a storage location of output organizer unit 2431. In some embodiments, a next active pointer indicates which memory bank of memory banks 2421 should be read next to continue with a diagonal access pattern. However, unlike the data input vector unit of FIG. 22, the data input vector unit of FIG. 24 includes two output ports and two input vectors are generated and outputted each cycle. Input vector 2441 is generated using the first three subgroups (e.g., slots 0, 1, and 2 of the storage location) corresponding to subgroups $X_1$ Group 0, $X_2$ Group 0, and $X_3$ Group 0. Input vector 2443 is generated by starting with the second subgroup and selecting three subgroups (e.g., slots 1, 2, and 3 of the storage location) corresponding to subgroups $X_2$ Group 0, $X_3$ Group 0, and $X_4$ Group 0. Once input vectors 2441 and 2443 are outputted, $X_1$ Group 0 and $X_2$ Group 0 are no longer needed and are marked expired. Subsequent reads from memory banks 2421 can replace the expired subgroups.

Figure 25:
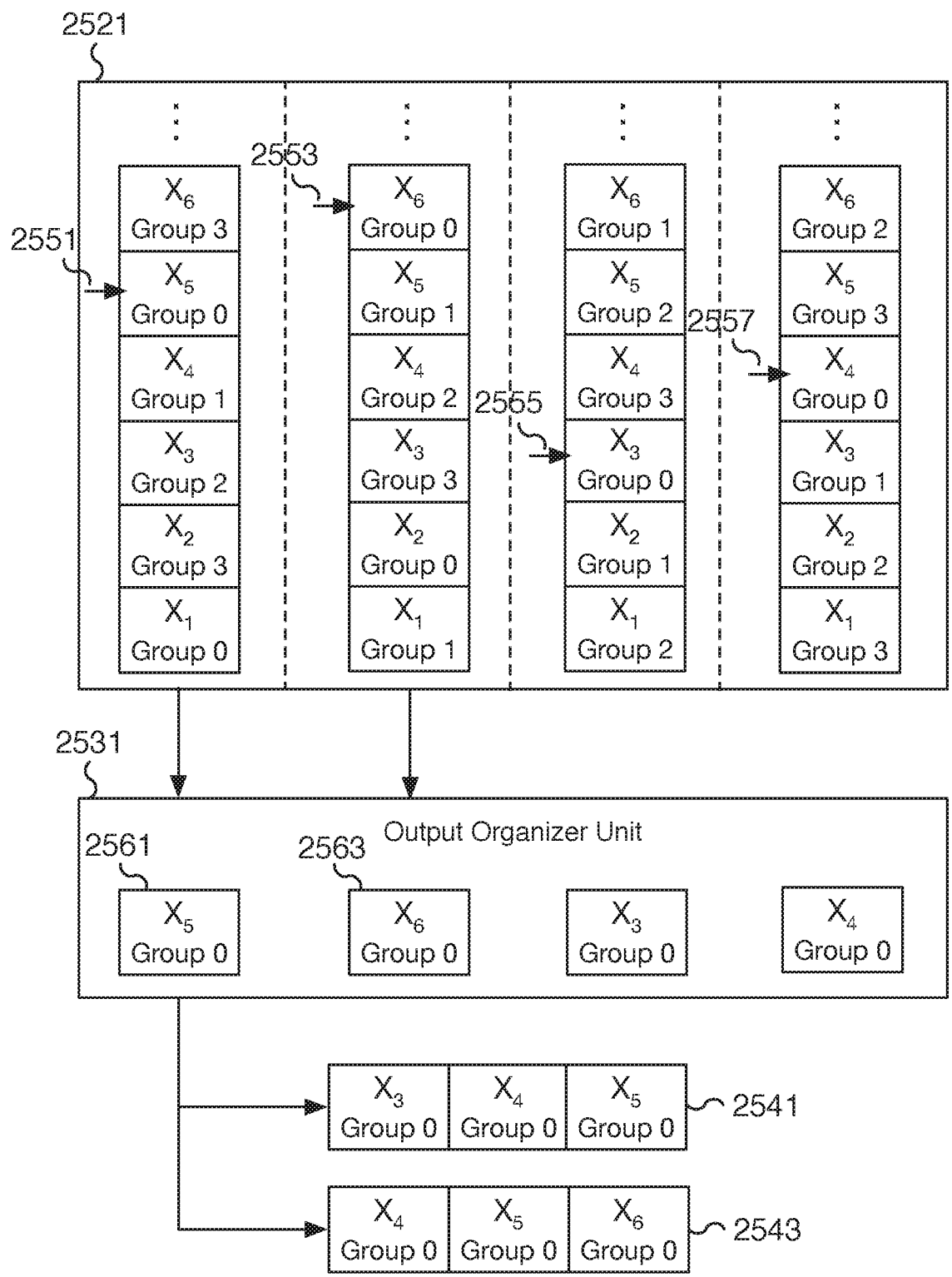
FIG. 25 is a block diagram illustrating components of an embodiment of a data input vector unit for preparing data input vectors for performing a two-dimensional convolution operation using a matrix processor unit and vector unit operations.

FIG. 25 is a block diagram illustrating components of an embodiment of a data input vector unit for preparing data input vectors for performing a two-dimensional convolution operation using a matrix processor unit and vector unit operations. In the example shown, memory banks 2521 and output organizer unit 2531 are components of a data input vector unit with two output ports. In some embodiments, the components depicted in FIG. 25 are the components of FIG. 24 after input vectors 2441 and 2443 of FIG. 24 have been outputted. For example, memory banks 2521 is memory banks 2421 of FIG. 24 and output organizer unit 2531 is output organizer unit 2431 of FIG. 24. Read pointers 2551, 2553, 2555, and 2557 of memory banks 2521 are read pointers 2451, 2453, 2455, and 2457, respectively, of memory banks 2421 of FIG. 24. Read pointers 2551 and 2553 have been updated to point to different subgroups. Output organizer unit 2531 performs two subgroup reads from different memory banks of memory banks 2521, allowing the reads to be performed in parallel. Subgroup 2561 ($X_5$ Group 0) is read from memory bank 0 of memory banks 2521 using read pointer 2551 and subgroup 2563 ($X_6$ Group 0) is read from memory bank 1 of memory banks 2521 using read pointer 2553. Output organizer unit 2531 generates input vectors 2541 and 2543 after aligning the read subgroups in transpose order. Although input vectors 2541 and 2543 are generated after reordering, in the diagram of FIG. 25, the order of the subgroups for output organizer unit 2531 is shown prior to performing the reordering. Input vector 2541 includes subgroups $X_3$ Group 0, $X_4$ Group 0, and $X_5$ Group 0. Input vector 2543 includes subgroups $X_4$ Group 0, $X_5$ Group 0, and $X_6$ Group 0.

In some embodiments, output organizer unit 2531 reads subgroups 2561 and 2563 from different memory banks of memory banks 2521 to replace expired subgroups $X_1$ Group 0 and $X_2$ Group 0 used in input vectors 2441 and 2443 of FIG. 24. For example, the subgroup 2561 ($X_5$ Group 0) may be indicated by a next active pointer for the next memory bank to read from and a memory bank read pointer, such as read pointer 2551, for the next subgroup of the memory bank to read. In the example shown, read pointer 2551 points to the next subgroup ($X_5$ Group 0). Since two subgroups are read, subgroups 2561 ($X_5$ Group 0) and 2563 ($X_6$ Group 0) are read by output organizer unit 2531 into a storage location. In some embodiments, the subgroups are read into the first two slots of the storage location, such as a left circular bank shifter. Two shifts are performed to reorder the read subgroups into transpose order. For example, prior to a shift, the subgroups are in the order: $X_5$ Group 0, $X_6$ Group 0, $X_3$ Group 0, and $X_4$ Group 0. Newly read subgroups $X_5$ Group 0 and $X_6$ Group 0 replaced expired subgroups $X_1$ Group 0 and $X_2$ Group 0. Once the two left shifts are performed, the subgroups are now arranged in the order. $X_3$ Group 0, $X_4$ Group 0, $X_5$ Group 0, and $X_6$ Group 0. Using the first three subgroups, input vector 2541 is generated to include only subgroups $X_3$ Group 0, $X_4$ Group 0, and $X_5$ Group 0. Starting with the second subgroup and selecting three subgroups, input vector 2543 is generated to include only subgroups $X_4$ Group 0, $X_5$ Group 0, and $X_6$ Group 0. Once input vectors 2541 and 2543 are generated, subgroups $X_3$ Group 0 and $X_4$ Group 0 are no longer needed, are marked as expired, and will be replaced on subsequent reads with new subgroups from memory banks 2521. In the example of FIG. 25, two input vectors are generated each cycle, one input vector corresponding to each of the two output ports of the data input vector unit.

Figure 26:
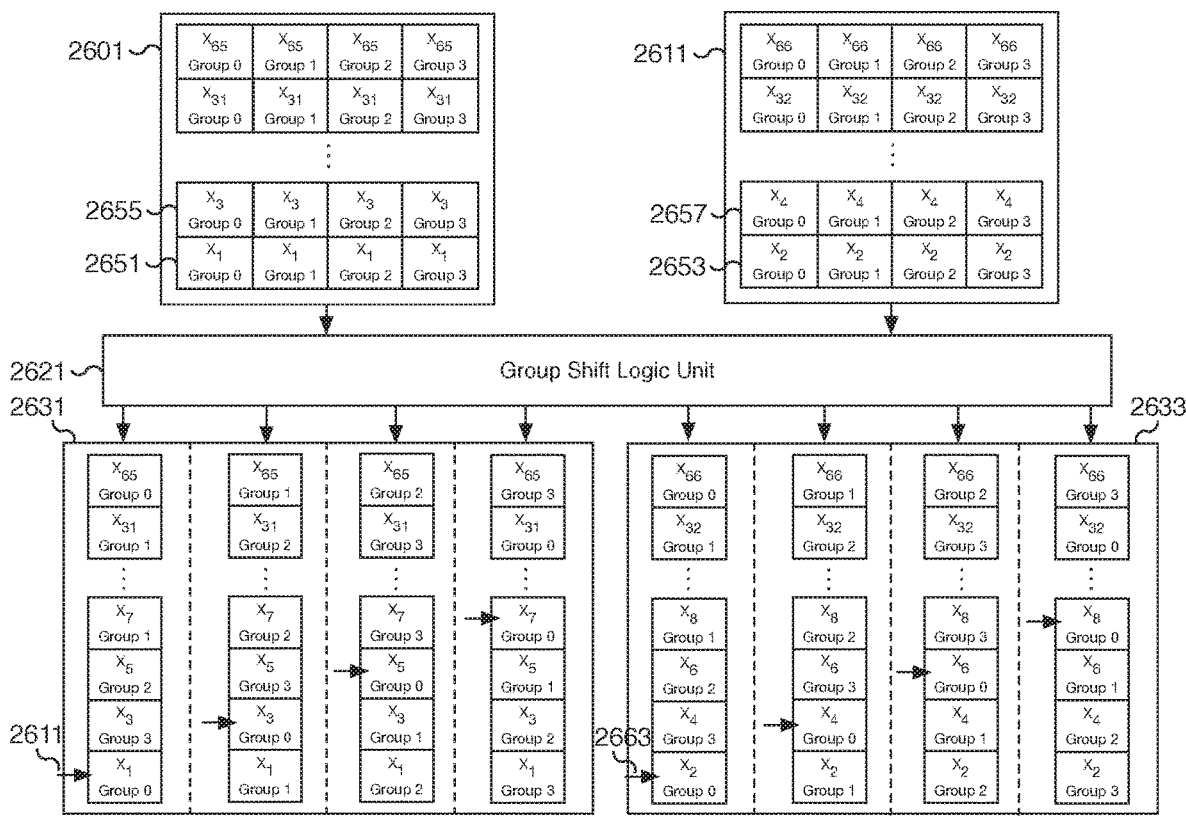
FIG. 26 is a block diagram illustrating components of an embodiment of a data input vector unit for preparing data input vectors for performing a two-dimensional convolution operation using a matrix processor unit and vector unit operations.

FIG. 26 is a block diagram illustrating components of an embodiment of a data input vector unit for preparing data input vectors for performing a two-dimensional convolution operation using a matrix processor unit and vector unit operations. In the example shown, staging memory units 2601 and 2611, group shift logic unit 2621, and memory banks 2631 and 2633 are components of a data input vector unit with four output ports. In contrast with the data input vector units of FIG. 21, the data input vector unit of FIG. 26 includes multiple staging memory units and multiple groups of memory banks. In various embodiments, the number of staging memory units and groups of memory banks can be increased for increased performance and throughput. In the example shown, two pairs of staging memory units, two groups of memory banks, and four output ports are utilized but other combinations are appropriate as well.

In some embodiments, the components depicted are components of data input vector unit 1803 of FIG. 18. The pair of staging memory units 2601 and 2611 include overlapping subgroups from rows $X_1$ through $X_{32}$ and rows $X_{66}$ and $X_{65}$ of corresponding matrix slices of a data matrix such as data matrix 1821 of FIG. 18. Group shift logic unit 2621 distributes the subgroups stored in staging memory units 2601 and 2611 to memory banks 2631 and 2633 using a circular shifted pattern. Memory banks 2631 and 2663 each include four memory banks for a total of eight memory banks corresponding to banks 0, 1, 2, 3, 4, 5, 6, and 7. In some embodiments, after a circular shifted pattern is applied, subgroup rows 2651 and 2655 stored in staging memory unit 2601 correspond to subgroup rows distributed to memory banks 2631 and subgroup rows 2653 and 2657 stored in staging memory unit 2611 correspond to subgroup rows distributed to memory banks 2633. Read pointers, including read pointers 2611 and 2663, are shown as horizontal arrows and point to the next available subgroup to read from for each corresponding memory bank of memory banks 2631 and 2633. In some embodiments, a next active read pointer is used to keep track of which subgroup(s) should be read next. In some embodiments, the pair of staging memory units 2601 and 2611 are staging memory unit 1811 of FIG. 18, group shift logic unit 2621 is group shift logic unit 1813 of FIG. 18, and the pair of memory banks 2631 and 2633 are memory banks 1815 of FIG. 18.

In some embodiments, the identified elements of rows of a data matrix are distributed to overlapping groups into staging memory units 2601 and 2611. The rows are alternatively stored in staging memory units 2601 and 2611. For example, overlapping subgroups of rows $X_1$, $X_3$, $X_{31}$, and $X_{65}$ are distributed to staging memory unit 2601 and overlapping subgroups of rows $X_2$, $X_4$, $X_{32}$, and $X_{66}$ are distributed to staging memory unit 2611. In various embodiments, the process to create an overlapping group is described above with respect to FIGS. 17A and 19.

In some embodiments a circular shifted pattern is applied by group shift logic unit 2621 to distribute subgroups from staging memory unit 2601 to memory banks 2631 and subgroups from staging memory unit 2611 to memory banks 2633. For example, each row of subgroups read from staging memory unit 2601 is shifted by an incremental amount before being written to memory banks 2631. Similarly, each row of subgroups read from staging memory unit 2611 is shifted by an incremental amount before being written to memory banks 2633. The circular shifted pattern allows for a diagonal access pattern when reading elements from the different memory banks of memory banks 2631 and 2633. In some embodiments, the circular shifted pattern is implemented with respect to each of memory banks 2631 and 2633 as described with respect to FIGS. 17A and 21. In some embodiments, the different memory banks of memory banks 2121 of FIG. 21 can be accessed independently and in parallel allowing multiple subgroups to be read from memory banks 2631 and 2633 in parallel.

Figure 27:
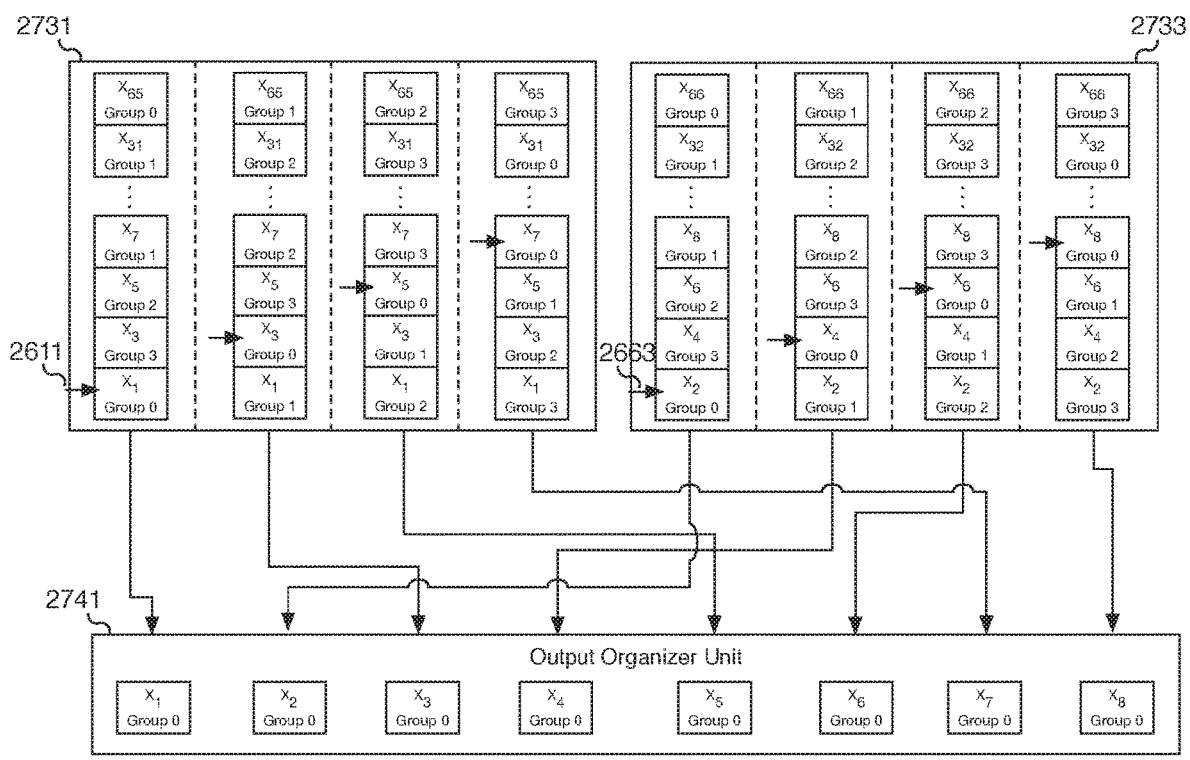
FIG. 27 is a block diagram illustrating components of an embodiment of a data input vector unit for preparing data input vectors for performing a two-dimensional convolution operation using a matrix processor unit and vector unit operations.

FIG. 27 is a block diagram illustrating components of an embodiment of a data input vector unit for preparing data input vectors for performing a two-dimensional convolution operation using a matrix processor unit and vector unit operations. In the example shown, memory banks 2731 and 2733 and output organizer unit 2741 are components of a data input vector unit with four output ports. In some embodiments, the components depicted are components of data input vector unit 1803 of FIG. 18 and/or the data input vector unit of FIG. 26. In some embodiments, memory banks 2731 and 2733 are memory banks 1815 of FIG. 18 and/or are memory banks 2631 and 2633 of FIG. 26 and output organizer unit 2741 is output organizer unit 1817 of FIG. 18. Memory banks 2731 and 2733 store overlapping subgroups from rows $X_1$ through $X_{32}$ and rows $X_{66}$ and $X_{65}$ of corresponding matrix slices of a data matrix such as data matrix 1821 of FIG. 18. The subgroups are distributed in the memory banks using a circular shifted pattern. Output organizer unit 2741 reads subgroups from memory banks 2731 and 2733. Each memory bank of memory banks 2731 and 2733 includes a read pointer. Two read pointers 2611 and 2663 are shown corresponding to memory banks 0 and 4, respectively, of memory banks 2731 and 2733. Additional read pointers for memory banks 1-3 and 5-7 of memory banks 2731 and 2733 are shown but not labeled. In the example shown, output organizer unit 2741 includes eight subgroups corresponding to subgroups $X_1$ Group 0, $X_2$ Group 0, $X_3$ Group 0, $X_4$ Group 0, $X_5$ Group 0, $X_6$ Group 0, $X_7$ Group 0, and $X_8$ Group 0. In some embodiments, the subgroups are stored in a storage location such as a circular bank shifter. In some embodiments, the circular bank shifter is a left circular bank shifter (or a circular bank shifter using the reserve direction of the shifting logic used to distribute the subgroups into memory banks 2731 and 2733). Output organizer unit 2741 outputs input vectors (shown in FIG. 28) using the subgroups read from memory banks 2731 and 2733. In various embodiments, the input vectors are data input vectors used as arguments to a matrix processor unit such as matrix processor unit 107 of FIG. 1. In some embodiments, each input vector includes additional padding, such as zero-value elements, to flush out the size of the input vector to be compatible with the associated matrix processor unit.

In some embodiments, output organizer unit 2741 reads subgroups from memory banks 2731 and 2733. For example, output organizer unit 2741 may rely on read pointers of each memory bank, such as read pointers 2611 and 2663, to point to the next subgroup to read. In the example shown, read pointer 2611 points to subgroup $X_1$ Group 0 and read pointer 2663 points to subgroup $X_2$ Group 0. As shown, the subgroups pointed by read pointers 2611 ($X_1$ Group 0) and 2663 ($X_2$ Group 0) are read into output organizer unit 2741. Once a sufficient number of subgroups have been read, for example, filling the associated storage location (not shown) of output organizer unit 2741, one or more input vectors are generated. In the example of FIG. 27, output organizer unit 2741 can read at most eight subgroups. For example, eight subgroups, one from each memory bank of memory banks 2731 and 2733, are read by output organizer unit 2741. In some embodiments, the eight memory bank reads to read eight subgroups are performed in parallel. In various embodiments, output organizer unit 2741 generates input vectors using groups of three subgroups by first ensuring the subgroups are arranged in transpose order. The transpose order may be applied by using a diagonal access pattern to read subgroups from memory banks 2731 and 2733 and applying an appropriate number of shifts to the read subgroups. For an initial read from a new matrix slice as shown in FIG. 27, no shifts are needed. On subsequent reads, one or more shifts may be applied after new subgroups are read to replace expired subgroups. For example, four shifts may be applied after four new subgroups are read to replace four expired subgroups. In various embodiments, once a subgroup is read, a next active read pointer is updated to keep track of which subgroup(s) from which banks should be read next. In some embodiments, the next active pointer indicates which memory bank of memory banks 2731 and 2733 should be read next to continue with a diagonal access pattern. In some embodiments, the process used to generate an input vector is described with respect to the processes of FIGS. 17A and 17B.

Figure 28:
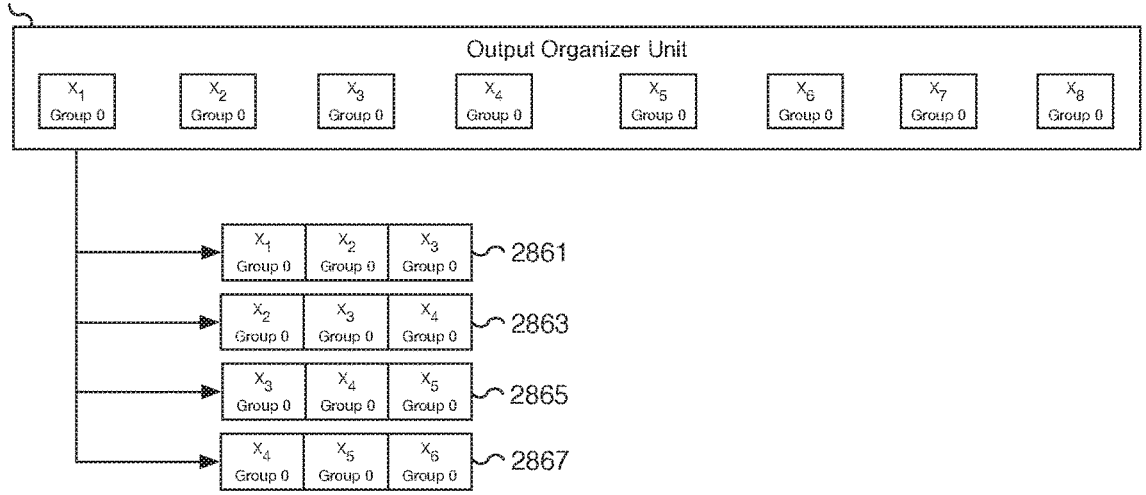
FIG. 28 is a block diagram illustrating components of an embodiment of a data input vector unit for preparing data input vectors for performing a two-dimensional convolution operation using a matrix processor unit and vector unit operations.

FIG. 28 is a block diagram illustrating components of an embodiment of a data input vector unit for preparing data input vectors for performing a two-dimensional convolution operation using a matrix processor unit and vector unit operations. In the example shown, output organizer unit 2841 is a component of a data input vector unit with four output ports. In some embodiments, the components depicted are components of data input vector unit 1803 of FIG. 18 and/or the data input vector units of FIGS. 26 and 27. In some embodiments, output organizer unit 2841 is output organizer unit 2741 of FIG. 27. In the example shown, output organizer unit 2841 includes eight subgroups corresponding to subgroups $X_1$ Group 0, $X_2$ Group 0, $X_3$ Group 0, $X_4$ Group 0, $X_5$ Group 0, $X_6$ Group 0, $X_7$ Group 0, and $X_8$ Group 0. In some embodiments, the subgroups are stored in a storage location such as a circular bank shifter. In some embodiments, the circular bank shifter is a left circular bank shifter (or a circular bank shifter using the reserve direction of the shifting logic used to distribute the subgroups into memory banks of the data input vector unit such as memory banks 2731 and 2733 of FIG. 27).

Output organizer unit 2841 outputs four input vectors 2861, 2863, 2865, and 2867 using the subgroups read from memory banks. In various embodiments, four input vectors are generated, one for each output port of the data input vector unit. In some embodiments, input vectors 2861, 2863, 2865, and 2867 are data input vectors used as arguments to a matrix processor unit such as matrix processor unit 107 of FIG. 1. Each input vector may be passed to a different vector unit of a matrix processor unit. In some embodiments, input vectors 2861, 2863, 2865, and 2867 include additional padding, such as zero-value elements, to flush out the size of the input vectors to be compatible with the associated matrix processor unit.

In some embodiments, output organizer unit 2841 generates input vector 2861 using the first three subgroups (e.g., slots 0, 1, and 2 of the storage location) corresponding to subgroups $X_1$ Group 0, $X_2$ Group 0, and $X_3$ Group 0. Input vector 2863 is generated by starting with the second subgroup and selecting three subgroups (e.g., slots 1, 2, and 3 of the storage location) corresponding to subgroups $X_2$ Group 0, $X_3$ Group 0, and $X_4$ Group 0. Similarly, input vector 2865 is generated by starting with the third subgroup and selecting three subgroups (e.g., slots 2, 3, and 4 of the storage location) corresponding to subgroups $X_3$ Group 0, $X_4$ Group 0, and $X_5$ Group 0. And input vector 2867 is generated by starting with the fourth subgroup and selecting three subgroups (e.g., slots 3, 4, and 5 of the storage location) corresponding to subgroups $X_4$ Group 0, $X_5$ Group 0, and $X_6$ Group 0. Once input vectors 2861, 2863, 2865, and 2867 are outputted, subgroups $X_1$ Group 0, $X_2$ Group 0, $X_3$ Group 0, and $X_4$ Group 0 are no longer needed and are marked expired. Subsequent reads from memory banks replace the expired subgroups.

In some embodiments, on subsequent reads, four reads are performed to replace the expired subgroups (e.g., subgroups $X_1$ Group 0, $X_2$ Group 0, $X_3$ Group 0, and $X_4$ Group 0) with newly read subgroups (e.g., subgroups $X_9$ Group 0, $X_{10}$ Group 0, $X_{11}$ Group 0, and $X_{12}$ Group 0). Once the new subgroups are read, the subgroup ordering is: $X_9$ Group 0, $X_{10}$ Group 0, $X_{11}$ Group 0, $X_{12}$ Group 0, $X_5$ Group 0, $X_6$ Group 0, $X_7$ Group 0, and $X_8$ Group 0. In various embodiments, four shifts are performed to arrange the subgroups in transpose order. For example, once the subgroups are left shifted by four banks, the subgroup ordering is: $X_5$ Group 0, $X_6$ Group 0, $X_7$ Group 0, $X_8$ Group 0, $X_9$ Group 0, $X_{10}$ Group 0, $X_{11}$ Group 0, and $X_{12}$ Group 0. Four new input vectors can be generated by selecting three subgroups starting with the first, second, third, and fourth subgroups. Once the new input vectors are generated, subgroups that are no longer needed (e.g., the first four subgroups) are expired. In various embodiments, the input vectors are generated as described by the processes of FIGS. 17A and 17B.

Figure 29:
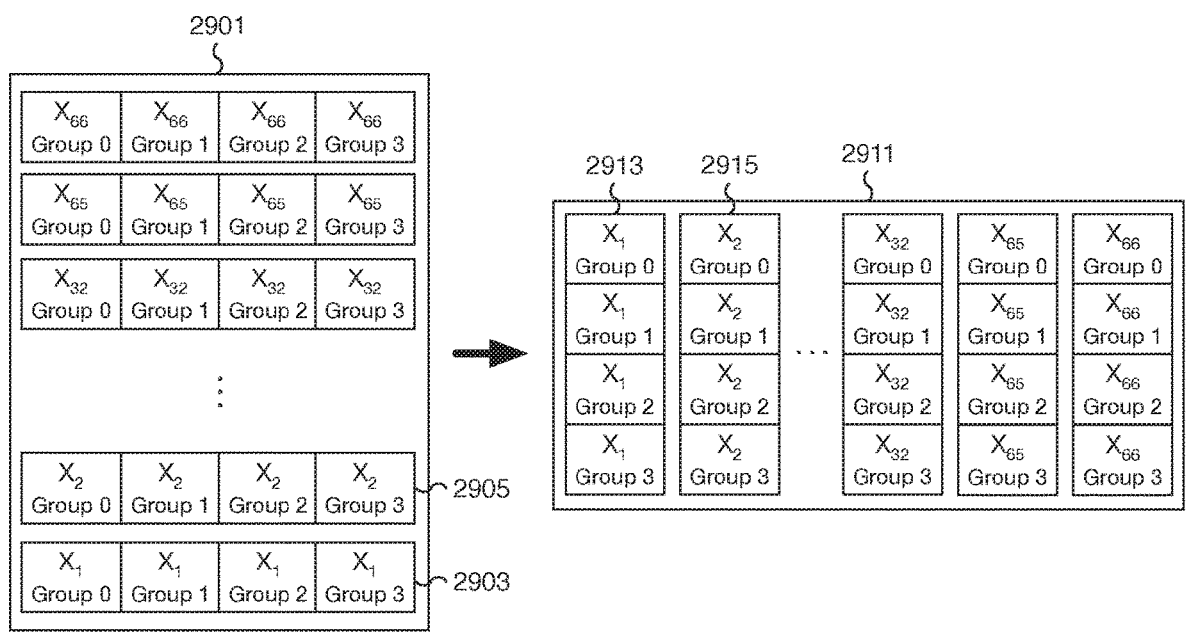
FIG. 29 is a diagram illustrating an example of a transpose order associated with a matrix of overlapping subgroups.

FIG. 29 is a diagram illustrating an example of a transpose order associated with a matrix of overlapping subgroups. In the example shown, matrix 2901 is a matrix of overlapping subgroups using elements from a data matrix such as data matrix 703 of FIG. 7B. In some embodiments, matrix 2901 is a matrix generated at 1703 of FIG. 17A. In some embodiments, matrix 2901 corresponds to the overlapping subgroups distributed to a staging memory unit such as staging memory unit 1811 of FIG. 18, staging memory unit 1911 of FIG. 19, and/or staging memory unit 2101 of FIG. 21. Matrix 2901 includes subgroup rows 2903 and 2905 corresponding to elements from row 1 and row 2, respectively, of a data matrix.

In some embodiments, matrix 2911 is the transpose of matrix 2901. Matrix 2911 includes subgroup columns 2913 and 2915 corresponding to elements from row 1 and row 2, respectively, of a data matrix. Subgroup column 2913 is the transpose of subgroup row 2903 and subgroup column 2915 is the transpose of subgroup row 2905. In various embodiments, the vector inputs created for a matrix processor unit using the processes described herein correspond to selecting subgroups from a transposed matrix such as matrix 2911. For example, in the event the weight matrix is a 3×3 weight matrix, the input vectors are created by starting with the first subgroup (row 1, column 1) of matrix 2911 and selecting three consecutive subgroups. Each new input vector is created by starting with the next subgroup of the row and selecting three consecutive subgroups. For example, the subgroups $X_1$ Group 0, $X_2$ Group 0, and $X_3$ Group 0 are used to create the first input vector and the subgroups $X_2$ Group 0, $X_3$ Group 0, and $X_4$ Group 0 (not shown) are used to create the second input vector. Subgroups $X_{32}$ Group 0, $X_{65}$ Group 0, and $X_{66}$ Group 0 are used to create the last input vector associated with the first row of matrix 2911. Once all subgroups of a row have been selected for an input vector, the next row is traversed and so forth until all elements of matrix 2911 have been selected for an input vector. In various embodiments, any series of three subgroups from a row of matrix 2911 corresponds to an N×3 matrix slice of the original data matrix.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory configured to store elements of a matrix, wherein the elements of the matrix are distributed into overlapping subgroups and each of the overlapping subgroups shares at least one element of the matrix with another overlapping subgroup in the overlapping subgroups;
a plurality of memory banks configured to store the overlapping subgroups, wherein the overlapping subgroups are distributed among the memory banks using a circular shifted pattern; and
an organizer configured to read specific ones of the overlapping subgroups in the plurality of memory banks in a specified pattern associated with transposing the matrix.

2. The system of claim 1, wherein the matrix is a machine learning data matrix.

3. The system of claim 1, wherein a number of elements shared by at least one of the overlapping subgroups with another overlapping subgroup is based on a dimension size of a machine learning weight matrix.

4. The system of claim 3, wherein the machine learning weight matrix is a 3×3, 5×5, 7×7, 9×9, or 11×11 matrix.

5. The system of claim 1, wherein the matrix is associated with machine learning utilizing a machine learning weight matrix that is a 3×3 matrix, and each of the overlapping subgroups shares two elements with a corresponding neighboring overlapping subgroup.

6. The system of claim 1, wherein the organizer is further configured to generate an input vector using a plurality of the read specific ones of the overlapping subgroups.

7. The system of claim 6, wherein the input vector includes one or more padding elements.

8. The system of claim 1, wherein the organizer is further configured to generate two or more input vectors for a single processor cycle, wherein each input vector is created by selecting two or more overlapping subgroups of the read specific ones of the overlapping subgroups.

9. The system of claim 1, further comprising a first circular bank shifter configured to implement the circular shifted pattern by shifting the stored overlapping subgroups.

10. The system of claim 9, further comprising a second circular bank shifter configured to in part implement the specified pattern associated with transposing the matrix by shifting the read specific ones of the overlapping subgroups.

11. The system of claim 10, wherein the first circular bank shifter is a right circular bank shifter and the second circular bank shifter is a left circular bank shifter.

12. The system of claim 10, wherein the first and second circular bank shifters are configured to perform shifts in opposite directions.

13. The system of claim 1, wherein the specified pattern associated with transposing the matrix is a diagonal access pattern.

14. The system of claim 1, wherein each of the plurality of memory banks utilizes a read pointer that identifies one of the overlapping subgroups distributed among the memory banks for reading.

15. The system of claim 1, wherein each element of the matrix is stored as a 4-bit, 8-bit, 2-byte, or 4-byte element.

16. The system of claim 1, wherein the memory configured to store the elements of the matrix is divided into two or more memory storage locations and the plurality of memory banks configured to store the overlapping subgroups is divided into two or more groups of memory banks, and each of the two or more memory storage locations is configured to store the overlapping subgroups of only one of the two or more groups of memory banks.

17. The system of claim 1, wherein each of the plurality of memory banks is configured to be read independently and in parallel.

18. The system of claim 1, wherein a memory address of the matrix is identified by a convolution operation instruction.

19. A method comprising:
distributing elements of a matrix into overlapping subgroups, wherein each of the overlapping subgroups shares at least one element of the matrix with another overlapping subgroup in the overlapping subgroups;
storing the overlapping subgroups in a memory;
distributing the overlapping subgroups in the memory to a plurality of memory banks configured to store the overlapping subgroups using a circular shifter pattern; and
reading specific ones of the overlapping subgroups in the plurality of memory banks in a specified pattern associated with transposing the matrix.

20. A system, comprising:
a shared memory storing a matrix; and
a plurality of processing elements configured to operate in parallel, wherein each processing element includes:
a matrix processor unit, including a plurality of calculation units, wherein each of the plurality of calculation units includes a vector multiply unit and a vector adder unit;
a weight input vector unit; and
a data input vector unit, including:
a staging memory unit configured to store elements of the matrix stored in the shared memory, wherein the elements of the matrix are distributed into overlapping subgroups and each of the overlapping subgroups shares at least one element of the matrix with another overlapping subgroup in the overlapping subgroups;
a plurality of memory banks configured to store the overlapping subgroups, wherein the overlapping subgroups are distributed among the memory banks using a circular shifted pattern; and
an organizer configured to read specific ones of the overlapping subgroups in the plurality of memory banks in a specified pattern associated with transposing the matrix.

* * * * *